United States Patent
Lim et al.

(10) Patent No.: US 12,381,704 B2
(45) Date of Patent: Aug. 5, 2025

(54) METHOD AND APPARATUS FOR TRANSMITTING SOUNDING REFERENCE SIGNAL IN WIRELESS COMMUNICATION SYSTEM

(71) Applicant: SAMSUNG ELECTRONICS CO., LTD., Suwon-si (KR)

(72) Inventors: Seongmok Lim, Suwon-si (KR); Kyungjun Choi, Suwon-si (KR); Ameha Tsegaye Abebe, Suwon-si (KR); Youngrok Jang, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 315 days.

(21) Appl. No.: 17/938,621

(22) Filed: Oct. 6, 2022

(65) Prior Publication Data
US 2023/0208607 A1    Jun. 29, 2023

(30) Foreign Application Priority Data
Oct. 6, 2021    (KR) .................. 10-2021-0132495

(51) Int. Cl.
*H04L 5/16* (2006.01)
*H04L 5/00* (2006.01)
(Continued)

(52) U.S. Cl.
CPC .............. *H04L 5/16* (2013.01); *H04L 5/0048* (2013.01); *H04L 25/0224* (2013.01); *H04L 41/0681* (2013.01)

(58) Field of Classification Search
CPC ..... H04L 5/14; H04L 5/16; H04L 5/00; H04L 5/003; H04L 5/0048; H04L 25/0225;
(Continued)

(56) References Cited

U.S. PATENT DOCUMENTS

2019/0199554 A1    6/2019 Park et al.
2020/0221469 A1    7/2020 Lee et al.
(Continued)

FOREIGN PATENT DOCUMENTS

KR    10-2021-0132441 A    11/2021
WO    2018/203728 A1    11/2018

OTHER PUBLICATIONS

3GPP TSG-RAN WG2 Meeting #112-x R2-2010380 CR 0447: CR for Unaligned CA in TS 38.306, Nov. 2-13, 2020.*
International Search Report and Written Opinion of the International Searching Authority dated Jan. 20, 2023, in connection with International Application No. PCT/KR2022/015038, 9 pages.
NTT DOCOMO, Inc., "Summary on UE features for TEIs", R1-2102005, 3GPP TSG RAN WG1 #104-e, e-Meeting, Jan. 25-Feb. 5, 2021, 32 pages.
(Continued)

*Primary Examiner* — Warner Wong

(57) ABSTRACT

A method performed by a terminal in a TDD communication system is provided. The method includes identifying that the terminal supports half-DuplexTDD-CA-SameSCS capability, identifying that directionalCollisionHandling is configured as 'enabled' for a set of serving cells among multiple serving cells including a first serving cell and a second serving cell, in case that the terminal is not capable of simultaneous reception and transmission on the first and second serving cells, identifying that the terminal is not configured to monitor a PDCCH for DCI format 2_0 on any of the multiple serving cells, identifying a first carrier of the first serving cell not configured for a PUCCH/PUSCH, and in case that a SRS on the first carrier and a physical channel on a second carrier of the second serving cell collide and directionalCollisionHandling is configured as 'enabled', applying a priority rule for the SRS transmission and then a procedure for the directional collision handling.

16 Claims, 34 Drawing Sheets

(51) Int. Cl.
  *H04L 25/02* (2006.01)
  *H04L 41/0681* (2022.01)

(58) Field of Classification Search
  CPC ............. H04L 25/0226; H04L 25/0228; H04L 25/0232; H04L 41/0681; H04L 41/08; H04L 41/0803; H04L 41/0866; H04W 74/0816; H04W 74/0825; H04W 74/0841; H04W 74/085; H04W 74/0858; H04W 4/50
  See application file for complete search history.

(56) References Cited

U.S. PATENT DOCUMENTS

| | | | | |
|---|---|---|---|---|
| 2020/0382250 | A1* | 12/2020 | Choi | H04L 5/0048 |
| 2022/0116960 | A1* | 4/2022 | Yang | H04L 1/1854 |
| 2023/0224949 | A1* | 7/2023 | Yin | H04L 5/0055 370/329 |
| 2024/0244547 | A1* | 7/2024 | Ghanbarinejad | H04L 5/0035 |

OTHER PUBLICATIONS

NTT DOCOMO, Inc., "Summary on [105-e-NR-TEI16-01]", R1-2106159, 3GPP TSG-RAN WG1 #105-e R1-2106159, e-Meeting, May 10-27, 2021, 12 pages.

Nokia et al., "Corrections to directional collision handling in half-duplex operation", R2-2104985, 3GPP TSG RAN WG2 Meeting #114 Electronic , Elbonia, May 19-27, 2021, 12 pages.

Supplementary European Search Report dated Nov. 4, 2024, in connection with European Patent Application No. 22878913.7, 14 pages.

ZTE, "Draft TP for half-duplex operation," R1-2100700, 3GPP TSG RAN WG1 Meeting #104e, e-Meeting, Jan. 25-Feb. 5, 2021, 7 pages.

Qualcomm Incorporated, "Discussion on SRS carrier switching," R1-2101432, 3GPP TSG RAN WG1 #104-e, e-Meeting, Jan. 25-Feb. 5, 2021, 6 pages.

* cited by examiner

FIG. 19

MAC-CE structure

| | | | | | | | | |
|---|---|---|---|---|---|---|---|---|
| 1955 — | CORESET Pool ID | Serving Cell ID | | | | BWP ID | | Oct 1 |
| (1950) | $T_7$ | $T_6$ | $T_5$ | $T_4$ | $T_3$ | $T_2$ | $T_1$ | $T_0$ | Oct 2 |
| | $T_{15}$ | $T_{14}$ | $T_{13}$ | $T_{12}$ | $T_{11}$ | $T_{10}$ | $T_9$ | $T_8$ | Oct 3 |

. . .

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

FIG. 20

| R | Serving Cell ID | BWP ID | Oct 1 |
|---|---|---|---|
| $C_0$ | TCI state $ID_{0,1}$ | | Oct 2 |
| R | TCI state $ID_{0,2}$ | | Oct 3 (Optional) |

...

| $C_N$ | TCI state $ID_{N,1}$ | Oct M-1 |
|---|---|---|
| R | TCI state $ID_{N,2}$ | Oct M (Optional) |

2005, 2010 point to $C_0$ / TCI state $ID_{0,1}$ row; 2015 points to R of Oct 3.

METHOD AND APPARATUS FOR TRANSMITTING SOUNDING REFERENCE SIGNAL IN WIRELESS COMMUNICATION SYSTEM

CROSS-REFERENCE TO RELATED APPLICATION

This application is based on and claims priority under 35 U.S.C. § 119 to Korean Patent Application No. 10-2021-0132495, filed on Oct. 6, 2021, in the Korean Intellectual Property Office, the disclosure of which is herein incorporated by reference in its entirety.

BACKGROUND

1. Field

The disclosure relates to operations of a user equipment (UE) and a base station in a wireless communication system. Specifically, the disclosure relates to a method and an apparatus for performing sounding reference signal (SRS) carrier switching for a UE supporting half-duplex time division duplexing carrier aggregation (TDD CA) in a wireless communication system.

2. Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6th generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra-reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mm Wave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

The present disclosure has been made to address the above-mentioned problems and disadvantages, and to provide at least the advantages described below.

According to an aspect of the present disclosure, a method performed by a terminal in a time division duplex (TDD) communication system includes identifying that the terminal indicates support of half-DuplexTDD-CA-SameSCS capability, identifying that directionalCollisionHandling is configured as 'enabled' for a set of serving cells among multiple serving cells including a first serving cell and a second serving cell, in case that the terminal is not capable of simultaneous reception and transmission on the first serving cell and the second serving cell, identifying that the terminal is not configured to monitor a physical downlink control channel (PDCCH) for downlink control information (DCI) format 2_0 on any of the multiple serving cells, identifying a first carrier of the first serving cell not configured for a physical uplink control channel (PUCCH) or a physical uplink shared channel (PUSCH) transmission, and in case that a sounding reference signal (SRS) transmission on the first carrier and a physical channel transmission on a second carrier of the second serving cell collide and directionalCollisionHandling is configured as 'enabled' for the set of serving cells, applying a priority rule for the SRS transmission between the first carrier and the second carrier and then applying a procedure for directional collision handling.

According to another aspect of the disclosure, a method performed by a base station in a TDD communication system includes receiving, from a terminal, capability information indicating that the terminal supports half-DuplexTDD-CA-SameSCS capability, transmitting, to the terminal, configuration information for configuring multiple serving cells including a first serving cell and a second serving cell, wherein a first carrier of the first serving cell is not configured for a PUCCH or a PUSCH transmission, and directionalCollisionHandling is configured as 'enabled' for a set of serving cells among the multiple serving cells based on the configuration information, and receiving, from the terminal, a SRS on the first carrier or a physical channel on a second carrier of the second serving cell, based on a priority rule for the SRS transmission between the first carrier and the second carrier and a procedure for the directional collision handling, wherein the terminal is not capable of simultaneous reception and transmission on the first serving cell and the second serving cell and is not configured to monitor a PDCCH for DCI format 2_0 on any of the multiple serving cells, and wherein in case that the SRS transmission on the first carrier and the physical channel on the second carrier collide and directionalCollisionHandling is configured as 'enabled' for the set of serving cells, the priority rule is first applied and then the procedure for directional collision handling is applied.

According to another aspect of the disclosure, a terminal in a TDD communication system includes a transceiver configured to transmit and receive signals, and a controller coupled with the transceiver and configured to: identify that the terminal indicates support of half-DuplexTDD-CA-SameSCS capability, identify that directionalCollisionHandling is configured as 'enabled' for a set of serving cells among multiple serving cells including a first serving cell and a second serving cell, in case that the terminal is not capable of simultaneous reception and transmission on the first serving cell and the second serving cell, identify that the terminal is not configured to monitor a PDCCH for DCI format 2_0 on any of the multiple serving cells, identify a first carrier of the first serving cell not configured for a PUCCH or a PUSCH transmission, and in case that a SRS transmission on the first carrier and a physical channel transmission on a second carrier of the second serving cell collide and directionalCollisionHandling is configured as 'enabled' for the set of serving cells, apply a priority rule for the SRS transmission between the first carrier and the second carrier and then apply a procedure for directional collision handling.

According to another aspect of the disclosure, a base station in a TDD communication system includes a transceiver configured to transmit and receive signals; and a controller coupled with the transceiver and configured to: receive, from a terminal, capability information indicating that the terminal supports half-DuplexTDD-CA-SameSCS capability, transmit, to the terminal, configuration information for configuring multiple serving cells including a first serving cell and a second serving cell, wherein a first carrier of the first serving cell is not configured for a PUCCH or a PUSCH transmission, and directionalCollisionHandling is configured as 'enabled' for a set of serving cells among the multiple serving cells based on the configuration information, and receive, from the terminal, a SRS on the first carrier switched from another cell or a physical channel on a second carrier of the second serving cell, based on a priority rule for the SRS transmission between the first carrier and the second carrier and a procedure for the directional collision handling, wherein the terminal is not capable of simultaneous reception and transmission on the first serving cell and the second serving cell and is not configured to monitor a PDCCH for DCI format 2_0 on any of the multiple serving cells, and wherein in case that the SRS transmission on the first carrier and the physical channel on the second carrier collide and directional CollisionHandling is configured as 'enabled' for the first serving cell and the second serving cell, the priority rule is first applied and then the procedure for directional collision handling is applied.

A method by a UE for performing SRS carrier switching in a wireless communication system supporting half-duplex TDD CA according to an embodiment of the disclosure may include: obtaining information scheduling a signal or a channel from a base station; identifying an overlapped symbol based on information regarding the scheduled signal or channel and determining a reference cell based on the identified overlapped symbol; and applying a priority rule to determine whether to perform SRS carrier switching and a directional collision handling procedure.

A UE for performing SRS carrier switching in a wireless communication system supporting half-duplex TDD CA according to an embodiment of the disclosure may include a transceiver, and a processor configured to: receive scheduling information for each support cell from a base station through the transceiver; and in case that there is a signal or a channel in which symbols in the time domain overlap, with regard to a plurality of support cells, based on the scheduling information, determine a reference cell based on configuration information received from the base station, and apply a priority rule to determine whether to perform SRS carrier switching and a directional collision handling procedure, wherein the SRS carrier switching and CA to the base station are performed through the transceiver and the processor configured to perform the collision handling and the application of the priority rule.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 19 illustrates a MAC CE for beam activation of a PDSCH according to an embodiment of the disclosure;

FIG. 20 illustrates an enhanced PDSCH TCI state activation/deactivation MAC-CE structure according to an embodiment of the disclosure;

DETAILED DESCRIPTION

Figure 1:
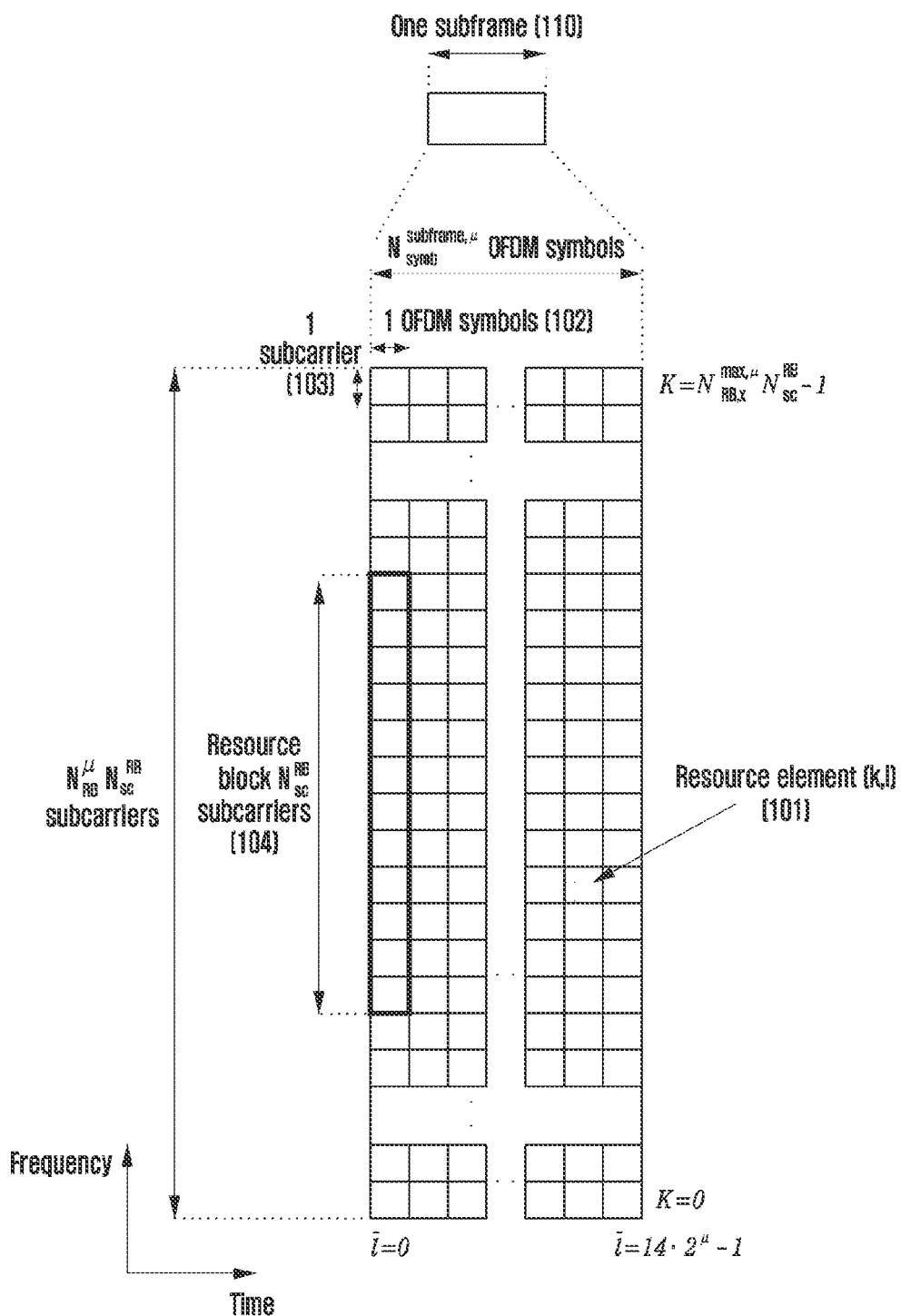
FIG. 1 illustrates a basic structure of a time-frequency domain in a wireless communication system, according to an embodiment of the disclosure.

FIGS. 1 through 34, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The technical problems to be achieved in the embodiment of the disclosure are not limited to the technical problems mentioned above, and other technical problems not mentioned herein will be clearly understood from the following description by those skilled in the art to which the disclosure belongs.

An embodiment of the disclosure provides a method and an apparatus for efficiently performing SRS carrier switching in a wireless communication system.

An embodiment of the disclosure provides a method and an apparatus for performing SRS carrier switching to a UE supporting half-duplex TDD CA.

An embodiment of the disclosure provides a method and an apparatus for determining and applying an order for applying a priority rule associated with SRS and a directional collision handling procedure.

According to an embodiment of the disclosure, SRS carrier switching can be performed without ambiguity between the UE and a base station in a wireless communication system supporting half-duplex TDD CA.

Further, according to an embodiment of the disclosure, SRS carrier switching and directional collision handling can be performed without ambiguity between the UE and a base station in a wireless communication system supporting half-duplex TDD CA.

The effects obtainable in the disclosure are not limited to the above-mentioned effects, and other effects not mentioned herein will be clearly understood from the following description by those skilled in the art to which the disclosure belongs.

Hereinafter, embodiments of the disclosure are described with reference to the accompanying drawings.

In describing the embodiments, descriptions of technical contents that are well known in the technical field to which the disclosure pertains and are not directly related to the disclosure will be omitted. This is to more clearly convey the subject of the disclosure without obscuring the subject of the disclosure by omitting unnecessary description.

For the same reason, in the drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by referring to embodiments as described below in detail in conjunction with the accompanying drawings. However, the disclosure is not limited to the embodiments set forth below, but may be implemented in various different forms. The following embodiments are provided only to completely disclose and inform those skilled in the art of the scope of the disclosure, and the appended claims.

The terms which will be described below are terms defined in consideration of the functions in the disclosure, and may be different according to users, intentions of the users, or customs. Therefore, the definitions of the terms should be made based on the contents throughout the specification.

In the following description, a BS is an entity that allocates resources to terminals, and may be at least one of a gNode B, an eNode B, a Node B, a BS, a wireless access unit, a BS controller, and a node on a network. In addition, the BS may be a network entity including at least one of: an integrated access and backhaul-donor (IAB-donor) which is a gNB configured to provide network access to UE(s) through a network of backhaul and access links in the NR system; and an IAB-node which is a radio access network (RAN) node configured to support NR access link(s) to UE(s) and support NR backhaul links to the IAB-donor or another IAB-node.

A terminal is wirelessly connected through the IAB-node and may transmit/receive data to/from the IAB-donor connected to at least one IAB-node through the backhaul link. The terminal may include a UE, a mobile station (MS), a cellular phone, a smartphone, a computer, or a multimedia system capable of performing communication functions.

In the disclosure, a "downlink" refers to a radio link via which a BS transmits a signal to a terminal, and an "uplink" refers to a radio link via which a terminal transmits a signal to a BS.

Further, although the following description may be directed to a long term evolution (LTE) or LTE-A system by way of example, embodiments of the disclosure may also be applied to other communication systems having similar technical backgrounds or channel types to the embodiments of the disclosure. Examples of other communication systems may include 5G new radio (NR) developed beyond LTE-A, and in the following description, "5G" may be a concept that covers exiting LTE, LTE-A, and other similar services. In addition, based on determinations by those skilled in the art, the disclosure may be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create a means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed concurrently or the blocks may sometimes be executed in the reverse order, depending upon the functionality involved.

As used herein, "unit" refers to a software element or a hardware element, such as a field programmable gate array (FPGA) or an application specific integrated circuit (ASIC), which performs a predetermined function. However, the term "unit" does not always have a meaning limited to software or hardware. "Unit" may be constructed either to be stored in an addressable storage medium or to execute one or more processors. Therefore, "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may either be combined into a smaller number of elements, or a "unit", or divided into a larger number of elements, or a "unit". Moreover, the elements and "units" may be implemented to reproduce one or more CPUs within a device or a security multimedia card. Further, the term "unit" in the embodiments may include one or more processors.

A wireless communication system has developed into a broadband wireless communication system that provides a high-speed and high-quality packet data service according to communication standards such as high-speed packet access (HSPA) of third generation partnership project (3GPP), LTE or evolved universal terrestrial radio access (E-UTRA), LTE-advanced (LTE-A), LTE-Pro, high rate packet data (HRPD) of 3GPP2, ultra-mobile broadband (UMB), and 802.16e of the Institute of Electrical and Electronics Engineers (IEEE) beyond the initially provided voice-based service.

An LTE system, which is a representative example of the broadband wireless communication system, employs an orthogonal frequency division multiplexing (OFDM) scheme for a downlink (DL) (the term "downlink" and the term "DL" are used interchangeably throughout the disclosure), and employs a single carrier frequency division multiple access (SC-FDMA) scheme for an uplink (UL) (the term "uplink" and the term "UL" are used interchangeably throughout the disclosure). The uplink is a radio link through which a UE (or an MS) transmits data or a control signal to a BS (or an eNode B), and the downlink is a radio link through which the BS transmits data or a control signal to the UE. In the multiple access schemes as described above, time-frequency resources for carrying data or control information are allocated and operated in a manner to prevent overlapping of the resources, that is, to establish the orthogonality, between users, so as to identify data or control information of each user.

A post-LTE communication system, that is, a 5G communication system, should be able to freely reflect various requirements of a user and a service provider, and thus it is required to support a service which satisfies the various requirements. Services which are considered for the 5G communication system include enhanced mobile broadband (eMBB), massive machine type communication (mMTC), and ultra-reliability low latency communication (URLLC).

The eMBB aims to provide a data transmission rate which is improved so as to surpass the data transmission speed supported by conventional LTE, LTE-A, or LTE-Pro. For example, in the 5G communication system, the eMBB should provide a peak downlink data rate of 20 gigabits per second (Gbps) and a peak uplink data rate of 10 Gbps from the viewpoint of one BS. Further, the 5G communication system should provide not only the peak data rate but also an increased user-perceived data rate. In order to satisfy such requirements, improvement of various transmission/reception technologies, including a further improved multi-input multi-output (MIMO) transmission technology, is needed. Further, while the current LTE system uses transmission bandwidths from a bandwidth of 2 GHz to a maximum bandwidth of 20 megahertz (MHz) to transmit signals, the 5G communication system uses a frequency bandwidth wider than 20 MHz in frequency bands of 3 to 6 GHz or higher than or equal to 6 GHz, whereby the data transmission rate required by the 5G communication system can be satisfied.

Also, in order to support an application service such as the IoT, mMTC is considered in the 5G communication system. The mMTC is required to support access of a multitude of UEs within a cell, improve coverage of the UE, increase a battery lifetime, and reduce the costs of the UE in order to efficiently provide IoT technology. IoT technology is used in conjunction with various sensors and devices to provide communication, and thus should support a large number of UEs (for example, 1,000,000 UEs/kilometer2 (km2)) within the cell. Since the UE supporting the mMTC is highly likely to be located in a shaded area, such as a basement of a building, which a cell cannot cover due to service characteristics, the mMTC may require wider coverage than other services provided by the 5G communication system. The UE supporting the mMTC needs to be produced at low cost and it is difficult to frequently exchange a battery thereof. Thus, a long battery lifetime, for example, 10 to 15 years, may be required.

The URLLC is a cellular-based wireless communication service used for a particular (mission-critical) purpose. For example, services used for remote control of robots or machinery, industrial automation, unmanned aerial vehicles, remote health care, and emergency alerts may be considered. Accordingly, communication provided by the URLLC should provide very low latency and very high reliability. For example, services supporting the URLLC should satisfy a radio access delay time (air interface latency) shorter than 0.5 milliseconds and also have a requirement of a packet error rate equal to or smaller than 10-5. Accordingly, for services supporting the URLLC, the 5G system should provide a transmit time interval (TTI) smaller than that of other systems and also have a design requirement of allocating a wide array of resources in a frequency band in order to guarantee reliability of a communication link.

Three services of 5G, namely eMBB, URLLC, and mMTC, may be multiplexed and transmitted in one system. At this time, in order to meet the different requirements of the respective services, different transmission/reception schemes and transmission/reception parameters may be used for the services. Of course, 5G is not limited to the above-described three services.

Hereinafter, some terms and names defined in the 3GPP standard (standards for 5G, NR, LTE, or systems similar thereto) may be used for convenience of explanation. However, the disclosure is not limited by the above-mentioned terms and names, and may be equally applied to systems conforming to other standards. In addition, a term for identifying an access node, a term referring to network entities, a term referring to messages, a term referring to an interface between network entities, a term referring to various pieces of identified information and the like, which are used in the following description, are exemplified for the convenience of explanation. Therefore, the disclosure is not limited to the terms used herein, and other terms referring to objects having equivalent technical meanings thereof may be used.

[NR Time-Frequency Resources]

FIG. 1 illustrates a basic structure of a time-frequency domain which is a radio resource domain in which data or a control channel is transmitted in a wireless communication system according to an embodiment of the disclosure.

Referring to FIG. 1, a horizontal axis indicates a time domain and a vertical axis indicates a frequency domain. The basic unit of resources in the time and frequency domain is a resource element (RE) 101 and may be defined as 1 orthogonal frequency division multiplexing (OFDM) symbol 102 in the time axis and 1 subcarrier 103 in the frequency axis. In the frequency domain, $N_{SC}^{RB}$ (for example, 12) consecutive REs may correspond to one resource block (RB) 104. $N_{symb}^{subframe,\mu}$ is the number of OFDM symbols per subframe 110 for subcarrier spacing configuration p and TS 38.211 section 4 may be referred for a more detailed description of resource structure in the 5G system.

Figure 2:
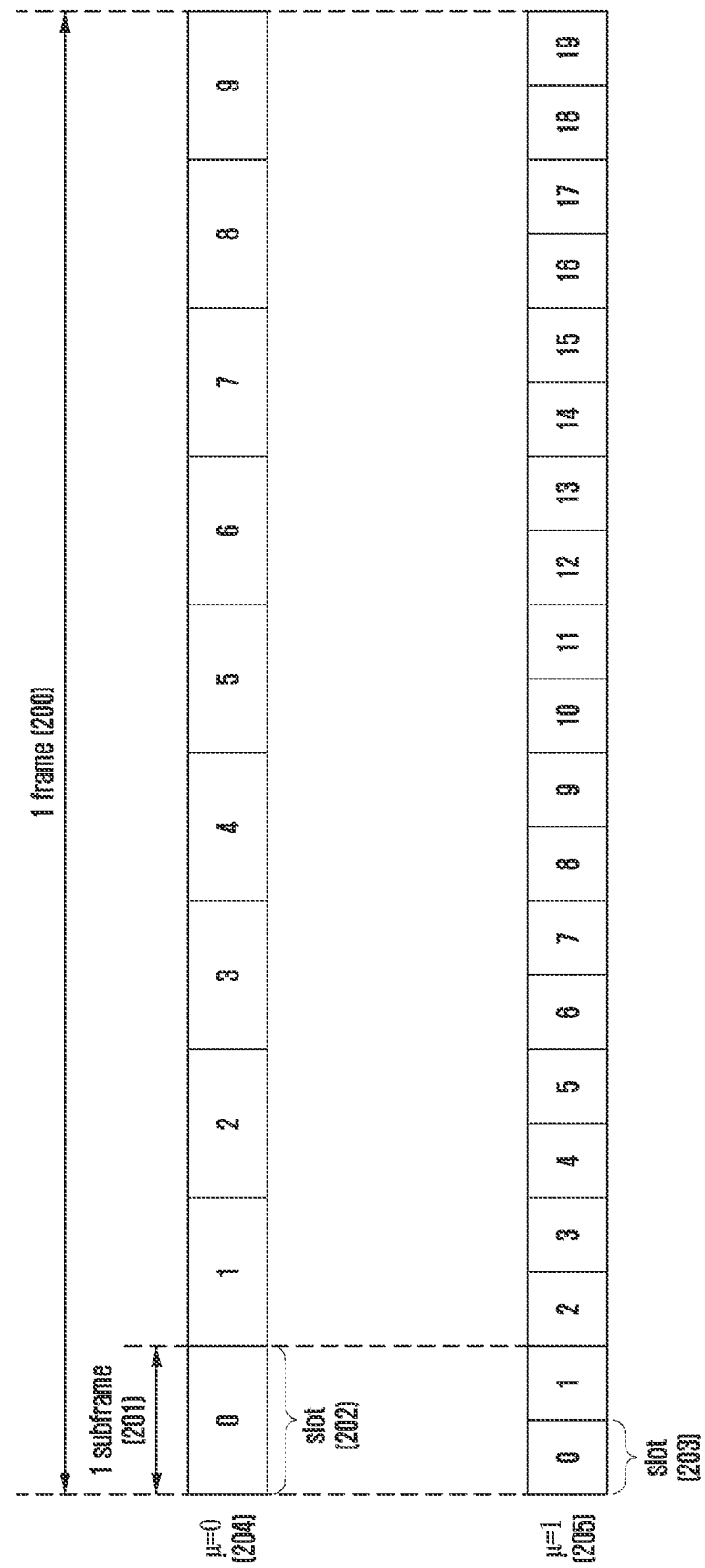
FIG. 2 illustrates frame, subframe, and slot structures in a wireless communication system, according to an embodiment of the disclosure.

FIG. 2 illustrates frame, subframe, and slot structures in a wireless communication system, according to an embodiment of the disclosure.

Referring to FIG. 2, an example of the structure of a frame 200, a subframe 201, and a slot 202 is illustrated. One frame 200 may be defined as 10 milliseconds (ms). One subframe 201 may be defined as 1 ms, and accordingly one frame 200 may include a total of 10 subframes 201. One slot 202 or 203 may be defined as 14 OFDM symbols (that is, the number symbols $N_{symb}^{slot}$ per slot=14). One subframe 201 may include one or a plurality of slots 202 and 203, and the number of slots 202 or 203 per subframe 201 may vary depending on a configuration value μ 204 or 205 for subcarrier spacing. FIG. 2 illustrates the case in which the subcarrier spacing configuration value 204 is μ=0 and the case in which the subcarrier spacing configuration value 205 is μ=1. One subframe 201 may include one slot 202 in the case of μ=0 204, and 1 subframe 201 may include 2 slots 203 in the case of μ=1 205. That is, the number ($N_{slot}^{subframe,\mu}$) of slots per subframe may vary depending on the configuration value (μ) for subcarrier spacing, and accordingly the number ($N_{slot}^{frame,\mu}$) of slots per frame may vary. The number ($N_{slot}^{subframe,\mu}$) and the number ($N_{slot}^{frame,\mu}$) according to the subcarrier spacing configuration value μ may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Figure 3:
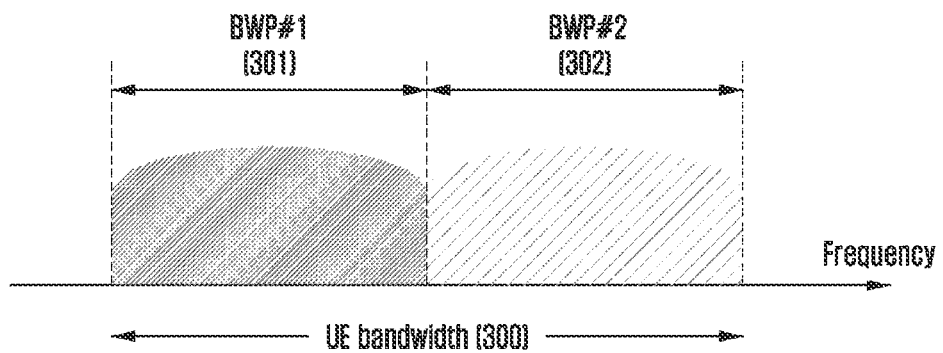
FIG. 3 illustrates an example of a configuration of a bandwidth part in a wireless communication system, according to an embodiment of the disclosure.

FIG. 3 illustrates an example of a configuration of a BWP in a wireless communication system, according to an embodiment of the disclosure.

Referring to FIG. 3, a UE bandwidth 300 is configured as two bandwidth parts, that is, BWP #1 301 and BWP #2 302. The BS may configure one or a plurality of BWPs in the UE, and the following information provided below in Table 2 may be configured to each BWP.

TABLE 2

| BWP ::= | SEQUENCE { |
|---|---|
| bwp-Id | BWP-Id, |
| (bandwidth part identifier) | |
| location AndBandwidth | INTEGER (1..65536), |
| (bandwidth part location) | |
| subcarrierSpacing | ENUMERATED {n0, n1, n2, n3, n4, n5}, |
| (subcarrier spacing) | |
| cyclicPrefix | ENUMERATED { extended } |
| (cyclic prefix) | |
| } | |

In [Table 2], "location AndBandwidth" indicates the location and bandwidth of the corresponding bandwidth part in the frequency domain, "subcarrierSpacing" indicates a subcarrier spacing to be used in the corresponding bandwidth part, and "cyclicPrefix" indicates whether to use an extended cyclic prefix (CP) with respect to the corresponding bandwidth part.

Of course, the disclosure is not limited to the aforementioned example, and various parameters related to a BWP as well as the configuration information may be configured in the UE. The information may be transmitted to the UE from the BS through higher-layer signaling, for example, radio resource control (RRC) signaling. Among one or a plurality of configured BWPs, at least one BSP may be activated. Information indicating whether to activate the configured BWPs may be semi-statically transferred from the BS to the UE through RRC signaling or may be dynamically transferred through the DCI.

According to some embodiments, the UE may receive a configuration of an initial BWP for initial access from the BS through a master information block (MIB) before the RRC connection. More specifically, the UE may receive configuration information for a CORESET and a search space in which a PDCCH for receiving system information (remaining system information (RMSI) or system information block 1 (SIB1)) required for initial access through the MIB can be transmitted in an initial access step. The control resource set and the search space configured as the MIB may be considered as an identity (ID) 0. The BS may inform the UE of configuration information such as frequency allocation information for control resource set #0, time allocation information, and numerology, through the MIB. Further, the BS may inform the UE of configuration information for a monitoring period and an occasion of control resource set #0, that is, configuration information for search space #0 through the MIB. The UE may consider a frequency region configured as control resource set #0 acquired from the MIB as an initial bandwidth part for initial access. At this time, the ID of the initial BWP may be considered as 0. The control resource set may be referred to as a control region, a control resource region, or the like.

The configuration for the BWP supported by the 5G system may be used for various purposes.

When a bandwidth supported by the UE is narrower than a system bandwidth, it may be supported through the BWP configuration. For example, the BS may configure a frequency location of the BWP in the UE, and thus the UE may transmit and receive data at a specific frequency location within the system bandwidth.

Further, in order to support different numerologies, the BS may configure a plurality of BWPs in the UE. For example, in order to support the UE to perform data transmission and reception using both subcarrier spacing of 15 kilohertz (kHz) and subcarrier spacing of 30 kHz, two BWPs may be configured as subcarrier spacings of 15 kHz and 30 kHz, respectively. Different BWPs may be frequency division-multiplexed, and when data is to be transmitted and received at specific subcarrier spacing, BWPs configured at the corresponding subcarrier spacing may be activated.

In order to reduce power consumption of the UE, the BS may configure BWPs having different sizes of bandwidths in the UE. When the UE supports a very large bandwidth, e.g., 100 MHz, but always transmits and receives data through the bandwidth, a very high power consumption may be generated. Particularly, monitoring an unnecessary downlink control channel through a large bandwidth of 100 MHz in the state in which there is no traffic is very inefficient from the aspect of power consumption. In order to reduce power consumption of the UE, the BS may configure a BWP having a relatively narrow bandwidth, e.g., 200 MHz. The UE may perform a monitoring operation in the bandwidth part of 200 MHz in the state in which there is no traffic, and if data is generated, may transmit and receive data through the bandwidth part of 100 MHz according to an instruction from the BS.

In a method of configuring the BWP, UEs before the RRC connection may receive configuration information for an initial bandwidth part through an MIB in an initial access step. More specifically, the UE may receive a configuration of a CORESET for a downlink control channel in which the DCI for scheduling an SIB can be transmitted from an MIB of a physical broadcast channel (PBCH). A bandwidth of the control resource set configured as the MIB may be considered as an initial bandwidth part, and the UE may receive a PDSCH, in which the SIB is transmitted, through the configured initial bandwidth part. The initial BWP may be used not only for reception of the SIB but also other system information (OSI), paging, or random access (RA).

[BWP Change]

When one or more BWPs are configured in the UE, the BS may indicate a change (or switching or transition) in the BWPs to the UE through a BWP indicator field within the DCI. For example, in FIG. 3, when a currently activated BWP of the UE is BWP #1 301, the BS may indicate BWP #2 302 to the UE through a BWP indicator within the DCI and the UE may make a BWP change to BWP #2 302 indicated by the received BWP indicator within the DCI.

As described above, since the DCI-based BWP change may be indicated by the DCI for scheduling the PDSCH or the PUSCH, the UE should be able to receive or transmit the PDSCH or the PUSCH scheduled by the corresponding DCI in the changed BWP without any difficulty if the UE receives a BWP change request. To this end, the standard has defined requirements for a delay time (TBWP) required for the BWP change, and may be defined as shown below in Table 3.

TABLE 3

| μ | NR Slot length (ms) | BWP switch delay TBWP (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1
Depends on UE capability.

Note 2
If the BWP switch involves changing of SCS, the BWP switch delay is determined by the larger one between the SCS before BWP switch and the SCS after BWP switch.

The requirements for the BWP change delay time may support type 1 or type 2 according to a UE capability. The UE may report a supportable BWP delay time type to the BS.

When the UE receives the DCI including a BWP change indicator in slot n according to the requirements for the BWP change delay time, the UE may complete a change to a new BWP indicated by the BWP change indicator at a time point that is not later than slot n+TBWP and transmit and receive a data channel scheduled by the corresponding DCI in the changed new BWP. When the BS desires to schedule a data channel in the new BWP, the BS may determine time domain resource allocation for the data cannel in consideration of the BWP change delay time (TBWP) of the UE. That is, when scheduling the data channel in the new BWP, the BS may schedule the corresponding data channel after the BWP change delay time using a method of determining the time domain resource allocation for the data channel. Accordingly, the UE may not expect that the DCI indicating the BWP change indicates a slot offset (K0 or K2) smaller than the BWP change delay time (TBWP).

If the UE receives the DCI indicating the BWP change (for example, DCI format 1_1 or 0_1), the UE may perform no transmission or reception during a time interval from a third symbol of a slot for receiving the PDCCH including the corresponding DCI to a start point of the slot indicated by the slot offset (K0 or K2) indicated through a time domain resource allocation field within the corresponding DCI. For example, when the UE receives the DCI indicating the BWP change in slot n and a slot offset value indicated by the corresponding DCI is K, the UE may perform no transmission or reception from the third symbol of slot n to a symbol before slot n+K (that is, the last symbol of slot n+K−1).

[Synchronization Signal (SS)/PBCH Block]

The synchronization signal/PBCH block may be a physical layer channel block including a primary synchronization signal (PSS), a secondary synchronization signal (SSS), and a PBCH. A detailed description thereof is made below.

PSS is a signal which is a reference of downlink time/frequency synchronization and provides some pieces of information of a cell ID.

SSS is a reference of downlink time/frequency synchronization and provides the remaining cell ID information which the PSS does not provide. In addition, the SSS serves as a reference signal for demodulation of a PBCH.

PBCH provides necessary system information required for transmitting and receiving a data channel and a control channel by the UE. The necessary system information may include search space-related control information indicating radio resource mapping information of the control channel and scheduling control information for a separate data channel for transmitting system information.

Synchronization signal/PBCH block includes a combination of PSS, SSS, and PBCH. One or a plurality of synchronization signal/PBCH blocks may be transmitted within a time of 5 ms, and each of the transmitted synchronization signal/PBCH blocks may be separated by an index.

The UE may detect the PSS and the SSS in an initial access stage and decode the PBCH. The UE may acquire an MIB from the PBCH and receive a configuration of CORESET #0 (corresponding to a control resource set having control resource set index 0) therefrom. The UE may monitor control resource set #0 on the basis of the assumption that the selected SS/PBCH block and a demodulation reference signal (DMRS) transmitted in control resource set #0 are quasi co-located (QCLed). The UE may receive system information through downlink control information transmitted in control resource set #0. The UE may acquire configuration information related to a random access channel (RACH) required for initial access from the received system information. The UE may transmit a physical RACH (PRACH) to the BS in consideration of the selected synchronization signal/PBCH block index, and the BS receiving the PRACH may acquire the synchronization signal/PBCH block index selected by the UE. The BS may know which block is selected by the UE from among the synchronization signal/PBCH blocks and that CORESET #0 related thereto is monitored.

[Related to PDCCH: DCI]

In the 5G system, scheduling information for uplink data (or a physical uplink data channel (a PUSCH)) or downlink data (or a physical downlink data channel (a PDSCH)) is transmitted from the BS to the UE through the DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field.

The DCI may be transmitted through a PDCCH via a channel coding and modulation process. A cyclic redundancy check (CRC) may be added to a DCI message payload and may be scrambled by a radio network temporary identifier (RNTI) corresponding to the identity of the UE. Depending on the purpose of the DCI message, for example, UE-specific data transmission, a power control command, or a random access response, different RNTIs may be used. That is, the RNTI is not explicitly transmitted but is included in a CRC calculation process to be transmitted. If the DCI message transmitted through the PDCCH is received, the UE may identify the CRC through the allocated RNTI, and may recognize that the corresponding message is transmitted to the UE when the CRC is determined to be correct on the basis of the CRC identification result.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying of a slot format indicator (SFI) may be scrambled by an SFI-RNTI. DCI for notifying of transmit power control (TPC) may be scrambled with a TPC-RNTI. DCI for scheduling a UE-specific PDSCH or PUSCH may be scrambled by a cell RNTI (C-RNTI).

DCI format 0_0 may be used for fallback DCI for scheduling a PUSCH in which case the CRC may be scrambled by a C-RNTI. DCI format 0_0 in which the CRC is scrambled by the C-RNTI may include, for example, the following information shown below in Table 4.

TABLE 4

Identifier for DCI formats- [1] bit

Frequency domain resource assignment-[[$\log_2(N_{RB}^{UL,BWP} (N_{RB}^{UL,BWP} + 1)/2$]] bits Time domain resource assignment- X bits Frequency hopping flag- 1 bit.

Modulation and coding scheme - 5 bits

New data indicator- 1 bit

Redundancy version- 2 bits

HARQ process number- 4 bits

Transmit power control (TPC) command for scheduled PUSCH - [2] bits

UL/supplementary UL (SUL) indicator - 0 or 1 bit

DCI format 0_1 may be used for non-fallback DCI for scheduling a PUSCH in which case the CRC may be scrambled by a C-RNTI. DCI format 0_1 in which the CRC is scrambled by the C-RNTI may include, for example, the following information shown below in Table 5.

TABLE 5

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP} + 1)/2) \rceil$ bits
Time domain resource assignment - 1, 2, 3, or 4 bits
Virtual resource block (VRB)-to-physical resource block (PRB) mapping - 0 or 1 bit, only for resource allocation type 1.

0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
$1^{st}$ downlink assignment index - 1 or 2 bits
1 bit for semi-static HARQ-ACK codebook;
2 bits for dynamic HARQ-ACK codebook with single HARQ-ACK codebook.
$2^{nd}$ downlink assignment index - 0 or 2 bits
2 bits for dynamic HARQ-ACK codebook with two HARQ-ACK sub-codebooks;
0 bit otherwise.
TPC command for scheduled PUSCH - 2 bits
SRS resource indicator $$\left\lceil \log_2\left( \sum_{k=1}^{L_{max}\Sigma} \binom{N_{SRS}}{k} ( ) \right) \square\square \right\rceil$$

$\lceil \log_2(N_{SRS}) \rceil$ bits $\left\lceil \log_2\left( \sum_{k=1}^{L_{max}\Sigma} \binom{N_{SRS}}{k} ( ) \right) \square\square \right\rceil$ bits for non-codebook based PUSCH transmission;
$\lceil \log_2(N_{SRS}) \rceil$ bits for codebook based PUSCH transmission.
Precoding information and number of layers - up to 6 bits
Antenna ports- up to 5 bits
SRS request - 2 bits
CSI request - 0, 1, 2, 3, 4, 5, or 6 bits
code block group (CBG) transmission information - 0, 2, 4, 6, or 8 bits
PTRS-DMRS association - 0 or 2 bits.
beta_offset indicator - 0 or 2 bits
DMRS sequence initialization - 0 or 1 bit DCI format 1_0 may be used for fallback DCI for scheduling a PDSCH in which case the CRC may be scrambled by a C-RNTI. DCI format 1_0 in which the CRC is scrambled by the C-RNTI may include, for example, the following information shown below in Table 6.

TABLE 6

Identifier for DCI formats - [1] bit
Frequency domain resource assignment -$\lceil \log_2(N_{RB}^{DL,BWP}(N_{RB}^{DL,BWP} + 1)/2) \rceil$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
Physical uplink control channel (PUCCH) resource indicator - 3 bits
PDSCH-to-HARQ feedback timing indicator- [3] bits DCI format 1_1 may be used for non-fallback DCI for scheduling a PDSCH in which case the CRC may be scrambled by a C-RNTI. DCI format 1_1 in which the CRC is scrambled by the C-RNTI may include, for example, the following information shown below in Table 7.

TABLE 7

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL,BWP}/P \rceil$ bits
For resource allocation type 1, $\lceil \log_2(N_{RB}^{DL,BWP} (N_{RB}^{DL,BWP} + 1)/2 \rceil$ ]bits
Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator - 0, 1, or 2 bits
Zero power (ZP) CSI- reference signal (RS) trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version 2 bits
HARQ process number - 4 bits
Downlink assignment index - 0, 2 or 4 bits
TPC command for scheduled PUCCH - 2 bits
PUCCH resource indicator - 3 bits
PDSCH-to-HARQ feedback timing indicator - 3 bits
Antenna ports - 4, 5 or 6 bits
Transmission configuration indication - 0 or 3 bits
SRS request - 2 bits TABLE 7-continued CBG transmission information - 0, 2, 4, 6, or 8 bits
CBG flushing out information - 0 or 1 bit
DMRS sequence initialization - 1 bit

[PDCCH: CORESET, REG, CCE, Search Space]

Figure 4:
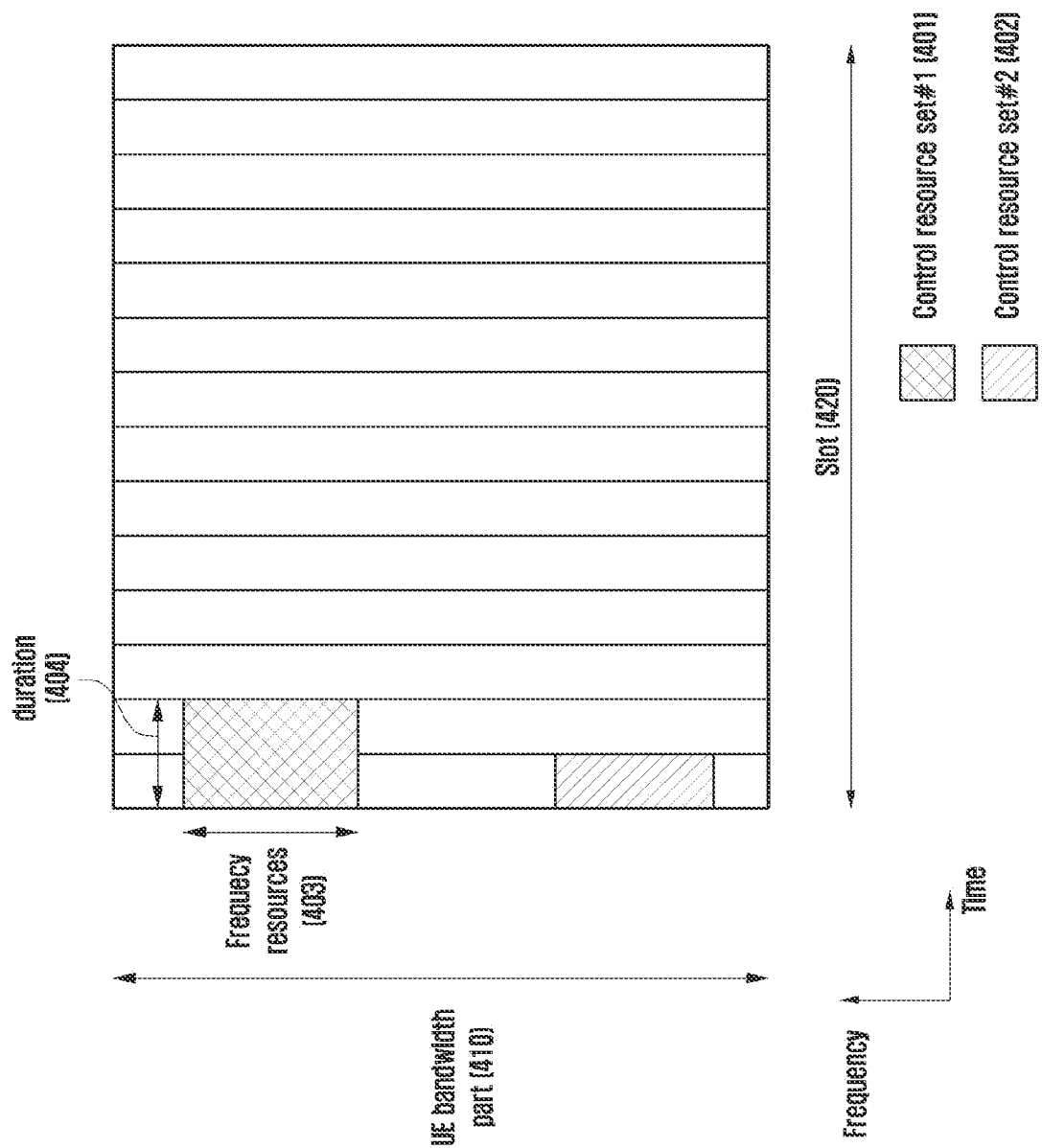
FIG. 4 illustrates an example of a configuration of a control resource set of a downlink control channel in a wireless communication system, according to an embodiment of the disclosure.

FIG. 4 illustrates an example of a control resource set (CORESET) in which a downlink control channel is transmitted in a wireless communication systems according to an embodiment of the disclosure.

FIG. 4 illustrates an example in which a UE bandwidth part 410 is configured in the frequency axis and control resource set #1 401 and control resource set #2 402 are configured within 1 slot 420 in the time axis. The control resource sets 401 and 402 may be configured in specific frequency resources 403 within a total UE BWP 410 in the frequency axis. In FIG. 4, the specific frequency resources 403 show an example of a frequency resource set in the control resource set #1 401. The control resource set may be configured as one or a plurality of OFDM symbols in the time axis, which may be defined as a control resource set duration 404. Referring to FIG. 4, control resource set #1 401 may be configured as a control resource set duration of 2 symbols, and control resource set #2 402 may be configured as a control resource set duration of 1 symbol.

The control resource sets in the 5G system may be configured through higher-layer signaling (for example, system information, a Master Information Block (MIB), or Radio Resource Control (RRC) signaling) delivered to the UE from the BS. Configuring the control resource set to the UE may mean providing information such as a control resource set identity, a frequency location of the control resource set, and a symbol length of the control resource set. For example, the configuration information for a CORESET may include following information as shown below in Table 8.

TABLE 8

```
ControlResourceSet ::=                        SEQUENCE {
    -- Corresponds to L1 parameter 'CORESET-ID'
    controlResourceSetId
    ControlResourceSetId,
    (control resource set Identity)
        frequency DomainResources             BIT STRING (SIZE
(45)),
    (frequency axis resource allocation information)
        duration                              INTEGER
(1..maxCoReSetDuration),
    (time axis resource allocation information)
    cce-REG-MappingType
    CHOICE {
    (CCE-to-REG mapping scheme)
        interleaved
        SEQUENCE {
            reg-BundleSize
        ENUMERATED {n2, n3, n6},
        (REG bundle size)
            precoderGranularity
        ENUMERATED {sameAsREG-bundle, allContiguousRBs},
            interleaverSize
        ENUMERATED {n2, n3, n6}
            (interleaver size)
            shiftIndex
        INTEGER(0..maxNrofPhysicalResourceBlocks-1)
                                              OPTIONAL
        (interleaver Shift)
    },
        nonInterleavedNULL
    },
    tci-StatesPDCCH
        SEQUENCE(SIZE (1..maxNrofTCI-StatesPDCCH)) OF TCI-StateId
```

TABLE 8-continued

```
                                              OPTIONAL,
(QCL configuration information)
    tci-PresentInDCI                          ENUMERATED
{enabled}
                    OPTIONAL,    -- Need S
}
```

In Table 8, tci-StatesPDCCH (referred to as a transmission configuration indication (TCI) state) configuration information may include information on one or a plurality of synchronization signal/PBCH block indexes or CSI-RS indexes having the quasi co-located (QCL) relationship with a DMRS transmitted in the corresponding CORESET.

Figure 5:
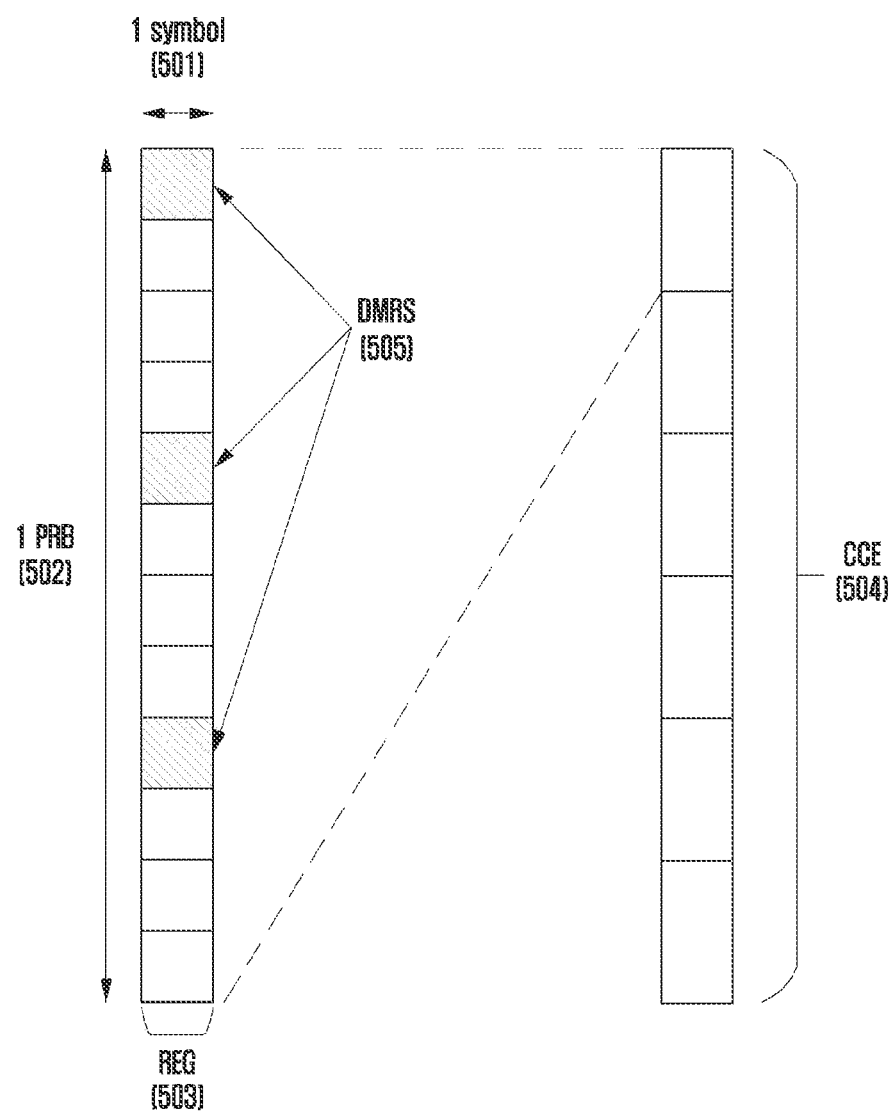
FIG. 5 illustrates a structure of a downlink control channel in a wireless communication system, according to an embodiment of the disclosure.

FIG. 5 illustrates an example of a basic unit of time and frequency resources included in a downlink control channel which can be used in a wireless communication system according to an embodiment of the disclosure.

Referring to FIG. 5, the basic unit of time and frequency resources included in the control channel may be a resource element group (REG) 503, and the REG 503 may be defined as 1 OFDM symbol 501 in the time axis and 1 PRB 502 in the frequency axis, that is, as 12 subcarriers. The BS may configure a downlink control channel allocation unit by concatenating the REGs 503.

As illustrated in FIG. 5, when the basic unit for allocation of the downlink control channel in the 5G system is a control channel eminent (CCE) 504, 1 CCE 504 may include a plurality of REGs 503. The REG 503 may include 12 REs and, when 1 CCE 504 includes 6 REGs 503, 1 CCE 504 may include 72 REs. When a downlink CORESET is configured, the corresponding area may include a plurality of CCEs 504, and a specific downlink control channel may be mapped to one or a plurality of CCEs 504 according to an aggregation level (AL) within the CORESET and then transmitted. CCEs 504 within the CORESET may be distinguished by numbers and the numbers of the CCEs 504 may be assigned according to a logical mapping scheme.

The basic unit of the downlink control channel illustrated in FIG. 5, that is, the REG 503, may include all of the REs to which the DCI is mapped and the areas to which DMRSs 505, which are reference signals for decoding the REs, are mapped. As illustrated in FIG. 5, 3 DMRSs 505 may be transmitted in 1 REG 503.

The number of CCEs required to transmit the PDCCH may be 1, 2, 4, 8, or 16 according to the aggregation level (AL), and the different number of CCEs may be used to implement link adaptation of the downlink control channel. For example, if AL=L, one downlink control channel may be transmitted through L CCEs. The UE should detect a signal in the state in which the UE does not know information on the downlink control channel, and a search space indicating a set of CCEs is defined to perform blind decoding in a wireless communication system (for example, 5G or NR system). The search space is a set of downlink control channel candidates including CCEs for which the UE should attempt decoding at the given aggregation level, and there are several aggregation levels at which one set of CCEs is configured by 1, 2, 4, 8, and 16 CCEs, so that the UE may have a plurality of search spaces. A search space set may be defined as a set of search spaces at all the configured aggregation levels.

The search space may be classified into a common search space and a UE-specific search space. UEs in a predetermined group or all UEs may search for a common search space of the PDCCH in order to receive cell-common control information such as dynamic scheduling for system information or paging messages. For example, PDSCH scheduling allocation information for transmission of an SIB including information on a service provider of a cell may be received by searching for (monitoring) a common search space of the PDCCH. In the case of the common search space, UEs in a predetermined group or all UEs should receive the PDCCH, so that the common-search space may be defined as a set of pre-arranged CCEs. Scheduling allocation information for the UE-specific PDSCH or PUSCH may be received by searching for a UE-specific search space of the PDCCH. The UE-specific search space may be UE-specifically defined as a UE identity and a function of various system parameters.

A parameter for a search space of a PDCCH in a wireless communication system (for example, a 5G or NR system) may be configured in the UE by the BS through higher-layer signaling (for example, SIB, MIB, or RRC signaling). For example, the BS may configure, to the UE, the number of PDCCH candidates at each aggregation level L, a monitoring period of the search space, a monitoring occasion in units of symbols within the slot for the search space, a search space type, that is, a common search space or a UE-specific search space, a combination of a DCI format and an RNTI to be monitored in the corresponding search space, and a control resource set index for monitoring the search space. For example, configuration information on a search space for PDCCH may include the following information shown below in Table 9.

TABLE 9

```
Search Space ::=                                                SEQUENCE {
       -- Identity of the search space. SearchSpaceId = 0 identifies the SearchSpace
   configured via PBCH (MIB) or ServingCellConfigCommon.
       searchSpaceId
       SearchSpaceId,
   (search space identifier)
       controlResourceSetId
       ControlResourceSetId,
   (control resource set identifier)
       monitoringSlotPeriodicityAndOffset                       CHOICE {
   (monitoring slot level period)
               sl1
               NULL,
               sl2
               INTEGER (0..1),
               sl4
               INTEGER (0..3),
               sl5
       INTEGER (0..4),
               sl8
               INTEGER (0..7),
               sl10
       INTEGER (0..9),
               sl16
       INTEGER (0..15),
               sl20
       INTEGER (0..19)
       }
       OPTIONAL,
       duration(monitoring length)                              INTEGER (2..2559)
       monitoringSymbolsWithinSlot                              BIT
   STRING (SIZE (14))
                                                                OPTIONAL,
   (monitoring symbol within slot)
       nrofCandidates
       SEQUENCE {
   (number of PDCCH candidates at each aggregation level)
               aggregationLevel1
       ENUMERATED {n0, n1, n2, n3, n4, n5, n6, n8},
               aggregationLevel2
       ENUMERATED {n0, n1, n2, n3, n4, n5, no, n8},
               aggregationLevel4
       ENUMERATED {n0, n1, n2, n3, n4, n5, n6, n8},
               aggregationLevel8
       ENUMERATED {n0, n1, n2, n3, n4, n5, n6, n8},
               aggregationLevel16
       ENUMERATED {n0, n1, n2, n3, n4, n5, n6, n8}
       },
       search Space Type                                        CHOICE {
       (search space type)
               -- Configures this search space as common search space (CSS) and DCI
   formats to monitor.
           Common
               SEQUENCE {
           (common search space)
       }
           ue-Specific
           SEQUENCE {
           (UE-specific search space)
```

TABLE 9-continued

-- Indicates whether the UE monitors in this USS for DCI formats
0-0 and 1-0 or for formats 0-1 and 1-1.
  Formats
    ENUMERATED {formats0-0-And-1-0, formats0-1-And-1-1},
  ...
}

The BS may configure one or a plurality of search space sets in the UE according to configuration information. In an embodiment, the BS may configure search space set 1 and search space set 2 to the UE. The BS may configure the UE to monitor DCI format A scrambled by an X-RNTI (e.g., a first RNTI) in the search space set 1 of the common search space and to monitor DCI format B scrambled by a Y-RNTI (e.g., a second RNTI) in the search space set 2 of the UE-specific search space. In the X-RNTI and Y-RNTI, "X" and "Y" may correspond to one of various RNTIs to be described later.

According to configuration information, one or a plurality of search space sets may exist in the common search space or the UE-specific search space. For example, search space set #1 and search space set #2 may be configured as common search spaces, and search space set #3 and search space set #4 may be configured as UE-specific search spaces.

In the common search space, the following combinations of DCI formats and RNTIs may be monitored. Of course, the disclosure is not limited to the following examples.

DCI format 0_0/1_0 with CRC scrambled by cell-RNTI (C-RNTI), configured scheduling (CS)-RNTI, semi-persistent (SP)-CSI-RNTI, RA-RNTI, temporary cell (TC)-RNTI, paging (P)-RNTI, and system information (SI)-RNTI;
DCI format 2_0 with CRC scrambled by SFI-RNTI;
DCI format 2_1 with CRC scrambled by interruption (INT)-RNTI;
DCI format 2_2 with CRC scrambled by TPC-PUSCH-RNTI and TPC. PUCCH-RNTI; and
DCI format 2_3 with CRC scrambled by TPC-SRS-RNTI.

In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI
DCI format 1_0/1_1 with CRC scrambled by C-RNTI, CS-RNTI, TC-RNTI The described RNTIs may follow the following definitions and uses.

C-RNTI: used for scheduling UE-specific PDSCH;
TC-RNTI: used for UE-specific PDSCH scheduling;
CS-RNTI: used for semi-statically configured UE-specific PDSCH scheduling;
RA-RNTI: used for PDSCH scheduling at random access stage;
P-RNTI: used for PDSCH scheduling through which paging is transmitted;
SI-RNTI: used for PDSCH scheduling through which system information is transmitted;
INT-RNTI: used for indicating whether puncturing is performed for PDSCH;
TPC for PUSCH RNTI (TPC-PUSCH-RNTI): used for indicating PUSCH power control command;
TPC for PUCCH RNTI (TPC-PUCCH-RNTI): used for indicating PUCCH power control command;
TPC for SRS RNTI (TPC-SRS-RNTI): used for indicating SRS power control command;

The DCI formats may follow the following definition shown below in Table 10.

TABLE 10

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

A control resource set p and a search space of an aggregation level L in a search space set s may be expressed as shown below in Equation 1.

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \mod \left\lfloor \frac{N_{CCE,p}}{L} \right\rfloor \right\} + i \quad \text{[Equation 1]}$$

L: aggregation level
$n_{CI}$: carrier index
$N_{CCE,p}$: total number of CCEs existing within control resource set p
$n_{s,f}^\mu$: slot index
$M_{s,max}^{(L)}$: number of PDCCH candidates at aggregation level L
$m_{s,n_{CI}}=0, \ldots, M_{s,max}^{(L)}-1$: index of PDCCH candidates at aggregation level L
i=0, ..., L−1
$Y_{p,n_{s,f}^\mu}=(A_p \cdot Y_{p,n_{s,f}^\mu-1}) \mod D$, $Y_{p,-1}=n_{RNTI}\neq 0$, $A_p=39827$ for pmod3=0, $A_p=39829$ for pmod3=1, $A_p=39839$ for pmod3=2, D=65537
$n_{RNTI}$: terminal identity For a common search space, a value of $Y_{p,n_{s,f}^\mu}$ corresponds to 0.

For a UE-specific search space, the value of $Y_{p,n_{s,f}^\mu}$ may correspond to a value varying depending on the terminal's identity (C-RNTI or ID configured for the terminal by the BS) and the time index.

In a 5G system, a set of search space sets monitored by the UE at every time point may vary as a plurality of search space sets can be configured as different parameters (for example, the parameters in Table 9). When search space set #1 is configured on an X-slot period, search space set #2 is configured on a Y-slot period, and X and Y are different from each other. The UE may monitor all of search space set #1 and search space set #2 in a specific slot and monitor one of search space set #1 and search space set #2 in another specific slot.

[Pdcch: Span]

The UE may report a UE capability in the case in which a plurality of PDCCH monitoring locations exist within the slot and, at this time, the concept "span" may be used. The span is consecutive symbols in which the UE can monitor a PDCCH within the slot, and each PDCCH monitoring location may be within 1 span. The span may be expressed by (X,Y), in which X refers to the minimum number of symbols which should be spaced apart between first symbols of two consecutive spans and Y refers to the number of consecutive symbols for monitoring a PDCCH within 1 span. At this time, the UE may monitor the PDCCH in a section within Y symbols from the first symbol of the span within the span.

Figure 6:
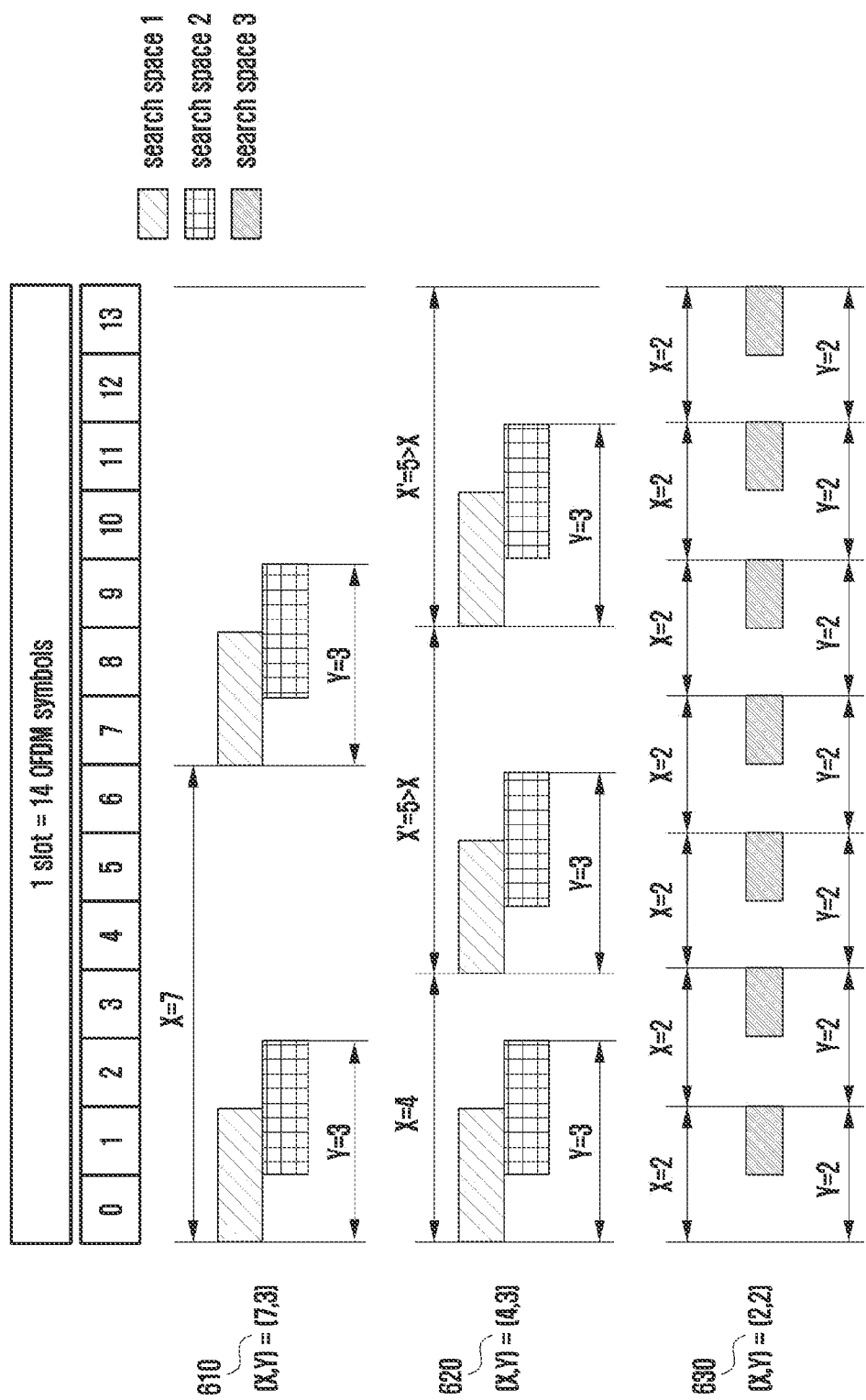
FIG. 6 illustrates a case in which the UE may have a plurality of physical downlink control channel (PDCCH) monitoring locations within a slot through a span in a wireless communication system, according to an embodiment of the disclosure.

FIG. 6 illustrates a case in which the UE may have a plurality of PDCCH monitoring locations within a slot through a span in a wireless communication system, according to an embodiment of the disclosure.

Referring to FIG. 6, the span is expressed by (X,Y)=(7,3), (4,3), and (2,2), and the three cases are expressed as 610, 620, and 630 in FIG. 6. For example, 610 indicates the case in which the number of spans which can be expressed by (7,3) is 2 is in the slot. An interval between first symbols of the two spans is expressed as X=7, a PDCCH monitoring location may exist within a total of Y=3 symbols from the first symbol of each span, and search spaces 1 and 2 exist within Y=3 symbols. In another example, 620 indicates the case in which a total number of spans which can be expressed by (4,3) is 3 is in the slot, and an interval between a second span and a third span is X'=5 symbols larger than X=4. 630 may indicate a case in which a total of 7 spans that can be expressed by (2,2) exist in a slot. In this case, PDCCH monitoring occasion may exist within a total of Y=2 symbols from the first symbol of each span, and search space 3 may exist within Y=2 symbols.

[PDCCH: UE Capability Reporting]

The slot location of the common search space and the UE-specific search space is indicated by a monitoringSymbolsWithinSlot parameter in Table 9, and the symbol location within the slot is indicated by a bitmap through a monitoringSymbolsWithinSlot parameter in Table 9, shown above. Meanwhile, the symbol location within the slot in which the UE can perform search space monitoring may be reported to the BS through the following UE capability.

UE capability 1 (hereinafter, referred to as "FG 3-1") may mean a capability to monitor the corresponding monitoring occasion (MO) if the corresponding MO is within first 3 symbols in the slot, when the number of MOs for type 1 and type 3 common search spaces or the UE-specific search spaces is 1 within the slot, as shown in Table 11. The UE capability 1 is a mandatory capability which all UEs supporting NR should support and whether to support the UE capability 1 is not explicitly reported to the BS.

TABLE 11

| Index | Feature group | Components | Field name in TS38.331 [2] |
|---|---|---|---|
| 3-1 | Basic DL control channel | 1) One configured CORESET per BWP per cell in addition to CORESET0<br>CORESET resource allocation of 6RB bit-map and duration of 1-3 OFDM symbols for FR1<br>For type 1 CSS without dedicated RRC configuration and for type 0, 0A, and 2 CSSs, CORESET resource allocation of 6RB bit-map and duration 1-3 OFDM symbols for FR2<br>For type 1 CSS with dedicated RRC configuration and for type 3 CSS, UE specific SS, CORESET resource allocation of 6RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled Scell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot<br>3) Monitoring DCI formats 0_0, 1 0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD | n/a |

TABLE 11-continued

| Index | Feature group | Components | Field name in TS38.331 [2] |
|---|---|---|---|
| | | 6) Processing one unicast DCI scheduling DL and 2 unicast DCI scheduling UL per slot per scheduled CC for TDD | |

UE capability 2 (hereinafter, referred to as "FG 3-2") may mean a capability to perform monitoring regardless of the start symbol location of the corresponding MO, when the number of MOs for the common search space or the UE-specific search space is one within the slot, as shown in Table 12. The UE capability can be optionally supported by the UE, and whether to support the capability is explicitly reported to the BS.

TABLE 12

| Index | Feature group | Components | Field name in TS 38.331 [2] |
|---|---|---|---|
| 3-2 | PDCCH monitoring on any span of up to 3 consecutive | For a given UE, all search space configurations are within the same span of 3 consecutive | pdcchMoni-toringSingleOccasion |

TABLE 12-continued

| Index | Feature group | Components | Field name in TS 38.331 [2] |
|---|---|---|---|
| | OFDM symbols of a slot | OFDM symbols in the slot | |

UE capability 3 (hereinafter, referred to as "FG 3-5", "FG 3-5a", "FG 3-5b") indicates a pattern of MOs which the UE can monitor, when the number of MOs for the common search space or the UE-specific search space is plural within the slot, as shown in Tables 13a and 13b below. The pattern includes an interval X between start symbols of different MOs and a maximum symbol length Y of one MO. A combination of (X,Y) supported by the UE may be one or more of {(2,2), (4,3), (7,3)}. The UE capability can be optionally supported by the UE, and whether to support the capability and the combination (X,Y) are explicitly reported to the BS.

TABLE 13a

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonitoringAnyOccasions { 3-5. withoutDCI-Gap 3-5a. withDCI-Gap } |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as 2OFDM symbols for 15 kHz 4OFDM symbols for 30 kHz 7OFDM symbols for 60 kHz with NCP 11OFDM symbols for 120 kHz Up to one unicast DL DCI and up to one unicast UL DCI in a monitoring occasion except for the monitoring occasions of FG 3-1. | |

TABLE 13a-continued

| Index | Feature group | Components | Field name in TS 38.331 [2] |
|---|---|---|---|
| | | In addition, for TDD the minimum separation between the first two UL unicast DCIs within the first 3 OFDM symbols of a slot can be zero OFDM symbols. | |

TABLE 13b

| | | |
|---|---|---|
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit may be satisfied by all spans. Every monitoring occasion is fully contained in one span. In order to determine a suitable span pattern, first a bitmap b(l), 0<=l<=13 is generated, where b(l)=1 if symbol l of any slot is part of a monitoring occasion, b(l)=0 otherwise. The first span in the span pattern begins at the smallest l for which b(l)=1. The next span in the span pattern begins at the smallest l not included in the previous span(s) for which b(l)=1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span: Processing one unicast DCI scheduling DL and one unicast DCI scheduling UL per scheduled CC across this set of monitoring occasions for FDD Processing one unicast DCI scheduling DL and two unicast DCI scheduling UL per scheduled CC across this set of monitoring occasions for TDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among values reported by UE). The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in Scell. | |

The UE may report whether to support UE capability 2 and/or UE capability 3 and a relevant parameter to the BS. The BS may allocate time axis resources for the common search space and the UE-specific search space on the basis of the UE capability. In the resource allocation, the BS may not place the MO at the location at which the UE cannot perform monitoring.

[Pdcch: Bd/Cce Limit]

If a plurality of search space sets are configured to the UE, a method of determining a search space set which the UE should monitor may be based on "condition 1" and "condition 2".

If the UE receives a configuration of a value of monitoringCapabilityConfig-r16 which is higher-layer signaling as r15monitoringcapability, the UE defines the number of PDCCH candidates which can be monitored and a maximum value for the number of CCEs included in entire search spaces (indicating a set of entire CCE sets corresponding to a union area of a plurality of search space sets). When the UE receives a configuration of a value of monitoringCapabilityConfig-r16 as r16monitoringcapability, the UE may define the number of PDCCH candidates which can be monitored and a maximum value for the number of CCEs included in entire search spaces (indicating entire CCE sets corresponding to a union area of a plurality of search space sets) for each span. The monitoringCapabilityConfig-r16 may refer to the configuration information of [Table 14a] and [Table 14b] below.

TABLE 14A

| PDCCH-Config information element |
|---|
| -- ASNISTART |
| -- TAG-PDCCH-CONFIG-START |
| PDCCH-Config ::=                       SEQUENCE { |
|     controlResourceSetToAddModList                SEQUENCE(SIZE (1..3)) OF ControlResourceSet     OPTIONAL,   -- Need N |
|     controlResourceSetToReleaseList               SEQUENCE(SIZE (1..3)) OF ControlResourceSetId   OPTIONAL,   -- Need N |
|     searchSpacesToAddModList                      SEQUENCE(SIZE (1 .. 10)) OF SearchSpace   OPTIONAL,   -- Need N |
|     search Spaces ToReleaseList                   SEQUENCE(SIZE (1 .. 10)) OF SearchSpaceId   OPTIONAL,   -- Need N |
|     downlinkPreemption                            SetupRelease { DownlinkPreemption }   OPTIONAL,   -- Need M |
|     tpc-PUSCH                                     SetupRelease { PUSCH-TPC-CommandConfig }   OPTIONAL,  -- Need M |
|     tpc-PUCCH                                     SetupRelease { PUCCH-TPC-CommandConfig }   OPTIONAL, - Need M |
|     tpc-SRS                                       SetupRelease { SRS-TPC-CommandConfig}   OPTIONAL,   -- Need M |
|     ..., |
|     [[ |
|     controlResourceSetToAddModListSizeExt-v1610   SEQUENCE (SIZE (1.2)) OF ControlResourceSet   OPTIONAL, -- Need N |
| controlResourceSetToReleaseListSizeExt-r16        SEQUENCE (SIZE (1 .. 5)) OF ControlResourceSetId-r16   OPTIONAL, ~~ Need N |
| searchSpacesToAddModListExt-r16                   SEQUENCE(SIZE (1 .. 10)) OF SearchSpaceExt-r16   OPTIONAL, - Need N |
| uplinkCancellation-r16                            SetupRelease { UplinkCancellation-r16 } OPTIONAL, ~- Need M |
| monitoringCapabilityConfig-r16                    ENUMERATED r15monitoringcapability,r16monitoringcapability } OPTIONAL, -- Need M |
| searchSpaceSwitchConfig-r16                       SearchSpaceSwitchConfig-r16 OPTIONAL -- Need R |
| SearchSpaceSwitchConfig-r16 ::=                   SEQUENCE { |
| (1 .. 4)) OF |
| cellGroupsForSwitchList-r16                       SEQUENCE(SIZE (1 .. 4)) OF CellGroupForSwitch-r16   OPTIONAL, -- Need R |
| search SpaceSwitchDelay-r16                       INTEGER (10 .. 52) OPTIONAL -- Need R |
| } |
| CellGroupForSwitch-r16 ::=                        SEQUENCE(SIZE (1 .. 16)) OF ServCellIndex |
| ~~ TAG-PDCCH-CONFIG-STOP |
| - ASNISTOP |

TABLE 14b

| PDCCH-Config field descriptions |
|---|
| controlResourceSetToAddModList, controlResourceSetToAddModListSizeExt List of UE specifically configured Control Resource Sets (CORESETs) to be used by the UE. The network restrictions on configuration of CORESETs per DL BWP are specified in TS 38.213 [13], clause 10.1 and TS 38.306 [26]. The UE may consider entries in controlResourceSetToAddModList and in controlResourceSetToAddModListSizeExt as a single list, i.e. an entry created using controlResourceSetToAddModList can be modified using controlResourceSetToAddModListSizeExt (or deleted using controlResourceSetToReleaseListSizeExt) and vice-versa. In case network reconfigures control resource set with the same ControlResourceSetId as used for commonControlResourceSet configured via PDCCH-ConfigCommon, the configuration from PDCCH-Config always takes precedence and should not be updated by the UE based on servingCellConfigCommon. |
| controlResourceSetToReleaseList, controlResourceSetToReleaseListSizeExt List of UE specifically configured Control Resource Sets (CORESETs) to be released by the UE. This field only applies to CORESETs configured by controlResourceSetToAddModList or controlResourceSetToAddModListSizeExt and does not release the field commonControlResourceSet configured by PDCCH-ConfigCommon. |

TABLE 14b-continued

PDCCH-Config field descriptions downlinkPreemption
Configuration of downlink preemption indications to be monitored in this cell (see TS
38.213 [13], clause 11.2).
monitoringCapabilityConfig
Configures either Rel-15 PDCCH monitoring capability or Rel-16 PDCCH
monitoring capability for PDCCH monitoring on a serving cell. Value
r15monitoringcapablity enables the Rel-15 monitoring capability, and value
r16monitoringcapablity enables the Rel-16 PDCCH monitoring capability (see TS
38.213 [13], clause 10.1).
searchSpacesToAddModList, searchSpaces ToAddModListExt
List of UE specifically configured Search Spaces. The network configures at most 10
Search Spaces per BWP per cell (including UE-specific and common Search Spaces).
If the network includes searchSpaceToAddModListExt, it includes the same number
of entries, and listed in the same order, as in search SpacesToAddModList.
tpc-PUCCH
Enable and configure reception of group TPC commands for PUCCH.
tpc-PUSCH
Enable and configure reception of group TPC commands for PUSCH.
tpc-SRS
Enable and configure reception of group TPC commands for SRS.
uplinkCancellation
Configuration of uplink cancellation indications to be monitored in this cell (see TS
38.213 [13], clause 11.2A).

[Condition 1: Limit on a Maximum Number of PDCCH Candidates]

In a cell in which subcarrier spacing is configured as $15 \cdot 2\mu$ kHz, the maximum number $M^\mu$ of PDCCH candidates which the UE can monitor according to the configuration value of higher-layer signaling, as described above, follows Table 15a, shown below, when the maximum number of PDCCH candidates $M^\mu$ is defined on the basis of a slot or Table 15b, shown below, when the maximum number $M^\mu$ of PDCCH candidates is defined on the basis of a span.

TABLE 15A

| $\mu$ | Maximum number of PDCCH candidates per slot and per serving cell ($M\mu$) |
|---|---|
| 0 | 44 |
| 1 | 36 |
| 2 | 22 |
| 3 | 20 |

TABLE 15b

| | Maximum number $M\mu$ of monitored PDCCH candidates per span for combination (X,Y) and per serving cell | | |
|---|---|---|---|
| $\mu$ | (2, 2) | (4, 3) | (7, 3) |
| 0 | 14 | 28 | 44 |
| 1 | 12 | 24 | 36 |

[Condition 2: Limit on a Maximum Number of CCEs]

In a cell in which subcarrier spacing is configured as $15 \cdot 2\mu$ kHz, the maximum number of CCEs included in the entire search spaces (indicating a set of entire CCE sets corresponding to a union area of a plurality of search space sets) according to the configuration value of higher-layer signaling, as described above, follows Table 16a when the maximum number $C^\mu$ of CCEs is defined on the basis of a slot or Table 16b, shown below, when the maximum number $C^\mu$ of CCEs is defined on the basis of a span.

TABLE 16a

| $\mu$ | Maximum number of non-overlapped CCEs per slot and per serving cell ($C\mu$) |
|---|---|
| 0 | 56 |
| 1 | 56 |
| 2 | 48 |
| 3 | 32 |

TABLE 16b

| | Maximum number Cu of non-overlapped CCEs per span for combination (X,Y) and per serving cell | | |
|---|---|---|---|
| $\mu$ | (2, 2) | (4, 3) | (7, 3) |
| 0 | 18 | 36 | 56 |
| 1 | 18 | 36 | 56 |

For convenience of description, a situation satisfying both conditions 1 and 2 at a specific time point is defined as "condition A". Accordingly, not satisfying condition A may mean that at least one of conditions 1 and 2 is not satisfied.

[PDCCH: Overbooking]

Condition A may not be satisfied at a specific time point according to a configuration of search space sets by the BS. If condition A is not satisfied at a specific time point, the UE may select and monitor only some of the search space sets configured to satisfy condition A at the corresponding time point, and the BS may transmit the PDCCH through the selected search space sets.

The following method may be applied as a method of selecting some of the configured search space sets.

If condition A for the PDCCH is not satisfied at a specific time point (slot), the UE (or the BS) may select a search space set of which a search space type is configured as a common-search space among search space sets existing at the corresponding time point in preference to a search space set of which a search space type is configured as a UE-specific search space.

If search space sets configured as the common-search space are all selected (that is, if condition A is satisfied even after all search spaces configured as the common-search space are selected), the UE (or BS) may select search space sets configured as the UE-specific search space. At this time, if the number of search space sets of configured as the UE-specific search space is plural, a search space set having a lower search space set index may have a higher priority. UE-specific search space sets may be selected within a range in which condition A is satisfied in consideration of the priority.

[Qcl, Tci State]

In the wireless communication system, one or more different antenna ports (or one or more channels, signals, and combinations thereof, but commonly referred to as different antenna ports for convenience of description) may be associated by a QCL configuration shown in Table 17, below. The TCI state is to indicate a QCL relation between a PDCCH (or a PDCCH DMRS) and another RS or channel, and a reference antenna port A (e.g., reference RS #A) and another purpose antenna port B (e.g., target RS #B) which are QCLed means that the UE is allowed to apply some or all of large-scale channel parameters estimated in the antenna port A to channel measurement from the antenna port B. The QCL is required to associate different parameters according to conditions, such as time tracking influenced by average delay and delay spread, frequency tracking influenced by Doppler shift and Doppler spread, radio resource management (RRM) influenced by an average gain, and beam management (BM) influenced by a spatial parameter. Accordingly, NR supports four types of QCL relations shown in Table 17, below.

TABLE 17

| QCL type | Large-scale characteristics |
| --- | --- |
| A | Doppler shift, Doppler spread, average delay, delay spread |
| B | Doppler shift, Doppler spread |
| C | Doppler shift, average delay |
| D | Spatial Rx parameter |

A spatial Rx parameter may refer to some or all of an angle of arrival (AoA), a power angular spectrum (PAS) of AoA, an angle of departure (AoD), a PAS of AoD, a transmission/reception channel correlation, transmission/reception beamforming, and a spatial channel correlation.

The QCL relation can be configured in the UE through RRC parameter TCI-state and QCL-Info as shown in Table 18, below. Referring to Table 18 below, the BS may configure one or more TCI states in the UE and inform the UE of a maximum of two QCL relations (QCL-Type 1 and QCL-Type 2) for an RS referring to an ID of the TCI state, that is, a target RS. At this time, each piece of the QCL information (QCL-Info) included in the TCI state includes a serving cell index and a BWP index of a reference RS indicated by the corresponding QCL information, a type, and an ID of the reference RS, and the QCL type as shown in Table 17, above.

TABLE 18

```
TCI-State ::=                                             SEQUENCE {
        tci-StateId                                           TCI-StateId,
        (ID of corresponding TCI state)
        qcl-Type1                                             QCL-Info,
        (QCL information of first reference RS of RS (target RS) referring to corresponding
TCI state ID)
        qcl-Type2                                             QCL-Info
                                    OPTIONAL, -- Need R
        (QCL information of second reference RS of RS (target RS) referring to corresponding
TCI state ID)
        ...
}
QCL-Info ::=                                              SEQUENCE {
        cell
        ServCellIndex                      OPTIONAL,        -- Need R
        (serving cell index of reference RS indicated by corresponding QCL information)
        bwp-Id                                                BWP-Id
                                    OPTIONAL, - Cond CSI-RS-Indicated
        (BWP index of reference RS indicated by corresponding QCL information)
        referenceSignal                                       CHOICE {
                csi-rs
        NZP-CSI-RS-ResourceId,
                ssb
        SSB-Index
                (one of CSI-RSI ID or SSB ID indicated by corresponding QCL information)
        },
        qcl-Type                                              ENUMERATED
{typeA, typeB, typeC, typeD},
        ...
```

Figure 7:
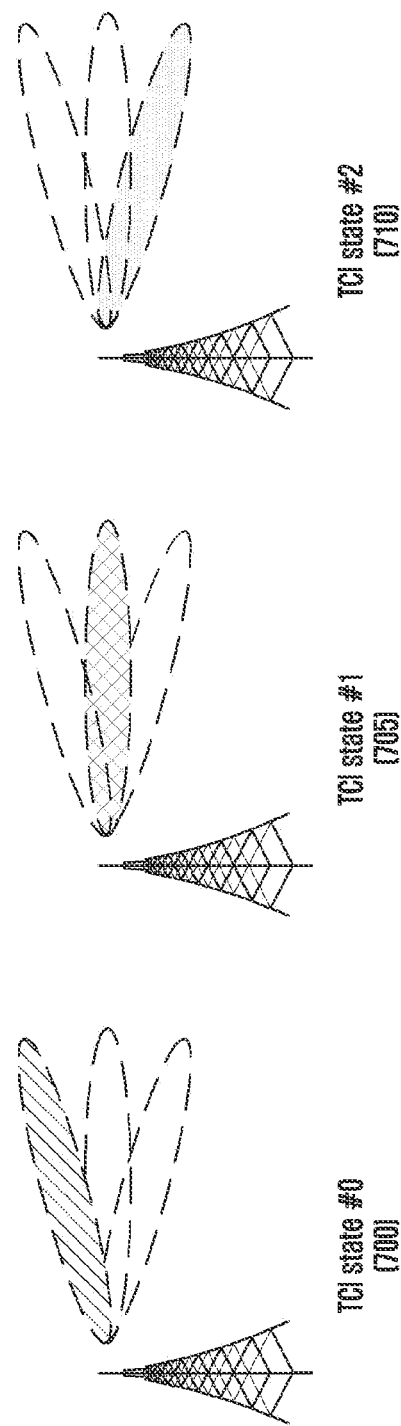
FIG. 7 illustrates an example of BS beam allocation according to a transmission configuration indication (TCI) state configuration in a wireless communication system, according to an embodiment of the disclosure.

FIG. 7 illustrates an example of BS beam allocation according to a TCI state configuration in a wireless communication system, according to an embodiment of the disclosure.

Referring to FIG. 7, the BS may transmit information on N different beams to the UE through N different TCI states. The N represents the number of beams or the number of TCI states. For example, when N=3 as illustrated in FIG. 7, the BS may notify that a qcl-Type 2 parameter included in three TCI states 700, 705, and 710 is associated with a CSI-RS or SSB corresponding to different beams to be configured as QCL type D and antenna ports referring to the different TCI states 700, 705, and 710 are associated with different spatial Rx parameters, that is, different beams.

Table 19a to Table 19e, below, show valid TCI state configurations according to the target antenna port type.

Table 19a shows valid TCI state configurations when the target antenna port is a CSI-RS for tracking (TRS). The TRS is an NZP CSI-RS for which a repetition parameter is not configured and trs-Info is configured as true among CSI-RSs. The third configuration in Table 19a may be used for an aperiodic TRS.

TABLE 19A

| Valid TCI state Configuration | DL RS 1 | qcl-Type 1 | DL RS 2 (if configured) | qcl-Type 2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 19b shows valid TCI state configurations when the target antenna port is a CSI-RS for CSI. The CSI-RS for CSI is an NZP CSI-RS for which a parameter (for example, a repetition parameter) indicating repetition is not configured and trs-Info is not configured as true among the CSI-RSs.

TABLE 19b

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 19c shows valid TCI state configurations when the target antenna port is a CSI-RS for BM (that is, the same meaning as a CSI-RS for L1 RSRP reporting). The CSI-RS for BM is an NZP CSI-RS for which a repetition parameter is configured to have a value of on or off and trs-Info is not configured as true.

TABLE 19c

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH | QCL-TypeC | SS/PBCH block | QCL-TypeD |

Table 19d shows valid TCI state configurations when the target antenna port is a PDCCH DMRS.

TABLE 19d

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 19e shows valid TCI state configurations when the target antenna port is a PDCCH DMRS.

TABLE 19e

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In a representative QCL configuration method by Table 19a to Table 19e, the target antenna port and the reference antenna port for each step are configured and operated as "SSB"⇒"TRS"⇒"CSI-RS for CSI, CSI-RS for BM, PDCCH DMRS, or PDSCH DMRS". Through this, it is possible to help the reception operation of the UE by linking the statistical characteristics that can be measured from the SSB and the TRS to each antenna port.

The configuration information of trs-Info related to the NZP CSI-RS may refer to [Table 20a] and [Table 20b] below.

TABLE 20a

NZP-CSI-RS-ResourceSet information element

```
-- ASN1START
-- TAG-NZP-CSI-RS-RESOURCESET-START
NZP-CSI-RS-ResourceSet ::=        SEQUENCE {
    nzp-CSI-ResourceSetId             NZP-CSI-RS-ResourceSetId,
    nzp-CSI-RS-Resources              SEQUENCE (SIZE
(1..maxNrofNZP-CSI-RS-ResourcesPerSet)) OF
NZP-CSI-RS-ResourceId,
    repetition                         ENUMERATED { on, off }
OPTIONAL,      -- Need S
    aperiodic TriggeringOffset         INTEGER(0..6)
OPTIONAL,      -- Need S
    trs-Info                           ENUMERATED {true}
OPTIONAL,      -- Need R
    ...,
    [[
    aperiodic TriggeringOffset-r16     INTEGER(0..31)
OPTIONAL      -- Need S
    ]]
}
-- TAG-NZP-CSI-RS-RESOURCESET-STOP
-- ASN1STOP
```

TABLE 20b

NZP-CSI-RS-ResourceSet field descriptions aperiodicTriggeringOffset, aperiodic TriggeringOffset-r16

Offset X between the slot containing the DCI that triggers a set of aperiodic NZP CSI-RS resources and the slot in which the CSI-RS resource set is transmitted. For aperiodicTriggeringOffset, the value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. For aperiodicTriggeringOffset-r16, the value indicates the number of slots. The network configures only one of the fields. When neither field is included, the UE applies the value 0.

nzp-CSI-RS-Resources

NZP-CSI-RS-Resources associated with this NZP-CSI-RS resource set (see TS 38.214 [19], clause 5.2). For CSI, there are at most 8 NZP CSI RS resources per resource set.

repetition

Indicates whether repetition is on/off. If the field is set to off or if the field is absent, the UE may not assume that the NZP-CSI-RS resources within the resource set are transmitted with the same downlink spatial domain transmission filter (see TS 38.214 [19], clauses 5.2.2.3.1 and 5.1.6.1.2). It can only be configured for CSI-RS resource sets which are associated with CSI-ReportConfig with report of L1 RSRP, L1 SINR or "no report".

trs-Info

Indicates that the antenna port for all NZP-CSI-RS resources in the CSI-RS resource set is same. If the field is absent or released the UE applies the value false (see TS 38.214 [19], clause 5.2.2.3.1).

[Pdcch: Tci State]

TCI state combinations which can be applied to the PDCCH DMRS antenna port may be as shown in Table 21, below. In Table 21, a fourth row is a combination assumed by the UE before the RRC configuration, and configurations after RRC are unfeasible.

TABLE 21

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
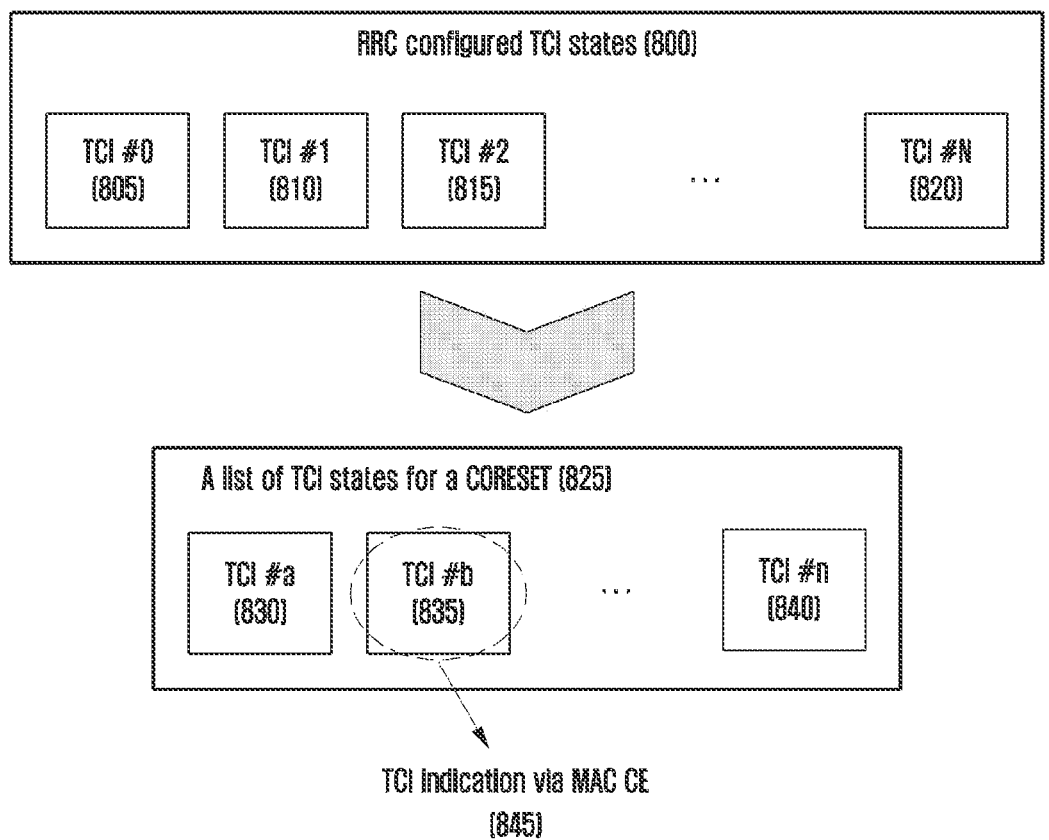
FIG. 8 illustrates an example of a method of allocating TCI states for a PDCCH in a wireless communication system, according to an embodiment of the disclosure.

In the NR system, a hierarchical signaling method as illustrated in FIG. 8 is supported for dynamic allocation for a PDCCH beam.

FIG. 8 illustrates an example of a method of allocating TCI states for a PDCCH in a wireless communication system, according to an embodiment of the disclosure.

Referring to FIG. 8, the BS may configure N TCI states 805, 810, 815 . . . , 820 in the UE through RRC signaling 800 and configure some thereof as TCI states for the CORESET as indicated by reference numeral 825. Thereafter, the BS may indicate one of the TCI states 830, 835, and 840 for the CORESET to the UE through MAC CE signaling as indicated by reference numeral 845. Subsequently, the UE may receive a PDCCH on the basis of beam information included in the TCI states indicated by the MAC CE signaling.

Figure 9:
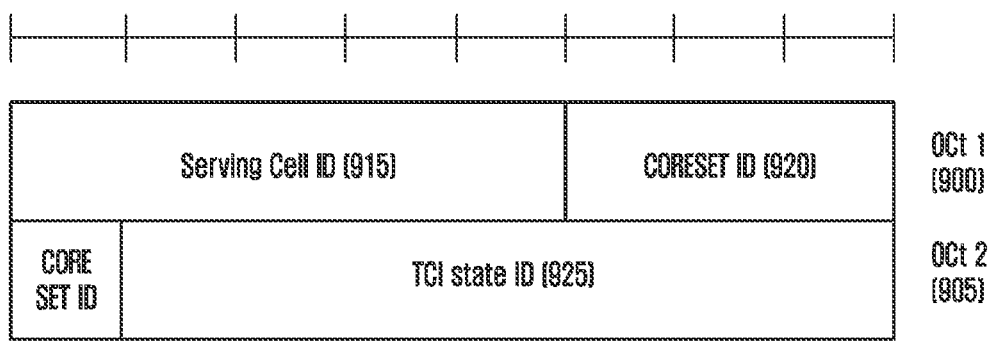
FIG. 9 illustrates a TCI indication medium access control (MAC) control element (CE) signaling structure for a PDCCH demodulation reference signal (DMRS) in a wireless communication system, according to an embodiment of the disclosure.

FIG. 9 illustrates a TCI indication MAC CE indication signaling structure for a PDCCH DMRS in a wireless communication system according to an embodiment of the disclosure.

Referring to FIG. 9, TCI indication MAC CE signaling for the PDCCH DMRS may consist of 2 bytes (16 bits, i.e., octet 1, 900 and octet 2, 905), and may include a serving cell ID 915 of 5 bits, a CORESET ID 920 of 4 bits, and a TCI state ID 925 of 7 bits.

Figure 10:
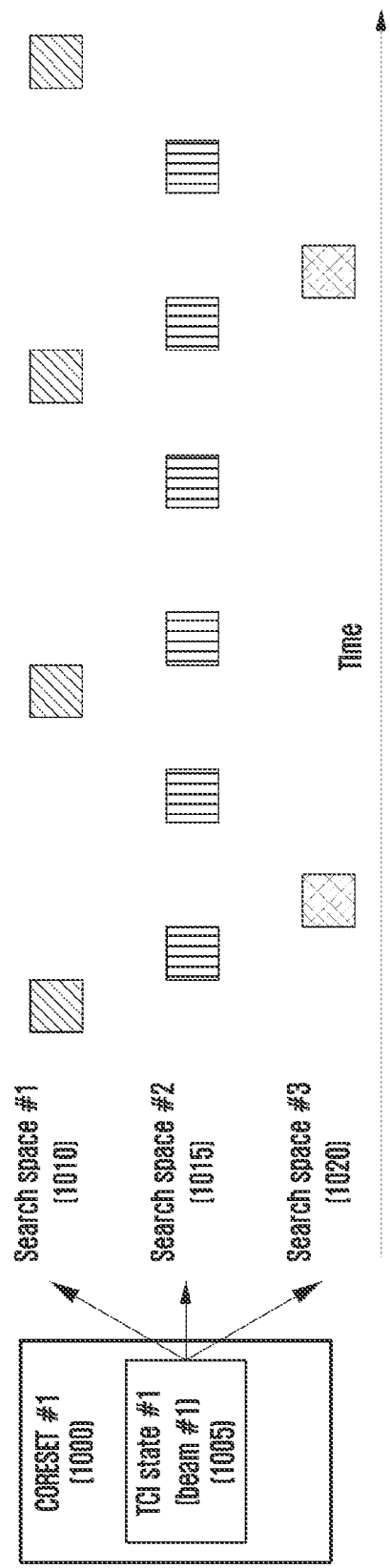
FIG. 10 illustrates an example of a beam configuration for a control resource set (CORESET) and a search space in a wireless communication system, according to an embodiment of the disclosure.

FIG. 10 illustrates an example of a beam configuration for a CORESET and a search space in a wireless communication system, according to an embodiment of the disclosure.

Referring to FIG. 10, the BS may indicate one of the TCI state list included in the configuration of a CORESET 1000 through MAC CE signaling as indicated by reference numeral 1005. Thereafter, before another TCI state is indicated to the corresponding CORESET through different MAC CE signaling, the UE may consider that the same QCL information (beam #1) 1005 is applied to one or more search spaces 1010, 1015, and 1020 associated with the CORESET. The PDCCH beam allocation method has difficulty indicating a beam change earlier than a MAC CE signaling delay and has a disadvantage of applying the same beam to all CORESETs regardless of a search space characteristic, and thus causes flexible PDCCH beam operation to be difficult.

Hereinafter, embodiments of the disclosure provide a more flexible PDCCH beam configuration and operation method. Hereinafter, in describing an embodiment of the disclosure, several distinct examples are provided for convenience of explanation, but the illustrated embodiments are not mutually exclusive and two or more embodiments may be appropriately combined and applied according to situations.

The BS may configure one or a plurality of TCI states for a specific CORESET in the UE and activate one of the configured TCI states through a MAC CE activation command. For example, {TCI state #0, TCI state #1, TCI state #2} are configured in CORESET #1 as the TCI states, and the BS may transmit a command for activating TCI state #0 assumed as the TCI state for CORESET #1 to the UE through the MAC CE. The UE may correctly receive a DMRS of the corresponding CORESET on the basis of QCL information within the activated TCI state by means of the activation command for the TCI state received through the MAC CE.

When the UE does not receive the MAC CE activation command for the TCI state of CORESET #0 for the CORESET having an index of 0, the UE may assume that a DMRS transmitted in CORESET #0 is QCLed with an SS/PBCH block identified in an initial access process or a non-contention-based random access process which is not triggered by a PDCCH command.

When the UE does not receive a configuration of the TCI state for CORESET #X or the UE receives the configuration of one or more TCI states but does not receive a MAC CE activation command for activating one thereof, the UE may assume that a DMRS transmitted in CORESET #X is QCLed with an SS/PBCH block identified in an initial access process.

[PDCCH: Related to QCL Prioritization Rule]

Hereinafter, an operation for determining a QCL priority for a PDCCH is described in detail.

When the UE operates with carrier aggregation in a single or band and a plurality of control resource sets existing within an activated BWP in a single cell or a plurality of cells overlap in the time while having the same or different QCL-TypeD characteristics in a specific PDCCH monitoring occasion, the UE may select a specific control resource set according to a QCL priority determination operation and monitor control resource sets having the same QCL-TypeD characteristic as the corresponding control resource set. That is, a plurality of control resource sets overlap in the time, only one QCL-TypeD characteristic may be received. At this time, a reference to determining the QCL priority is described below.

Reference 1. a control resource set connected to a common search space having the lowest index within a cell corresponding to the lowest index among cells including the common search space Reference 2. a control resource set connected to a UE-specific search space having the lowest index in a cell corresponding to the lowest index among cells including the UE-specific search space As described above, when the corresponding references are not satisfied, the following reference is applied. For example, when control resource sets overlap in the time in a specific PDCCH monitoring section, if all control resource sets are connected to a UE-specific search space without being connected to a common search space, that is, if reference 1 is not satisfied, the UE may omit applying of reference 1 and apply reference 2.

When the control resource set is selected by the references, the UE may additionally consider two matters below for QCL information configured in the control resource set. First, when control resource set 1 has CSI-RS 1 as a reference signal having the relation of QCL-TypeD, a reference signal having the relation of QCL-TypeD with CSI-RS 1 is SSB1, and a reference signal having the relation of QCL-TypeD with control resource set 2 is SSB1, the UE may consider that two control resource sets 1 and 2 have different QCL-TypeD characteristics. Second, when control resource set 1 has CSI-RS 1 configured in cell 1 as a reference signal having the relation of QCL-TypeD, a reference signal having the relation of QCL-TypeD with CSI-RS1 is SSB1, control resource set 2 has CSI-RS 2 configured in cell 2 as a reference signal having the relation of QCL-TypeD, and a reference signal having the relation of QCL-TypeD with CSI-RS 2 is SSB 1, the UE may consider that the two control resource sets have the same QCL-TypeD characteristic.

Figure 11:
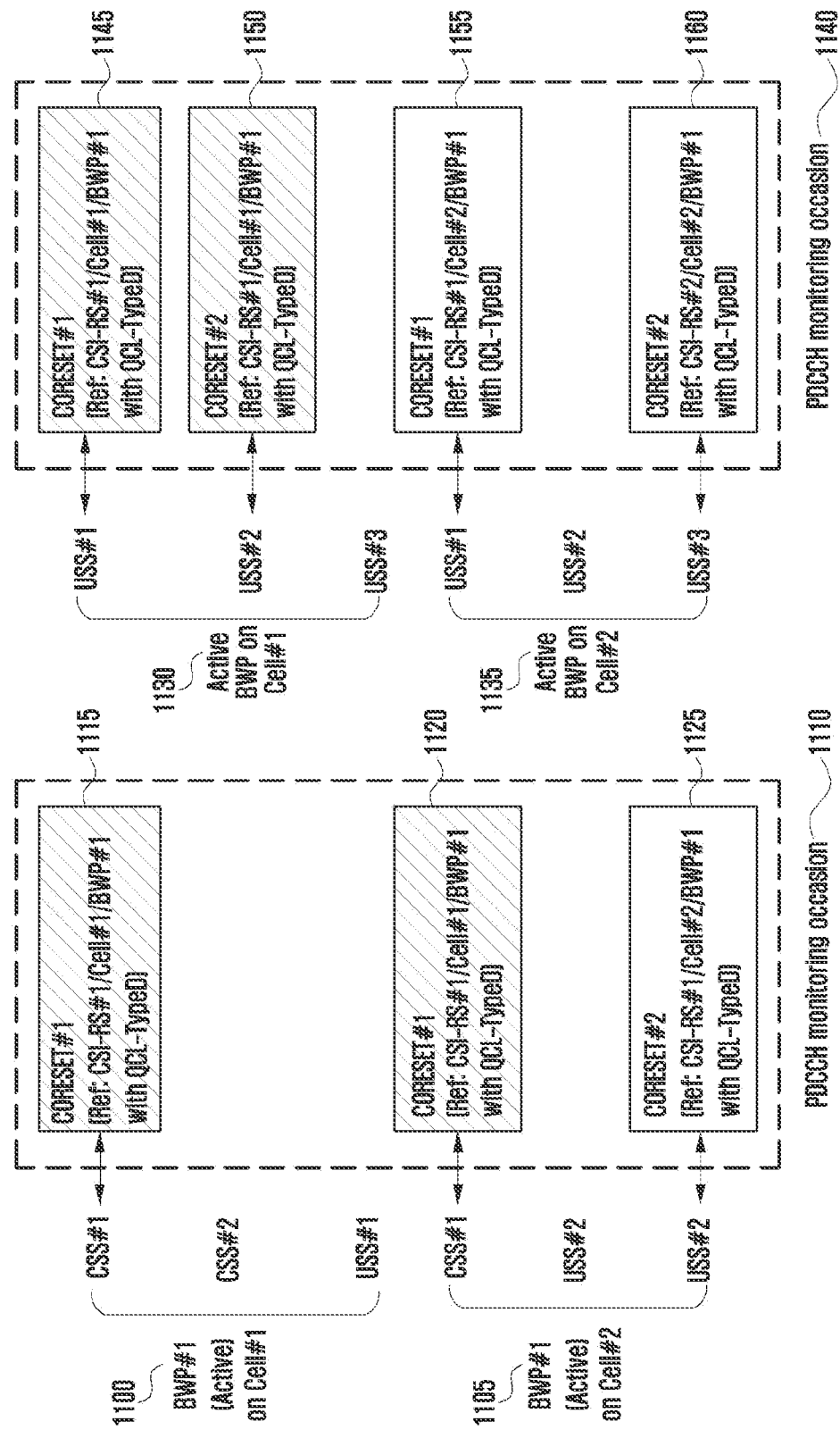
FIG. 11 illustrates a method of selecting a control resource set which can be received in consideration of a priority when the UE receives a downlink control channel in the wireless communication system according to an embodiment of the disclosure.

FIG. 11 illustrates a method of selecting a control resource set which can be received in consideration of a priority when the UE receives a downlink control channel in a wireless communication system according to an embodiment of the disclosure.

For example, referring to the FIG. 11, the UE may receive a configuration of reception of a plurality of control resource sets overlapping in the time in a specific PDCCH monitoring occasion 1110, and the plurality of control resource sets may be connected to a common search space or a UE-specific search space for a plurality of cells. In the corresponding PDCCH monitoring occasion, a first control resource set (CORESET #1) 1115 connected to a first common search space (CSS #1) may exist within a first BWP 1100 of a first cell and a first control resource set (CORESET #1) 1120 connected to a first common search space (CSS #1) and a second control resource set (CORESET #2) 1125 connected to a second UE-specific search space (USS #2) may exist within a first BWP 1105 of a second cell. The control resource sets 1115 and 1120 may have the relation of QCL-TypeD with a first CSI-RS resource configured within the first BWP of the first cell, and the control resource set 1125 may have the relation of QCL-TypeD with the first CSI-RS resource configured within the first BWP of the second cell. Accordingly, when reference 1 is applied to the corresponding PDCCH monitoring occasion 1110, all other control resource sets having the reference signal of QCL-TypeD which is the same as the first control resource set 1115 may be received. Accordingly, the UE may receive the control resource sets 1115 and 1120 in the corresponding PDCCH monitoring occasion 1110.

In another example, the UE may receive a configuration of reception of a plurality of control resource sets overlapping in the time in a specific PDCCH monitoring occasion 1140, and the plurality of control resource sets may be connected to a common search space or a UE-specific search space for a plurality of cells. In the corresponding PDCCH monitoring occasion, a first control resource set (CORESE #1) 1145 connected to a first UE-specific search space (USS #1) and a second control resource set (CORESET #2) 1150 connected to a second UE-specific search space (USS #2) may exist within a first BWP 1130 of a first cell and a first control resource set (CORESET #1) 1155 connected to a first UE-specific search space (USS #1) and a second control resource set (CORESET #2) 1160 connected to a third UE-specific search space (USS #3) may exist within a first BWP 1135 of a second cell. The control resource sets 1145 and 1150 may have the relation of QCL-TypeD with a first CSI-RS resource configured within the first BWP of the first cell, the control resource set 1155 may have the relation of QCL-TypeD with the first CSI-RS resource configured within the first BWP of the second cell, and the control resource set 1160 may have the relation with QCL-TypeD with a second CSI-RES resource configured within the first BWP of the second cell. When reference 1 is applied to the corresponding PDCCH monitoring occasion 1140, there is no common search space, and thus reference 2 which is the following reference may be applied. When reference 2 is applied to the corresponding PDCCH monitoring occasion 1140, all other control resource sets having the reference signal of QCL-TypeD which is the same as the control resource set 1145 may be received. Accordingly, the UB may receive the control resource sets 1145 and 1150 in the corresponding PDCCH monitoring occasion 1140.

Figure 12:
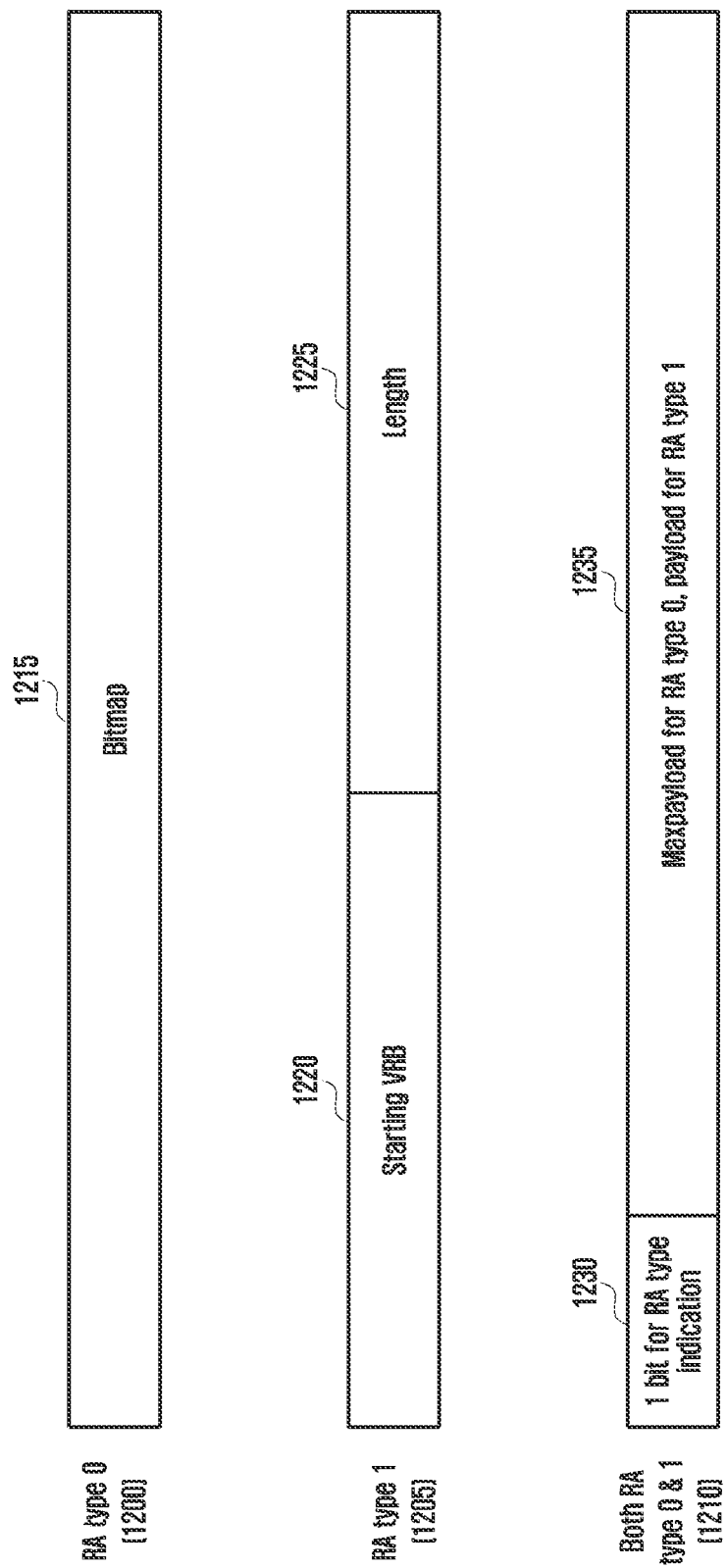
FIG. 12 illustrates an example of frequency axis resource allocation of a physical downlink shared channel (PDSCH) in a wireless communication system, according to an embodiment of the disclosure.

FIG. 12 illustrates an example of frequency axis resource allocation of a PDSCH in a wireless communication system, according to an embodiment of the disclosure.

FIG. 12 illustrates three frequency axis resource allocation methods of resource allocation (RA) type 0 1200, RA type 1 1205, and dynamic switch 1210 which can be configured through a higher layer in the wireless communication system (for example, a 5G system or NR system).

Referring to FIG. 12, when the UE is configured to use only RA type 0 through higher-layer signaling as indicated by reference numeral 1200, some pieces of the DCI for allocating the PDSCH to the corresponding UE includes a bitmap of NRBG bits 1215. A condition therefor is described later. At this time, NRBG is the number of RBGs, determined as shown in Table 22, below, according to a BWP size allocated by a BWP indicator and a higher-layer parameter rbg-Size, and data is transmitted in an RBG indicated as 1 by the bitmap.

TABLE 22

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

When the UE is configured to use only RA type 1 through higher-layer signaling as indicated by reference numeral 1205, some pieces of the DCI for allocating the PDSCH to the corresponding UE includes frequency axis resource allocation information of $\lceil \log_2(N_{RB}^{DL,BWP}(N_{RB}^{DL,BWP}+1)/2) \rceil$ bits. $N_{RB}^{DL,BWP}$ is the number of RBs of a downlink BWP. The BS may configure a starting virtual RB (VRB) 1220 and a length 1225 of frequency axis resources allocated consecutively therefrom.

When the UE is configured to use both RA type 0 and RA type 1 through higher-layer signaling as indicated by reference numeral 1210, some pieces of the DCI for allocating the PDSCH to the corresponding UE includes frequency axis resource allocation information of bits of a larger value 1235 among payload for configuring RA type 0 and payload for configuring RA type 1. At this time, one bit 1230 may be added to the first part (e.g., a most significant bit (MSB)) of the frequency axis resource allocation information within the DCI, and the use of RA type 0 may be indicated when the corresponding bit is "0" and the use of RA type 1 may be indicated when the corresponding bit is "1".

[Related to Allocating Time Domain Resources for PDSCH/PUSCH]

Hereinafter, a method of allocating time domain resources for a data channel in a wireless communication system (for example, a 5G or NR system) according to an embodiment of the disclosure is described.

The BS may configure a table for time domain resource allocation information for a downlink data channel (e.g., a PDSCH) and an uplink data channel (e.g., a PUSCH) in the UE through higher-layer signaling (for example, RRC signaling). A table including a maximum of maxNrofDL-Allocations=16 entries may be configured for the PDSCH, and a table including a maximum of maxNrofUL-Allocations=16 entries may be configured for the PUSCH. The time domain resource allocation information may include PDCCH-to-PDSCH slot timing (corresponding to a time interval in units of slots between a time point at which a PDCCH is received and a time point at which a PDSCH scheduled by the received PDCCH is transmitted, and indicated by K0) or PDCCH-to-PUSCH slot timing (corresponding to a time interval in units of slots between a time point at which a PDCCH is received and a time point at which a PUSCH scheduled by the received PDCCH is transmitted, and indicated by K2), a location and a length of a start symbol in which a PDSCH or a PUSCH is scheduled within the slot, and a mapping type of a PDSCH or a PUSCH. For example, information shown in Table 23 or Table 24, below, may be transmitted from the BS to the UE.

TABLE 23

PDSCH-TimeDomainResourceAllocationList information element

PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::= SEQUENCE {
  k0 INTEGER (0..32)
  OPTIONAL, --Need S
  (PDCCH-to-PDSCH timing, slot units)
  mapping type ENUMERATED {typeA, typeB},
  (PDSCH mapping type)
  startSymbolAndLength INTEGER (0..127)
  (Start symbol and length of PDSCH)
}

TABLE 24

PUSCH-TimeDomainResourceAllocationList information element

PUSCH-TimeDomainResourceAllocationList ::= SEQUENCE (SIZE(1..maxNrofUL-Allocations)) OF PUSCH-TimeDomainResourceAllocation
PUSCH-TimeDomainResourceAllocation ::= SEQUENCE {
  k2 INTEGER (0..32)
  OPTIONAL, --Need S
  (PDCCH-to-PUSCH timing, slot units)
  mapping type ENUMERATED {typeA, typeB},
  (PUSCH mapping type)
  startSymbolAndLength INTEGER (0..127)
  (Start symbol and length of PUSCH)
}

The BS may inform the UE of one of the entries in the table for the time domain resource allocation information through L1 signaling (for example, DCI indicating a time domain resource allocation field). The UE may acquire time domain resource allocation information for a PDSCH or a PUSCH on the basis of the DCI received from the BS.

Figure 13:
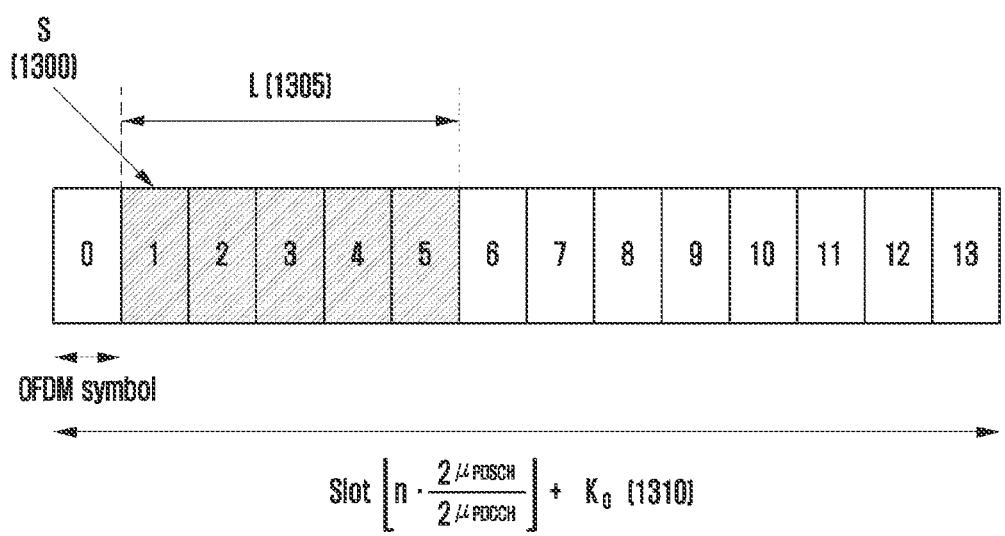
FIG. 13 illustrates an example of allocation of time axis resources of a PDSCH in a wireless communication system, according to an embodiment of the disclosure.

FIG. 13 illustrates an example of allocation of time axis resources of a PDSCH in a wireless communication system, according to an embodiment of the disclosure.

Referring to FIG. 13, the BS may indicate a time axis location of PDSCH resources according to SCS (μPDSCH, μPDCCH) of a data channel and a control channel configured using a higher layer, a scheduling offset (K0) value, and an OFDM symbol start location 1300 and length 1305 within one slot 1310 dynamically indicated through the DCI.

Figure 14:
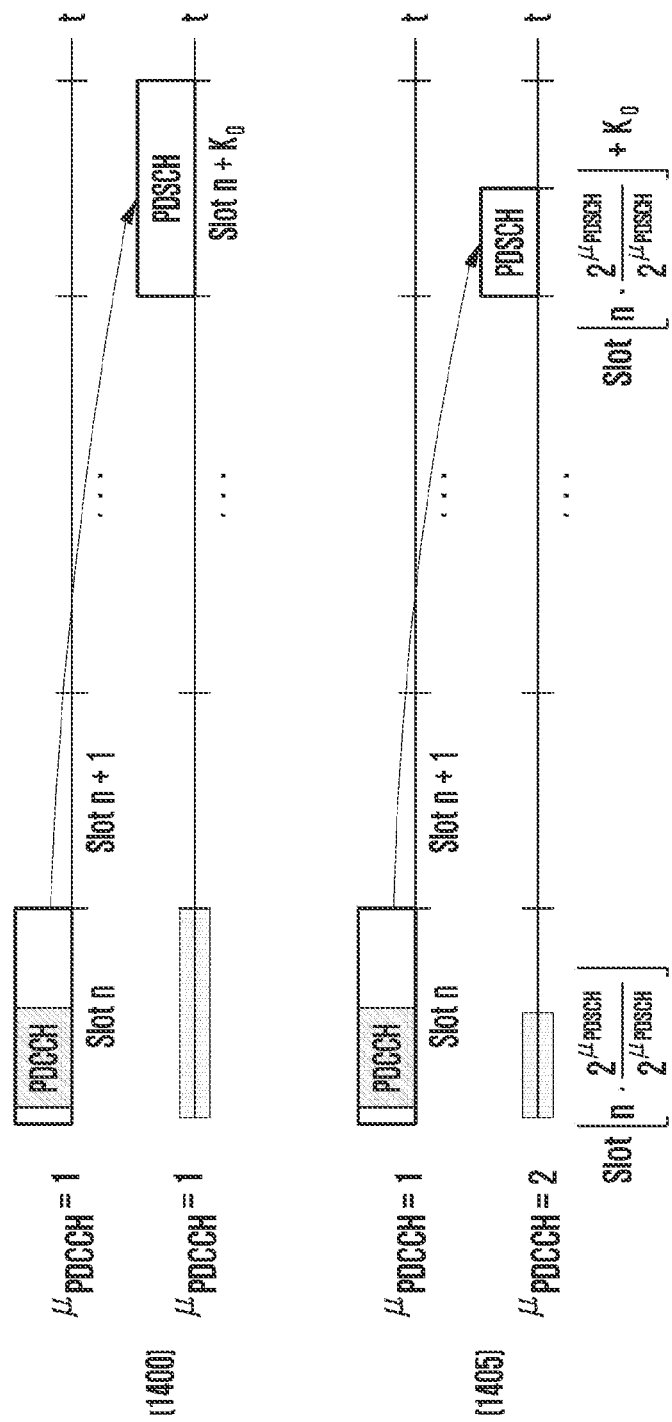
FIG. 14 illustrates an example of allocation of time-axis resources according to subcarrier spacing of a data channel and a control channel in a wireless communication system, according to an embodiment of the disclosure.

FIG. 14 illustrates an example of allocation of time-axis resources according to subcarrier spacing of a data channel and a control channel in a wireless communication system, according to an embodiment of the disclosure.

Referring to FIG. 14, when subcarrier spacings of a data channel and a control channel are the same as each other (μPDSCH=μPDCCH) as indicated by reference numeral 1400, slot numbers for the data and the control are the same as each other, and thus the BS and the UE may generate a scheduling offset according to a predetermined slot offset K0. On the other hand, when subcarrier spacings of a data channel and a control channel are different from each other (μPDSCH≠μPDCCH) as indicated by reference numeral 1405, slot numbers for the data and the control are different from each other, and thus the BS and the UE may generate a scheduling offset according to a predetermined slot offset K0 on the basis of subcarrier spacing of the PDCCH. For example, when the UE has received DCI for indicating BWP switch in slot n, and a value of the slot offset indicated by the DCI is K0, the UE may receive data through a scheduled PDSCH in slot (n+K0).

[Related to SRS]

Subsequently, a method of estimating an uplink channel using sounding reference signal (SRS) transmission by the UE is described. The BS may configure at least one SRS configuration in every uplink BWP and configure at least one SRS resource set in every SRS configuration in order to transmit configuration information for the SRS transmission to the UE. For example, the BS and the UE may exchange higher-layer signaling information below in order to transmit information related to an SRS resource set.

- srs-ResourceSetId: SRS indicates a resource set index
- srs-ResourceIdList: set of SRS resource indexes referred to by SRS resource set
- resourceType: indicates a time-axis transmission configuration of SRS resources referred to by an SRS resource set and is configured as one of 'periodic', 'semi-persistent', and 'aperiodic'. When 'periodic' or 'semi-persistent' is configured, associated CSI-RS information may be provided according to a used place of the SRS resource set. When 'aperiodic' is configured, an aperiodic SRS resource trigger list and slot offset information may be provided and associated CSI-RS information may be provided according to a used place of the SRS resource set.
- usage: indicates a configuration for a used place of SRS resources referred to by the SRS resource set and is configured as one of 'beamManagement', 'codebook', 'nonCodebook', and 'antennaSwitching'.
- alpha, p0, pathlossReferenceRS, srs-PowerControlAdjustmentStates: provides a parameter configuration for controlling transmission power of SRS resources referred to by the SRS resource set, The UE may understand that SRS resources included in the set of SRS resource indexes referred to by the SRS resource set follow information configured in the SRS resource set.

Further, the BS and the UE may transmit and receive high-layer signaling information in order to transmit individual configuration information for SRS resources. For example, the individual configuration information for SRS resources may include time-frequency axis mapping information within the slot of SRS resources, which may include information on intra-slot or inter-slot frequency hopping of SRS resources. Further, the individual configuration information for SRS resources may include a time-axis transmission configuration of SRS resources and may be configured as one of 'periodic', 'semi-persistent', and 'aperiodic'. This may be limited to have the time-axis transmission configuration such as the SRS resources set including SRS resources. When the time-axis transmission configuration of SRS resources is configured as 'periodic' or 'semi-persistent', an SRS resource transmission period and a slot offset (for example, periodicity AndOffset) may be additionally configured in the time-axis transmission configuration.

The BS may activate, deactivate, or trigger the SRS transmission to the UE through higher-layer signaling including RRC signaling or MAC CE signaling or L1 signaling (for example, DCI). For example, the BS may activate or deactivate periodic SRS transmission to the UE through higher-layer signaling. The BS may indicate activation of an SRS resource set having a resourceType configured as periodic through higher-layer signaling, and the UE may transmit SRS resources referred to by the activated SRS resource set. Time-frequency axis resource mapping within the slot of the transmission SRS resources follows resource mapping information configured in the SRS resources, and slot mapping including the transmission period and the slot offset follows a periodicity AndOffset configured in the SRS resources. Further, a spatial domain transmission filter applied to the transmission SRS resources may refer to spatial relation info configured in the SRS resources or refer to associated CSI-RS information configured in the SRS resource set including the SRS resources. The UE may transmit SRS resources within an uplink BWP activated for activated semi-persistent SRS resources through higher-layer signaling.

For example, the BS may activate or deactivate semi-persistent SRS transmission to the UE through high-layer signaling. The BS may indicate activation of the SRS resource set through MAC CE signaling, and the UE may transmit SRS resources referred to by the activated SRS resource set. The SRS resource set activated through MAC CE signaling may be limited to an SRS resource set having the resourceType configured as semi-persistent. Time-frequency axis resource mapping within the slot of the transmission SRS resources follows resource mapping information configured in the SRS resources, and slot mapping including the transmission period and the slot offset follows a periodicity AndOffset configured in the SRS resources. Further, a spatial domain transmission filter applied to the transmission SRS resources may refer to spatial relation info configured in the SRS resources or refer to associated CSI-RS information configured in the SRS resource set including the SRS resources. When spatial relation info is configured in the SRS resources, a spatial domain transmission filter may be determined with reference to configuration information for spatial relation info transmitted through MAC CE signaling activating semi-persistent SRS transmission without following the spatial relation info. The UE may transmit SRS resources within an uplink BWP activated for activated semi-persistent SRS resources through higher-layer signaling.

For example, the BS may trigger aperiodic SRS transmission to the UE through the DCI. The BS may indicate one of the aperiodic SRS resource triggers (aperiodicSRS-ResourceTrigger) through an SRS request field of the DCI. The UE may understand that an SRS resource set including the aperiodic SRS resource trigger indicated through the DCI in an aperiodic SRS resource trigger list among SRS resource set configuration information is triggered. The UE may transmit the SRS resources referred to by the triggered SRS resource set. Time-frequency axis resource mapping within the slot of the transmitted SRS resources follows resource mapping information configured in the SRS resources. Further, slot mapping of the transmitted SRS resources may be determined through a slot offset between a PDCCH including DCI and the SRS resources, which may refer to a value(s) included in a slot offset set configured in the SRS resource set. Specifically, the slot offset between the PDCCH including DCI and the SRS resources may apply a value indicated by a time domain resource assignment field of DCI among an offset value(s) included in the slot offset set configured in the SRS resource set. Further, a spatial domain transmission filter applied to the transmission SRS resources may refer to spatial relation info configured in the SRS resources or refer to associated CSI-RS information configured in the SRS resource set including the SRS resources. The UE may transmit SRS resources within an uplink BWP activated for triggered aperiodic SRS resources through the DCI.

When the BS triggers aperiodic SRS transmission to the UE through the DCI, the UE may need a minimum time interval between the PDCCH including DCI for triggering aperiodic SRS transmission and the transmitted SRS in order to transmit the SRS through the application of configuration information for SRS resource. The time interval for the SRS transmission by the UE may be defined as the number of symbols between the last symbol of the PDCCH including DCI for triggering aperiodic SRS transmission and the first symbol to which the SRS resource that is first transmitted among the transmitted SRS resource(s) is mapped. The minimum time interval may be defined with reference to a PUSCH preparation procedure time required for preparing the PUSCH transmission by the UE. Further, the minimum time interval may have different values according to a used place of the SRS resource set including the transmitted SRS resource. For example, the minimum time interval may be defined as N2 symbols defined in consideration of the UE processing capability according to the UE capability with reference to the PUSCH preparation procedure of the UE. Further, the minimum time interval may be determined as N2 symbols when the used place of the SRS resource set is configured as 'codebook' or 'antennaSwitching' in consideration of the used place of the SRS resource set including the transmitted SRS resource, and may be determined as N2+14 symbols when the used place of the SRS resource set is configured as 'nonCodebook' or 'beamManagement' The UE may perform aperiodic SRS transmission when the time interval for aperiodic SRS transmission is longer than or equal to the minimum time interval, and may ignore the DCI for triggering the aperiodic SRS when the time interval for aperiodic SRS transmission is shorter than the minimum time interval.

TABLE 25

```
SRS-Resource ::=                              SEQUENCE {
    srs-ResourceId                                SRS-ResourceId,
    nrofSRS-Ports                                     ENUMERATED {port1,
ports2, ports4},
    ptrs-PortIndex                                ENUMERATED {n0, n1 }
OPTIONAL, --Need R
    transmissionComb                              CHOICE {
        n2                                            SEQUENCE {
            combOffset-n2                                                          INTEGER
(0..1),
            cyclicShift-n2                                INTEGER (0..7)
        },
        n4                                            SEQUENCE {
            combOffset-n4                                                          INTEGER
(0..3),
            cyclicShift-n4                                INTEGER (0..11)
        }
    },
    resourceMapping                               SEQUENCE {
        startPosition                                 INTEGER (0..5),
        nrofSymbols                                                           ENUMERATED
{n1, n2, n4},
        repetitionFactor                              ENUMERATED {n1,
n2, n4}
    },
    freqDomainPosition                            INTEGER (0..67),
    freqDomainShift                               INTEGER (0..268),
    freqHopping                                   SEQUENCE {
        c-SRS                                         INTEGER (0..63),
        b-SRS                                         INTEGER (0..3),
        b-hop                                         INTEGER (0..3)
    },
    groupOrSequenceHopping                                                    ENUMERATED
{ neither, groupHopping, sequenceHopping },
    resource Type                                 CHOICE {
        aperiodic                                     SEQUENCE {
            ...
        },
        semi-persistent                               SEQUENCE {
            periodicityAndOffset-sp                                            SRS-
PeriodicityAndOffset,
            ...
        },
        periodic                                      SEQUENCE {
            periodicityAndOffset-p                                             SRS-
PeriodicityAndOffset,
            ...
        }
    },
    sequenceId                                    INTEGER (0..1023),
    spatialRelationInfo                                               SRS-SpatialRelationInfo
OPTIONAL, -- Need R
    ...
}
```

In Table 25 above, spatialRelationInfo configuration information is applied to a beam used for corresponding SRS information of beam information of the corresponding reference signal with reference to one reference signal. For example, the configuration of spatialRelationInfo may include information shown in Table 26 below.

TABLE 26

```
SRS-SpatialRelationInfo ::=    SEQUENCE {
    servingCellId                      ServCellIndex
OPTIONAL,  -- Need S
    referenceSignal                    CHOICE {
        ssb-Index                          SSB-Index,
        csi-RS-Index                       NZP-CSI-RS-ResourceId,
        srs                                SEQUENCE {
            resourceId                         SRS-ResourceId,
            uplinkBWP                          BWP-Id
        }
    }
}
```

Referring to the spatialRelationInfo configuration, an SS/PBCH block index, a CSI-RS index, or an SRS index may be configured as an index of a reference signal to be referred to for using beam information of a specific reference signal. Higher-layer signaling referenceSignal is configuration information indicating a reference signal of which beam information is referred to for corresponding SRS transmission, ssb-Index is an index of an SS/PBCH block, csi-RS-Index is an index of a CSI-RS, and srs is an index of an SRS. When a value of higher-layer signaling referenceSignal is configured as 'ssb-Index', the UE may apply a reception beam used for receiving the SS/PBCH block corresponding to ssb-Index as a transmission beam of the corresponding SRS transmission. When a value of higher-layer signaling referenceSignal is configured as 'csi-RS-Index', the UE may apply a reception beam used for receiving the CSI-RS corresponding to csi-RS-Index as a transmission beam of the corresponding SRS transmission. When a value of higher-layer signaling referenceSignal is configured as 'srs', the UE may apply a reception beam used for receiving the SRS corresponding to srs as a transmission beam of the corresponding SRS transmission.

[PUSCH: Related to Transmission Scheme]

Subsequently, a scheduling scheme of the PUSCH transmission is described. The PUSCH transmission may be dynamically scheduled by a UL grant within the DCI or may operate by configured grant Type 1 or Type 2. Dynamic scheduling of the PUSCH transmission can be indicated by DCI format 0_0 or 0_1.

Configured grant Type 1 PUSCH transmission may be semi-statically configured through reception of configuredGrantConfig including rre-ConfiguredUplinkGrant in Table 27 through higher-layer signaling without reception of a UL grant within the DCI. Configured grant Type 2 PUSCH transmission may be semi-persistently scheduled by a UL grant within the DCI after reception of configuredGrantConfig which does not include Irc-ConfiguredUplinkGrant in Table 27 through higher-layer signaling. When the PUSCH transmission operates by a configured grant, parameters applied to the PUSCH transmission are applied through configuredGrantConfig which is higher-layer signaling of Table 27 except for dataScramblingIdentityPUSCH, txConfig, codebookSubset, maxRank, and scaling of UCI-OnPUSCH provided as pusch-Config of Table 28 which is higher-layer signaling. When the UE receives transformPrecoder within configuredGrantConfig which is higher-layer signaling of Table 27, the UE applies tp-pi2BPSK within pusch-Config of Table 28 to the PUSCH transmission operating by the configured grant.

TABLE 27

```
ConfiguredGrantConfig ::=              SEQUENCE {
    frequencyHopping                       ENUMERATED {intraSlot,
interSlot}                                 OPTIONAL, -- Need S,
    cg-DMRS-Configuration                  DMRS-UplinkConfig,
    mcs-Table                              ENUMERATED {qam256,
qam64LowSE}                                OPTIONAL, --
Need S
    mcs-TableTransformPrecoder             ENUMERATED {qam256,
qam64LowSE}                                OPTIONAL, --
Need S
    uci-OnPUSCH                            SetupRelease { CG-UCI-
OnPUSCH }                                  OPTIONAL, --
Need M
    resourceAllocation                     ENUMERATED
{ resourceAllocationType0, resourceAllocationType1, dynamicSwitch },
    rbg-Size                               ENUMERATED {config2}
OPTIONAL, -- Need S
    powerControlLoopToUse                  ENUMERATED {n0, n1},
    p0-PUSCH-Alpha                         P0-PUSCH-AlphaSetId,
    transformPrecoder                      ENUMERATED {enabled,
disabled}                                  OPTIONAL, -- Need
S
    nrofHARQ-Processes                     INTEGER(1..16),
    repK                                   ENUMERATED {n1, n2, n4,
n8},
    repK-RV                                ENUMERATED {s1-0231,
s2-0303, s3-0000}                          OPTIONAL, -- Need R
    periodicity                            ENUMERATED {
                                               sym2,      sym7,
sym1x14, sym2x14, sym4x14, sym5x14, sym8x14, sym10x14, sym16x14, sym20x14,
                                               sym32x14,
sym40x14, sym64x14, sym80x14, sym128x14, sym160x14, sym256x14, sym320x14,
sym512x14,
                                               sym640x14,
sym1024x14, sym1280x14, sym2560x14, sym5120x14,
                                               sym6,      sym1x12,
```

TABLE 27-continued

```
sym2x12, sym4x12, sym5x12, sym8x12, sym10x12, sym 16x12, sym20x12, sym32x12,
                                        sym40x12,
sym64x12, sym80x12, sym128x12, sym160x12, sym256x12, sym320x12, sym512x12,
sym640x12,
                                        sym 1280x12,
sym2560x12
    },
    configuredGrantTimer                            INTEGER (1..64)
OPTIONAL, -- Need R
    rrc-ConfiguredUplinkGrant           SEQUENCE {
        timeDomainOffset                        INTEGER (0..5119),
        timeDomainAllocation            INTEGER (0..15),
        frequencyDomainAllocation               BIT STRING
(SIZE(18)),
        antennaPort                     INTEGER (0..31),
        dmrs-SeqInitialization                  INTEGER (0..1)
OPTIONAL, -- Need R
    precodingAndNumberOfLayers          INTEGER (0..63),
    srs-ResourceIndicator                       INTEGER (0..15)
OPTIONAL, -- Need R
        mcsAndTBS                               INTEGER (0..31),
        frequency HoppingOffset                 INTEGER (1..
maxNrofPhysicalResourceBlocks-1)     OPTIONAL, -- Need R
        pathlossReferenceIndex                  INTEGER
(0..maxNrofPUSCH-PathlossReferenceRSs-1),
...
    }
OPTIONAL, --Need R
    ...
}
```

Subsequently, a PUSCH transmission method is described. A DMRS antenna port for the PUSCH transmission is the same as an antenna port for the SRS transmission. The PUSCH transmission may follow each of a codebook-based transmission method and a non-codebook-based transmission method according to whether a value of txConfig within pusch-Config of Table 28 which is higher-layer signaling is 'codebook' or 'nonCodebook'.

As described above, the PUSCH transmission may be dynamically scheduled through DCI format 0_0 or 0_1 or semi-statically configured by the configured grant. When the UE receives an indication of scheduling of the PUSCH transmission through DCI format 0_0, the UE performs a beam configuration for the PUSCH transmission by using pucch-spatialRelationInfoID corresponding to a UE-specific PUCCH resource corresponding to a minimum ID within the activated uplink BWP in the serving cell in which case the PUSCH transmission is based on a single antenna port. The UE does not expect scheduling of the PUSCH transmission through DCI format 0_0 within a BWP in which the PUCCH resource including pucch-spatialRelationInfo is not configured. When the UE does not receive a configuration of txConfig within pusch-Config of Table 28, the UE does not expect reception of scheduling through DCI format 0_1.

TABLE 28

```
PUSCH-Config ::=                            SEQUENCE {
    dataScramblingIdentityPUSCH         INTEGER (0..1023)
OPTIONAL, -- Need S                             ENUMERATED
    txConfig                                    OPTIONAL, -
{codebook, nonCodebook}
- Need S
    dmrs-UplinkForPUSCH-MappingTypeA    SetupRelease { DMRS-
UplinkConfig }                       OPTIONAL, -- Need M
    dmrs-UplinkForPUSCH-MappingTypeB    SetupRelease { DMRS-
UplinkConfig }                       OPTIONAL, -- Need M
    pusch-PowerControl                  PUSCH-PowerControl
OPTIONAL, -- Need M
    frequencyHopping                            ENUMERATED
```

TABLE 28-continued

```
{intraSlot, interSlot}                          OPTIONAL, --
Need S
    frequencyHoppingOffsetLists         SEQUENCE (SIZE (1..4))
OF INTEGER (1..maxNrofPhysicalResourceBlocks-1)
OPTIONAL, -- Need M
    resourceAllocation                          ENUMERATED
{ resourceAllocation Type0, resourceAllocationType1, dynamicSwitch},
    pusch-TimeDomainAllocationList      SetupRelease { PUSCH-
TimeDomainResourceAllocationList }   OPTIONAL, -- Need M
    pusch-AggregationFactor             ENUMERATED { n2, n4,
n8 }                                 OPTIONAL, -- Need S
    mcs-Table                                   ENUMERATED
{qam256, qam64LowSE}                            OPTIONAL,
-- Need S
    mcs-TableTransformPrecoder          ENUMERATED {qam256,
qam64LowSE}                                     OPTIONAL, -- Need
S
    transformPrecoder                   ENUMERATED {enabled,
disabled}                            OPTIONAL, -- Need S
    codebookSubset                              ENUMERATED
{fullyAndPartialAndNonCoherent, partialAndNonCoherent,nonCoherent}
OPTIONAL, -- Cond codebookBased
    maxRank                             INTEGER (1..4)
OPTIONAL, -- Cond codebookBased
    rbg-Size                                    ENUMERATED
{ config2}                           OPTIONAL, -- Need S
    uci-OnPUSCH                                 SetupRelease { UCI-
OnPUSCH}                             OPTIONAL, -- Need
                                                        M
    tp-pi2BPSK                                  ENUMERATED
{enabled}                            OPTIONAL, -- Need S
    ...
}
```

Subsequently, codebook-based PUSCH transmission is described. Codebook-based PUSCH transmission may be dynamically scheduled through DCI format 0_0 or 0_1 or semi-statically operate by the configured grant. When codebook-based PUSCH is dynamically scheduled by DCI format 0_1 or is semi-statically configured by the configured grant, the UE determines a precoder for the PUSCH transmission on the basis of an SRS resource indicator (SRI), a transmission precoding matrix indicator (TPMI), and a transmission rank (the number of PUSCH transmission layers).

At this time, the SRI may be given through an SRS resource indicator field within the DCI or may be configured through srs-ResourceIndicator which is higher-layer signaling. In codebook-based PUSCH transmission, the UE may receive a configuration of at least one SRS resource and a maximum of two SRS resources. When the UE receives the SRI through the DCI, the SRS resource indicated by the corresponding SRI is the SRS resource corresponding to the SRI among SRS resources transmitted earlier than the PDCCH including the corresponding SRI. Further, the TPMI and the transmission rank may be given through field information and number of layers within the DCI or may be configured through precodingAndNumberOfLayers which is higher-layer signaling. The TPMI is used to indicate a precoder applied to the PUSCH transmission. When the UE receives a configuration of one SRS resource, the TPMI is used to indicate a precoder to be applied to the one configured SRS resource. When the UE received a configuration of a plurality of SRS resources, the TPMI is used to indicate a precoder to be applied to SRS resources indicated through the SRI.

The precoder to be used for the PUSCH transmission is selected from an uplink codebook having the number of antenna ports which is the same as a value of nrofSRS-Ports within SRS-Config which is higher-layer signaling. In codebook-based PUSCH transmission, the UE determines a codebook subset on the basis of the TPMI and a codebookSubset within pusch-Config which is higher-layer signaling. The codebookSubset within pusch-Config which is higher-layer signaling may be configured as one of 'fully AndPartialAndNonCoherent', 'partial AndNonCoherent', or 'non-Coherent' on the basis of the UE capability which the UE reports to the BS. When the UE reports 'partialAndNonCoherent' as the UE capability, the UE does not expect a configuration of the value of the codebookSubset which is higher-layer signaling as 'fully AndPartialAndNonCoherent'. Further, when the UE reports 'nonCoherent' as the UE capability, the UE does not expect a configuration of the value of the codebook Subset which is higher-layer signaling as 'fully AndPartialAndNonCoherent' or 'partialAndNonCoherent'. When nrofSRS-Ports within SRS-ResourceSet which is higher-layer signaling indicate two SRS antenna ports, the UE does not expect a configuration of the value of the codebookSubset which is higher-layer signaling as 'partialAndNonCoherent'.

The UE may receive a configuration of one SRS resource set having a value of usage within SRS-ResourceSet which is higher-layer signaling configured as 'codebook', and one SRS resource may be indicated through the SRI within the corresponding SRS resource set. When several SRS resources are configured within the SRS resource set having the value of usage within SRS-ResourceSet which is higher-layer signaling configured as 'codebook', the UE expects a configuration of the same value of nrofSRS-Ports within the SRS-Resource which is higher-layer signaling for all SRS resources.

The UE may transmit one or a plurality of SRS resources included in the SRS resource set having the value of usage configured as 'codebook' to the BS according to higher-layer signaling, and the BS may select one of the SRS resources transmitted by the UE and instruct the UE to perform the PUSCH transmission by using transmission beam information of the corresponding SRS resource. At this time, in codebook-based PUSCH transmission, the SRI is used as information for selecting an index of one SRS resource and is included in the DCI. In addition, the BS may insert information indicating the TPMI and the rank to be used for the PUSCH transmission by the UE into the DCI. The UE performs the PUSCH transmission by applying a precoder indicated by the rank and the TPMI indicated on the basis of the transmission beam of the corresponding SRS resource using the SRS resource indicated by the SRI.

Subsequently, non-codebook-based PUSCH transmission is described. Non-codebook-based PUSCH transmission may be dynamically scheduled through DCI format 0_0 or 0_1 or semi-statically operate by the configured grant. When at least one SRS resource is configured within the SRS resource set having the value of usage configured as 'non-Codebook' within SRS-ResourceSet which is higher-layer signaling, the UE may receive scheduling of non-codebook-based PUSCH transmission through DCI format 0_1.

For the SRS resource set having the value of usage configured as 'nonCodebook' within SRS-ResourceSet which is higher-layer signaling, the UE may receive a configuration of one connected non-zero power CSI-RS (NZP CSI-RS). The UE may calculate a precoder for the SRS transmission through measurement for the NZP CSI-RS resource connected to the SRS resource set. When a difference between the last reception symbol of the aperiodic NZP CSI-RS resource connected to the SRS resource set and the first symbol of aperiodic SRS transmission in the UE is smaller than 42 symbols, the UE does not expect an update of information on the precoder for the SRS transmission.

When the value of resource Type within SRS-ResourceSet which is higher-layer signaling is configured as 'aperiodic', the connected NZP CSI-RS is indicated by an SRS request which is a field within DCI format 0_1 or 1_1. At this time, when the connected NZP CSI-RS resource is an aperiodic NZP CSI-RS resource, the case in which the value of the SRS request field within DCI format 0_1 or 1_1 is not '00' indicates the existence of the connected NZP CSI-RS. At this time, the corresponding DCI should not indicate cross carrier or cross BWP scheduling. Further, when the value of the SRS request indicates the existence of the NZP CSI-RS, the corresponding NZP CSI-RS is located in a slot in which the PDCCH including the SRS request field is transmitted. At this time, TCI states configured in the scheduled subcarrier are not configured as QCL-TypeD.

When the periodic or semi-persistent SRS resource set is configured, the connected NZP CSI-RS may be indicated through an associatedCSI-RS within SRS-ResourceSet which is higher-layer signaling. For non-codebook-based transmission, the UE does not expect configurations of both spatialRelationInfo which is higher layer signaling for the SRS resource and associatedCSI-RS within SRS-ResourceSet which is higher-layer signaling.

When the UE receives a configuration of a plurality of SRS resources, the UE may determine a precoder and a transmission rank to be applied to the PUSCH transmission on the basis of an SRI indicated by the BS. At this time, the SRI may be indicated through an SRS resource indicator field within the DCI or may be configured through srs-ResourceIndicator which is higher-layer signaling. Like the codebook-based PUSCH transmission, when the UE receives the SRI through the DCI, the SRS resource indicated by the corresponding SRI is the SRS resource corresponding to the SRI among SRS resources transmitted earlier than the PDCCH including the corresponding SRI. The UE may use one or a plurality of SRS resources for the SRS transmission, and the maximum number of SRS resources which can be simultaneously transmitted in the same symbol within one SRS resource set and the maximum number of SRS resources are determined by the UE capability which the UE reports to the BS. At this time, SRS resources which the UE simultaneously transmits occupy the same RB. The UE configures one SRS port for each SRS resource. The number of SRS resource sets having the value of usage configured as 'nonCodebook' within SRS-ResourceSet which is higher-layer signaling is only one, and the maximum number of SRS resources for non-codebook-based PUSCH transmission can be 4.

The BS transmits one NZP-CSI-RS connected to the SRS resource set, and the UE calculates a precoder to be used for one or a plurality of SRS resource transmissions within the corresponding SRS resource set on the basis of the measurement result when the corresponding NZP-CSI-RS is received. When transmitting one or a plurality of SRS resources within the SRS resource set having usage configured as 'nonCodebook' to the BS, the UE applies the calculated precoder and the BS selects one or a plurality of SRS resources from among the one or plurality of received SRS resources. At this time, in non-codebook-based PUSCH transmission, the SRI indicates an index which may express one SRS resource or a combination of a plurality of SRS resources, and the SRI is included in the DCI. The number of SRS resources indicated by the SRI transmitted by the BS may be the number of transmission layers of the PUSCH, and the UE transmits the PUSCH by applying the precoder applied to SRS resources to each layer.

[PUSCH: Preparation Process Time]

Subsequently, a PUSCH preparation process time (PUSCH preparation procedure time) is described. When the BS schedules to transmit a PUSCH to the UE by using DCI format 0_0, 0_1, or 0_2, the UE may need a PUSCH preparation process time for transmitting a PUSCH by applying a transmission method (a transmission precoding method of SRS resources, the number of transmission layers, and a spatial domain transmission filter) indicated through the DCI. In NR, the PUSCH preparation process time considering the same is defined. The PUSCH preparation process time of the UE may follow Equation 2 below.

$$T{proc,2} = \max((N2+d2,1+d2)(2048+144)\kappa 2^{-\mu}T_c + T_{ext}+T_{switch}, d2,2)$$ [Equation 2]

In Tproc,2 described in Equation 2, each parameter may have the following meaning.

N2: the number of symbols determined according to UE processing capability 1 or 2 based on a UE capability and numerology μ. N1 may have a value in Table 29 when UE processing capability 1 is reported according to a UE capability report and may have a value in Table 30 when UE processing capability 2 is reported and information indicating that UE processing capability 2 can be used is configured through higher-layer signaling.

TABLE 29

| μ | PUSCH preparation time N$_2$ [symbols] |
|---|---|
| 0 | 10 |
| 1 | 12 |
| 2 | 23 |
| 3 | 36 |

TABLE 30

| μ | PUSCH preparation time N$_2$ [symbols] |
|---|---|
| 0 | 5 |
| 1 | 5.5 |
| 2 | 11 for frequency range 1 | d2,1: the number of symbols determined as 0 when all resource elements of a first OFDM symbol in the PUSCH transmission include only DM-RSs and, otherwise, determined as 1.

κ: 64

μ: follows a value among $\mu_{DL}$ or $\mu_{UL}$ making Tproc,2 larger. $\mu_{DL}$ is downlink numerology for transmitting a PDCCH including the DCI scheduling a PUSCH and $\mu_{DL}$ is uplink numerology for transmitting a PUSCH.

Tc: has $1/(\Delta f_{max} \cdot N_f)$, $\Delta f_{max}=480 \cdot 10^2$ Hz, and $N_f=4096$.

d2,2: follows a BWP switching time when the DCI scheduling a PUSCH indicates BWP switching and, otherwise, has 0.

d2: a value of d2 of a PUSCH having a high priority index is used when OFDM symbols of the PUCCH, the PUSCH having the high priority index, and a PUCCH having a low priority index overlap in the time. Otherwise, d2 is 0.

Text: the UE may calculate Text and apply the same to a PUSCH processing time when the UE uses a shared spectrum channel access scheme. Otherwise, it is assumed that Text is 0.

Tswitch: it is assumed that Tswitch is a switching interval time when an uplink switching interval is triggered. Otherwise, it is assumed that Tswitch is 0.

In consideration of time axis resource mapping information of the PUSCH scheduled through the DCI and an effect of uplink-downlink timing advance, the BS and the UE may determine that the PUSCH preparation process time is not sufficient when a first symbol of the PUSCH starts earlier than a first uplink symbol at which the CP starts after Tproc,2 from a last symbol of the PDCCH including the DCI scheduling the PUSCH. Otherwise, the BS and the UE determine that the PUSCH preparation process time is sufficient. The UE may transmit the PUSCH only when the PUSCH preparation process time is sufficient, and may ignore the DCI scheduling the PUSCH when the PUSCH preparation process time is not sufficient.

[PUSCH: Related to Repetitive Transmission]

Hereinafter, repetitive transmission of an uplink data channel in a 5G system is described in detail. In the 5G system, two types such as a PUSCH repetitive transmission type A and a PUSCH repetitive transmission type B are supported as the repetitive transmission method of the uplink data channel. The UE may receive a configuration of one of PUSCH repetitive transmission type A or B through higher-layer signaling.

PUSCH Repetitive Transmission Type A

As described above, the symbol length of the uplink data channel and the location of a start symbol may be determined through the time domain resource allocation method within one slot, and the BS may notify the UE of the number of repetitive transmissions through higher-layer signaling (for example, RRC signaling) or L1 signaling (for example, DCI).

The UE may repeatedly transmit uplink data channels having the configured same uplink data channel length and start symbol in successive slots on the basis of the number of repetitive transmissions received from the BS. At this time, when slots which the BS configures in the UE in the downlink or one or more symbols among the symbols of uplink data channels configured in the UE are configured as the downlink, the UE omits uplink data channel transmission but counts the number of repetitive transmissions of the uplink data channel.

PUSCH Repetitive Transmission Type B

As described above, the symbol length of the uplink data channel and the location of a start symbol may be determined through the time domain resource allocation method within one slot, and the BS may notify the UE of the number of repetitions of repetitive transmissions through higher-layer signaling (for example, RRC signaling) or L1 signaling (for example, DCI).

First, nominal repetition of the uplink data channel is determined on the basis of the start symbol and the length of the configured uplink data channel. A slot in which nth nominal repetition starts is given by $$K_s + \left\lfloor \frac{S + n \cdot L}{N_{symb}^{slot}} \right\rfloor,$$

and a symbol starting in the slot is given by mod (S+n·L, $N_{symb}^{slot}$) A slot in which nth nominal repetition ends is given by $$K_s + \left\lfloor \frac{S + (n+1) \cdot L - 1}{N_{symb}^{slot}} \right\rfloor,$$

and a symbol ending in the slot is given by mod (S+(n+1)·L−1, $N_{symb}^{slot}$) Here, n=0, . . . , numberofrepetitions−1, S is a start symbol of a configured uplink data channel, and L is the symbol length of the configured uplink data channel. $K_s$ indicates a slot in which the PUSCH transmission starts, and $N_{symb}^{slot}$ indicates the number of symbols per slot.

The UE determines an invalid symbol for the PUSCH repetitive transmission type B. A symbol configured as the downlink by tdd-UL-DL-ConfigurationCommon or tdd-UL-DL-ConfigurationDedicated is determined as an invalid symbol for the PUSCH repetitive transmission type B. In addition, the invalid symbol may be configured in a higher-layer parameter (for example, InvalidSymbolPattern). The higher-layer parameter (for example, InvalidSymbolPattern) provides a symbol level bit map over one or two slots to configure the invalid symbol. In the bitmap, 1 indicates an invalid symbol. In addition, a period and a pattern of the bitmap may be configured through a higher-layer parameter (for example, periodicityAndPattern). When the higher-layer parameter (for example, InvalidSymbolPattern) is configured, the UE applies an invalid symbol pattern if an InvalidSymbolPatternIndicator-ForDCIFormat0_1 or InvalidSymbolPatternIndicator-ForDCIFormat0_2 parameter indicates 1, or the UE may not apply the invalid symbol pattern if the parameter indicates 0. When the higher-layer parameters (for example, InvalidSymbolPattern) is configured and the InvalidSymbolPatternIndicator-ForDCIFormat0_1 or InvalidSymbolPatternIndicator-ForDCIFormat0_2 is not configured, the UE applies the invalid symbol pattern.

After the invalid symbol is determined, for each nominal repetition, the UE may consider symbols except for the invalid symbol as valid symbols. When one or more valid symbols are included in each nominal repetition, the nominal repetition may include one or more actual repetitions. Each actual repetition includes successive sets of valid symbols which can be used for the PUSCH repetitive transmissions type B in one slot.

Figure 15:
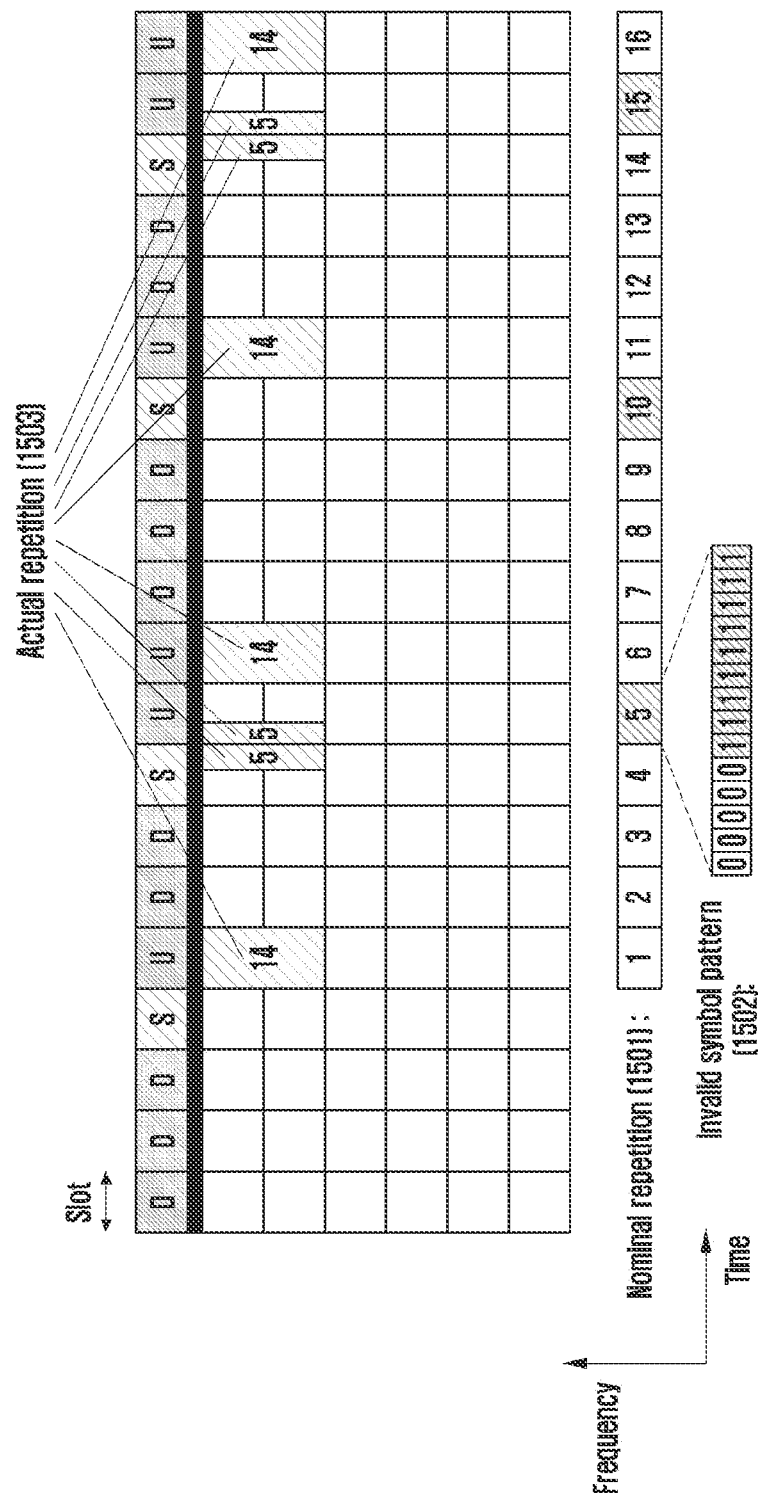
FIG. 15 illustrates an example of a PUSCH repetitive transmission type B in the wireless communication system according to an embodiment of the disclosure.

FIG. 15 illustrates an example of the PUSCH repetitive transmission type B in a wireless communication system according to an embodiment of the disclosure.

Referring to FIG. 15, the UE may receive a configuration of the start symbol S of the uplink data channel as 0, the length L of the uplink data channel as 14, and the number of repetitive transmissions as 16. In this case, nominal repetition appears in 16 successive slots as indicated by reference numeral 1501. Thereafter, the UE may determine a symbol configured as a downlink system in each nominal repetition 1501 as an invalid symbol. Further, the UE determines symbols configured as 1 in an invalid symbol pattern 1502 as invalid symbols. When valid symbols other than the invalid symbol in each nominal repetition includes one or more successive symbols in one slot, the valid symbols are configured as actual repetition and transmitted as indicated by reference number 1503.

Further, for PUSCH repetitive transmission, the following additional methods may be defined for UL grant-based PUSCH transmission and configured grant-based PUSCH transmission beyond the slot boundary in NR Release 16.

In one method (mini-slot level repetition): two or more PUSCH repetitive transmissions are scheduled within one slot or beyond the boundary of successive slots through one UL grant. As described herein, time domain resource allocation information within the DCI indicates resources of first repetitive transmission. Time domain resource information of the remaining repetitive transmissions may be determined according to the domain resource information of first repetitive transmission and an uplink or downlink direction determined for each symbol. Each repetitive transmission occupies successive symbols.

In one method (multi-segment transmission): two or more PUSCH repetitive transmissions are scheduled in successive slots through one UL grant. At this time, one transmission is designated for each slot, and start points or repetition lengths may vary depending on each transmission. As described herein, the time domain resource allocation information within the DCI indicates start points and repetition lengths of all repetitive transmissions. When repetitive transmission is performed within a single slot as described herein and there are sets of successive uplink symbols within the corresponding slot, each repetitive transmission is performed for each uplink symbol set. When there is only one set of successive uplink symbols within the corresponding slot, one PUSCH repetitive transmission is performed according to the method of NR Release 15.

In one method: two or more PUSCH repetitive transmissions are scheduled in successive slots through two or more UL grants. At this time, one transmission is designated for each slot, and an nth UL grant may be received before the PUSCH transmission scheduled by an (n−1)th UL grant ends.

In one method: one or a plurality of PUSCH repetitive transmissions may be supported within a signal slot or two or more PUSCH repetitive transmissions may be supported over boundaries of successive slots through one UL grant or one configured grant. The number of repetitions which the BS indicates to the UE is only a nominal value, and the number of PUSCH repetitive transmissions which the UE actually performs may be larger than the nominal number of repetitions. Time domain resource allocation information within the DCI or the configured grant is resources of the first repetitive transmission indicated by the BS. Time domain resource information of the remaining repetitive transmissions may be determined with reference to resource information of the first repetitive transmission and uplink or downlink directions of symbols. When the time domain resource information of repetitive transmission indicated by the BS is over the slot boundary or includes an uplink/downlink switching point, the corresponding repetitive transmission may be divided into a plurality of repetitive transmissions. At this time, one repetitive transmission may be included for each uplink period in one slot.

[PUSCH: Frequency Hopping Process]

Hereinafter, frequency hopping of an uplink data channel (physical uplink shared channel (PUSCH)) in a 5G system is described in detail.

In 5G, two methods are supported for each PUSCH repetitive transmission type as the frequency hopping method of the uplink data channel. First, intra-slot frequency hopping and inter-slot frequency hopping are supported in a PUSCH repetitive transmission type A, and inter-repetition frequency hopping and inter-slot frequency hopping are supported in a PUSCH repetitive transmission type B.

The intra-slot frequency hopping method supported in the PUSCH repetitive transmission type A is a method of changing allocated resources in the frequency domain by a frequency offset in two hops within one slot to perform transmission. In intra-slot frequency hopping, a start RB of each hop may be indicated through Equation 3.

$$RB_{start} = \begin{cases} RB_{start} & i = 0 \\ (RB_{start} + RB_{offset}) \bmod N_{BWP}^{size} & i = 1 \end{cases} \quad \text{[Equation 3]}$$

In Equation 3, i=0 and i=1 denote a first hop and a second hop, and $RB_{start}$ denotes a start RB in an UL BWP and is calculated by a frequency resource allocation method. $RB_{offset}$ denotes a frequency offset between two hops through a higher-layer parameter. The number of symbols of the first hop may be indicated as, $\lfloor N_{symb}^{PUSCH,s}/2 \rfloor$, and the number of symbols of the second hop may be indicated as $N_{symb}^{PUSCH,s} - \lfloor N_{symb}^{PUSCH,s}/2 \rfloor$, $N_{symb}^{PUSCH,s}$ denotes the length of the PUSCH transmission within one slot and indicated by the number of OFDM symbols.

Subsequently, the inter-slot frequency hopping method supported in the PUSCH repetitive transmission types A and B is a method by which the UE changes allocated resources in the frequency domain by a frequency offset in every slot to perform transmission. In inter-slot frequency hopping, a start RB during $N_s^\mu$ slots may be indicated through Equation 4.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{[Equation 4]}$$

In Equation 4, $n_s^\mu$ denotes a current slot number in multi-slot PUSCH transmission, and $RB_{start}$ denotes a start RB in an UP BWP and is calculated by a frequency resource allocation method. $RB_{offset}$ denotes a frequency offset between two hops through a higher-layer parameter.

Subsequently, the inter-repetition frequency hopping method supported in the PUSCH repetitive transmission type B is a method of moving allocated resources in the frequency domain by a configured frequency offset to perform transmission for one or a plurality of repetitions within each nominal repetition. For one or a plurality of actual repetitions within an nth nominal repetition, RBstart(n) which is an index of the start RB in the frequency domain may follow Equation 5 below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{[Equation 5]}$$

In Equation 5, n denotes an index of nominal repetition, and $RB_{offset}$ denotes an RB offset between two hops through a higher-layer parameter.

[Regarding PUSCH Transmission Power]

Hereinafter, a method of determining the transmission power of an uplink data channel in a 5G system will be described in detail.

In the 5G system, the transmission power of the uplink data channel may be determined through Equation 6 below.

[Equation 6]
$$P_{PUSCH,b,f,c}(i, j, q_d, l) = \min \begin{cases} P_{CMAX f,c}(i), \\ P_{O\_PUSCH,b,f,c}(j) + 10\log_{10}(2^\mu \cdot M_{RB,b,f,c}^{PUSCH}(i))\alpha_{b,f,c}(j) \cdot PL_{b,f,c}(q_s) + \Delta_{TF,b,f,c}(i) + f_{b,f,c}(i, l) \end{cases}$$

In Equation 6, j denotes a grant type of PUSCH, and specifically, j=0 denotes a PUSCH grant for a random access response, j=1 denotes a configured grant, and j∈{2, 3, . . . . J−1} denotes dynamic grant. $P_{CMAX}^{f,c}(i)$ denotes the maximum output power configured in the UE with respect to carrier f of a support cell c for the PUSCH transmission occasion i. $P_{O\_PUSCH}^{b,f,c}(j)$ is a parameter configured by the sum of $P_{O\_NOMINAL\_PUSCH,f,c}(j)$ which is configured via a higher layer parameter, and $P_{O\_UE\_PUSCH b,f,c}(j)$, which may be determined via a higher layer configuration and SRI (in a case of dynamic grant PUSCH). $M_{RB,b,f,c}^{PUSCH}(i)$ denotes a bandwidth for resource allocation expressed by the number of resource blocks for PUSCH transmission occasion i, and $\Delta_{TF,b,f,c}(i)$ denotes a value determined according to the type of information transmitted through a PUSCH and a modulation coding scheme (MCS) (e.g., whether or not UL-SCH is included or CSI is included, etc.). $\alpha_{b,f,c}(j)$ is a value for compensating for pathloss and denotes a value that may be determined via the higher layer configuration and SRS resource indicator (SRI) (in a case of dynamic grant PUSCH). $PL_{b,f,c}(q_d)$ denotes a downlink path loss estimation value, which is estimated by the UE through a reference signal having the reference signal index qd, and the reference signal index qd may be determined by the UE through higher layer configuration and SRI (in a case of dynamic grant PUSCH or ConfiguredGrantConfig-based configured grant PUSCH (type 2 configured grant PUSCH) that does not include higher layer configuration rrc-ConfiguredUplinkGrant) or through higher layer configuration. $f_{b,f,c}(i,l)$ is a closed loop power adjustment value and may be supported by the accumulation method and absolute method. When the higher layer parameter tpc-Accumulation is not configured in the UE, the closed-loop power adjustment value may be determined in the accumulation method. Here, $f_{b,f,c}(i,l)$ is determined by $$f_{b,f,c}(i - i_0, l) + \sum_{m=0}^{C(D_i)-1} \delta_{PUSCH,b,f,c}(m, l),$$

obtained by adding TPC command values for closed-loop index 1 received through the DCI, between KPUSCH(i-i0)-1 symbol for transmission of PUSCH transmission occasion i-i0 to the closed-loop power adjustment value for the previous PUSCH transmission occasion i-i0 and KPUSCH (i) symbol for transmission of PUSCH transmission occasion i. If the higher layer parameter tpc-Accumulation is configured in the UE, $f_{b,f,c}(i,l)$ is determined as the TPC command value $\delta_{PUSCH,b,f,c}(i,l)$ for the closed loop index 1 received through the DCI. The closed loop index 1 may be configured to be the value of 0 or 1 if the higher layer parameter twoPUSCH-PC-AdjustementStates is configured in the UE, and the value may be determined through the higher layer configuration and SRI (in a case of dynamic grant PUSCH), The mapping relationship between the TPC command field and the TPC value $\delta_{PUSCH,b,f,c}$ in the DCI according to the accumulation method and the absolute method may be defined as shown in [Table 31] below.

TABLE 31

| TPC command field | Accumulated $\delta_{PUSCH,b,f,c-}$ [dB] | Absolute $\delta_{PUSCH,b,f,c-}$ [dB] |
|---|---|---|
| 0 | −1 | −4 |
| 1 | 0 | −1 |
| 2 | 1 | 1 |
| 3 | 3 | 4 |

[Related to UE Capability Report]

In LTE system and NR system, the UE may perform a procedure for reporting a capability supported by the UE to the corresponding BS in the state in which the UE is connected to a serving BS. In the following description, this is referred to as a UE capability report.

The BS may transmit a UE capability enquiry message that makes a request for a capability report to the UE in the connected state. The message may include a UE capability request for each radio access technology (RAT) type of the BS. The request for each RAT type may include supported frequency band combination information. In the case of the UE capability enquiry message, a plurality of UE capabilities for respective RAT types may be requested through one RRC message container transmitted by the BS or the BS may insert the UE capability enquiry message including the UE capability request for each RAT type multiple times and transmit the same to the UE. That is, the UE capability enquiry is repeated multiple times within one message and the UE may configure a UE capability information message corresponding thereto and report the same multiple times. In the next-generation mobile communication system, a UE capability request for NR, LTE, E-UTRA-NR dual connectivity (EN-DC), and multi-RAT dual connectivity (MR-DC) may be made. The UE capability enquiry message is generally transmitted initially after the UE is connected to the BS, but may be requested at any time when the BS needs the same.

The UE receiving the request for the UE capability report from the BS in the above step may configure a UE capability according to RAT type and band information requested by the BS. A method by which the UE configures the UE capability in a wireless communication system (for example, a 5G or NR system) is described below.

1. When the UE receives a list of LTE and/or NR bands from the BS through a UE capability request, the UE configures a band combination (BC) for EN-DC and NR standalone (SA). That is, the UE configures a candidate list of BCs for EN-DC and NR SA on the basis of requested bands in FreqBandList. The bands sequentially have priorities as stated in FreqBandList.

2. When the BS sets a "eutra-nr-only" flag or an "eutra" flag in a UE capability enquiry message and makes a request for the UE capability report, the UE completely removes NR SA BCs from the configured candidate list of BCs. Such an operation may occur only when the LTE BS (eNB) makes a request for an "eutra" capability.

3. Thereafter, the UE removes fallback BCs from the candidate list of BCs configured in the above stage. The fallback BC is a BC which can be obtained by removing a band corresponding to at least one SCell from a predetermined BC, and a BC before the removal of the band corresponding at least one SCell can cover the fallback BC and thus the fallback BC can be omitted. This stage is applied to MR-DC, that is, LTE bands. BCs left after the stage are a final "candidate BC list".

4. The UE selects BCs suitable for a requested RAT type in the final "candidate BC list" and selects BCs to be reported. In this stage, the UE configures supportedBandCombinationList according to a determined order. That is, the UE configures BCs and UE capability to be reported according to an order of a preset rat-Type (nr→eutra-nr→eutra). Further, the UE configures featureSetCombination for the configured supportedBandCombinationList and configures a list of "candidate feature set combination" in a candidate BC list from which a list for fallback BCs (including capability at the same or lower stage) is received. The "candidate feature set combination" may include all feature set combinations for NR and EUTRA-NR BCs, and may be acquired from a feature set combination of UE-NR-Capabilities and UE-MRDC-Capabilities containers.

5. When the requested rat Type is eutra-nr and influences, featureSetCombinations are included in all of the two containers of UE-MRDC-Capabilities and UE-NR-Capabilities. However, the NR feature set includes only UE-NR-Capabilities.

After configuring the UE capability, the UE may transfer a UE capability information message including the UE capability to the BS. The BS may perform scheduling for the corresponding UE and transmission/reception management on the basis of the UE capability received from the UE.

[Related to CA/DC]

Figure 16:
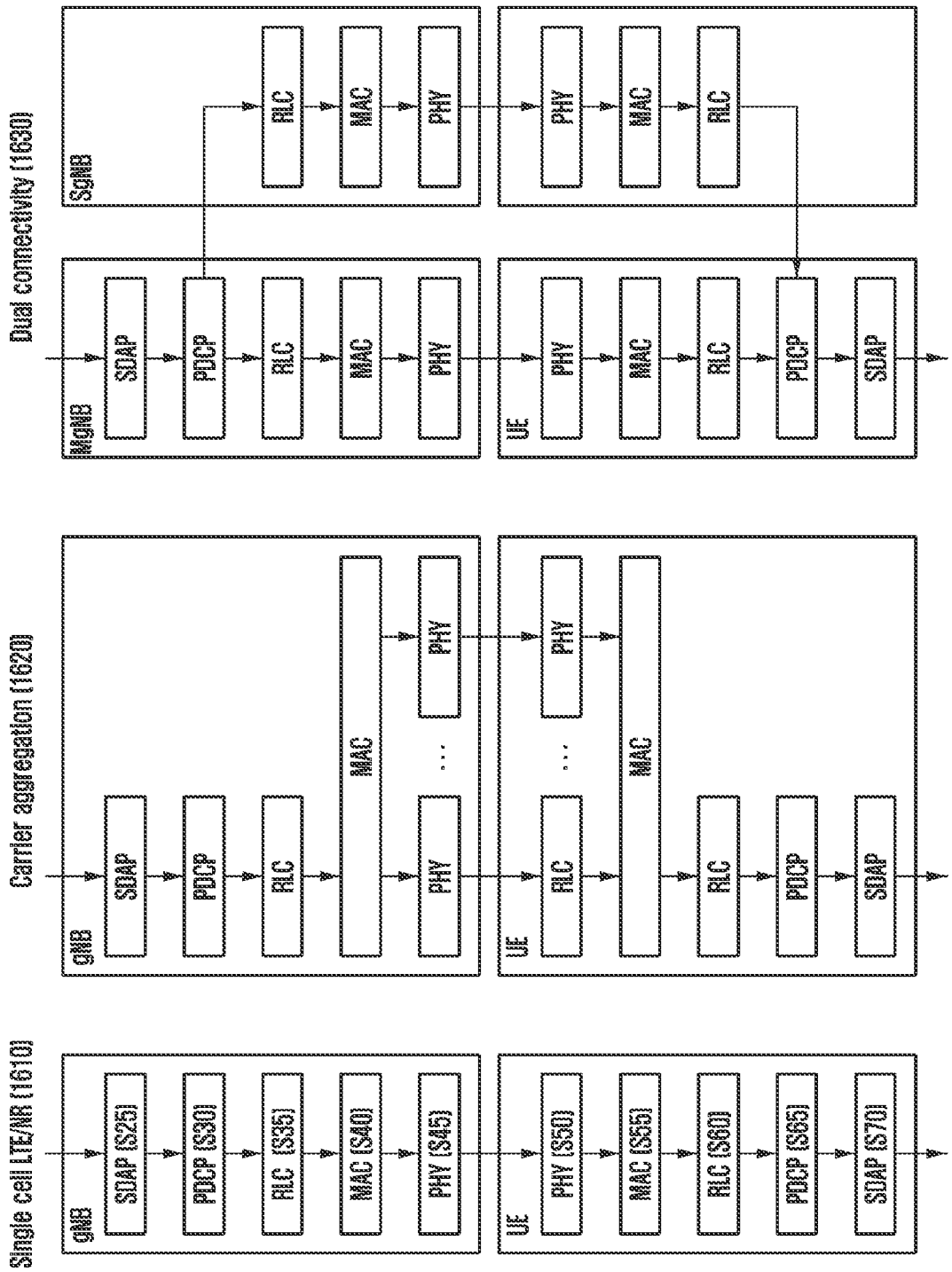
FIG. 16 illustrates a wireless protocol structure of the BS and the UE in a single cell environment, a carrier aggregation (CA) environment, and a dual connectivity (DC) environment in a wireless communication system, according to an embodiment of the disclosure.

FIG. 16 illustrates a wireless protocol structure of the BS and the UE in single cell 1610, CA 1620, and DC 1630, according to an embodiment of the disclosure.

Referring to FIG. 16, a wireless protocol of a wireless communication system (for example, a 5G or NR system) includes an NR service data adaptation protocol (SDAP) S25 or S70, an NR packet data convergence protocol (PDCP) S30 or S65, an NR radio link control (RLC) S35 or S60, and an NR medium access control (MAC) S40 or S55 in each of the UE and the NR gNB.

Main functions of the NR SDAP S25 or S70 may include some of the following functions:
- a user data transmission function (transfer of user-plane data);
- a function of mapping QoS flow and a data bearer for uplink and downlink (mapping between a QoS flow and a DRB for both DL and UL);
- a function of marking a QoS flow ID for uplink and downlink (marking QoS flow ID in both DL and UL packets); and
- a function of mapping reflective QoS flow to a data bearer for uplink SDAP PDUs (reflective QoS flow to DRB mapping for the UL SDAP PDUs).

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of non-access stratum (NAS) reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

Main functions of the NR PDCP S30 or S65 may include some of the following functions:
- a header compression and decompression function (header compression and decompression: robust header compression (ROHC) only);
- a user data transmission function (transfer of user data);
- a sequential delivery function (in-sequence delivery of upper-layer PDUs);
- a non-sequential delivery function (out-of-sequence delivery of upper-layer PDUs);
- a reordering function (PDCP PDU reordering for reception);
- a duplicate detection function (duplicate detection of lower-layer SDUs);
- a retransmission function (retransmission of PDCP SDUs);
- a ciphering and deciphering function (ciphering and deciphering); and
- a timer-based SDU removal function (timer-based SDU discard in uplink).

The reordering function of the NR PDCP layer device is a function of sequentially reordering PDCP PDUs received from a lower layer on the basis of a PDCP sequence number (SN), and may include a function of sequentially transferring the reordered data to a higher layer The reordering function of the NR PDCP layer device may include a function of directly transmitting data regardless of the sequence, a function of recording PDCP PDUs lost due to the reordering, a function of reporting statuses of the lost PDCP PDUs to a transmitting side, and a function of making a request for retransmitting the lost PDCP PDUs.

Main functions of the NR RLC S35 or S60 may include some of the following functions:
- a data transmission function (transfer of upper-layer PDUs);
- a sequential delivery function (in-sequence delivery of upper-layer PDUs);
- a non-sequential delivery function (out-of-sequence delivery of upper-layer PDUs);
- an automatic repeat request (ARQ) function (error correction through ARQ);
- a concatenation, segmentation, and reassembly function (concatenation, segmentation, and reassembly of RLC SDUs);
- a re-segmentation function (re-segmentation of RLC data PDUs);
- a reordering function (reordering of RLC data PDUs);
- a duplicate detection function (duplicate detection);
- an error detection function (protocol error detection);
- an RLC SDU deletion function (RLC SDU discard); and
- an RLC reestablishment function (RLC reestablishment).

The sequential delivery function (in-sequence delivery) of the NR RLC layer device is a function of sequentially transmitting RLC SDUs received from a lower layer to the higher layer. When one original RLC SDU is divided into a plurality of RLC SDUs and then received, the sequential delivery function (in-sequence delivery) of the NR RLC layer device may include a function of reassembling and transmitting the RLC SDUs, a function of reordering the received RLC PDUs on the basis of an RLC SN or a PDCP SN, a function of recording RLC PDUs lost due to the reordering, a function of reporting statuses of the lost RLC PDUs to a transmitting side, and a function of making a request for retransmitting the lost RLC PDUs. When there are lost RLC SDUs, the sequential delivery function (in-sequence delivery) of the NR RLC layer device may include a function of sequentially transferring only RLC SDUs preceding the lost RLC SDUs to the higher layer or a function of, if a predetermined timer expires even though there are lost RLC SDUs, sequentially transferring all RLC SDUs received before the timer starts to the higher layer. Alternatively, the sequential delivery function (in-sequence delivery) of the NR RLC layer device may include a function of, if a predetermined timer expires even though there are lost RLC SDUs, sequentially transferring all RLC SDUs received up until that point to the higher layer. Further, the NR RLC device may process the RLC PDUs sequentially in the order of reception thereof (according to an arrival order regardless of a serial number or a sequence number) and may transfer the RLC PDUs to the PDCP device regardless of the sequence thereof (out-of-sequence delivery). In the case of segments, the NR RLC device may receive segments that are stored in the buffer or are to be received in the future, reconfigure the segments to be one RLC PDU, process the RLC PDU, and then transmit the same to the PDCP device. The NR RLC layer device may not include a concatenation function, and the function may be performed by the NR MAC layer, or may be replaced with a multiplexing function of the NR MAC layer.

The non-sequential function (out-of-sequence delivery) of the NR RLC layer device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MAC S40 or S55 may be connected to a plurality of NR RLC layer devices configured in one UE and main functions of the NR MAC may include some of the following functions:
- a mapping function (mapping between logical channels and transport channels);

a multiplexing and demultiplexing function (multiplexing/demultiplexing of MAC SDUs);

a scheduling information report function (scheduling information reporting);

a HARQ function (error correction through HARQ);

a logical channel priority control function (priority handling between logical channels of one UE);

a UE priority control function (priority handling between UEs by means of dynamic scheduling);

an MBMS service identification function (MBMS service identification);

a transport format selection function (transport format selection); and a padding function (padding).

The NR PHY layer S45 or S50 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

A detailed structure of the wireless protocol may be variously changed according to a carrier (or cell) operation scheme. For example, when the BS transmits data to the UE on the basis of a single carrier (or cell), the BS and the UE use a protocol structure having a single structure for each layer as indicated by reference numeral 1610 of FIG. 16. On the other hand, when the BS transmits data to the UE on the basis of CA using multiple carriers in a single TRP, the BS and the UE use a protocol structure in which layers up to RLC have a single structure but the PHY layer is multiplexed through the MAC layer as indicated by reference numeral 1620. In another example, when the BS transmits data to the UE on the basis of DC using multiple carriers in multiple TRPs, the BS and the UE use a protocol structure in which layers up to RLC have a single structure but the PHY layer is multiplexed through the MAC layer as indicated by reference numeral 1630.

Referring to the PDCCH and beam configuration-related descriptions described above, it is difficult to achieve the required reliability in a scenario requiring high reliability, such as URLLC, since PDCCH repetition transmission is not currently supported in Rel-15 and Rel-16 NRs. The disclosure improves PDCCH reception reliability of a terminal by providing a PDCCH repetition transmission method via multiple transmission points (TRPs).

Hereinafter, an embodiment of the disclosure is applicable in at least one of FDD and TDD systems. However, this is only an example, and the contents of the present disclosure may be applied to a cross division duplex system in which FDD and TDD systems are combined. Higher signaling (or higher layer signaling) may be a signal transmission method of transmitting a signal from a BS to a terminal by using a downlink data channel of a physical layer or from the terminal to the BS by using an uplink data channel of the physical layer, and may be referred to as RRC signaling, PDCP signaling, or an MAC control element (CE).

When determining whether to apply cooperative communication, the UE can use various methods by which PDCCH(s) allocating PDSCHs to which cooperative communication is applied have specific formats, PDCCH(s) allocating PDSCHs to which cooperative communication is applied include a specific indicator informing of whether cooperative communication is applied, PDCCH(s) allocating PDSCHs to which cooperative communication is applied are scrambled by a specific RNTI, or the application of cooperative communication to a specific section indicated by a higher layer is assumed. Thereafter, for convenience of description, reception of, by the UE, a PDSCH to which cooperative communication is applied on the basis of conditions similar to the above conditions is referred to as an "NC-IT" case (a non-coherent joint transmission (NC-JT) case).

[Related to NC-JT]

According to an embodiment of the disclosure, in order to receive a PDSCH from a plurality of TRPs, the UE may use NC-JT.

A wireless communication system (for example, a 5G or NR system) may support all of the service having very short transmission latency and the service requiring a high connectivity density as well as the service requiring a high transmission rate unlike the conventional system. In a wireless communication network including a plurality of cells, TRPs, or beams, cooperative communication (coordinated transmission) between respective cells, TRPs, and/or beams may satisfy various service requirements by increasing the strength of a signal received by the UE or efficiently controlling interference between the cells, TRPs, and/or beams.

Joint transmission (IT) is a representative transmission technology for the cooperative communication and may increase the strength of a signal received by the UE or throughput by transmitting signals to one UE through different cells, TRPs, and/or beams. At this time, a channel between each cell, TRP, and/or beam and the UE may have different characteristics, and particularly, NC-JT supporting non-coherent precoding between respective cells, TRPs, and/or beams may need individual precoding, MCS, resource allocation, and TCI indication according to the channel characteristics for each link between each cell, TRP, and/or beam and the UE.

The NC-JT may be applied to at least one of a downlink data channel (e.g., a PDSCH), a downlink control channel (e.g., a PDCCH), an uplink data channel (e.g., a PUSCH), and an uplink control channel (e.g., a PUCCH)). In PDSCH transmission, transmission information such as precoding, MCS, resource allocation, and TCI may be indicated through DL DCI, and should be independently indicated for each cell, TRP, and/or beam for the NC-JT. This is a significant factor that increases payload required for DL DCI transmission, which may have a bad influence on reception performance of a PDCCH for transmitting the DCI. Accordingly, in order to support JT of the PDSCH, carefully designing a tradeoff between an amount of DCI information and reception performance of control information is required.

Figure 17:
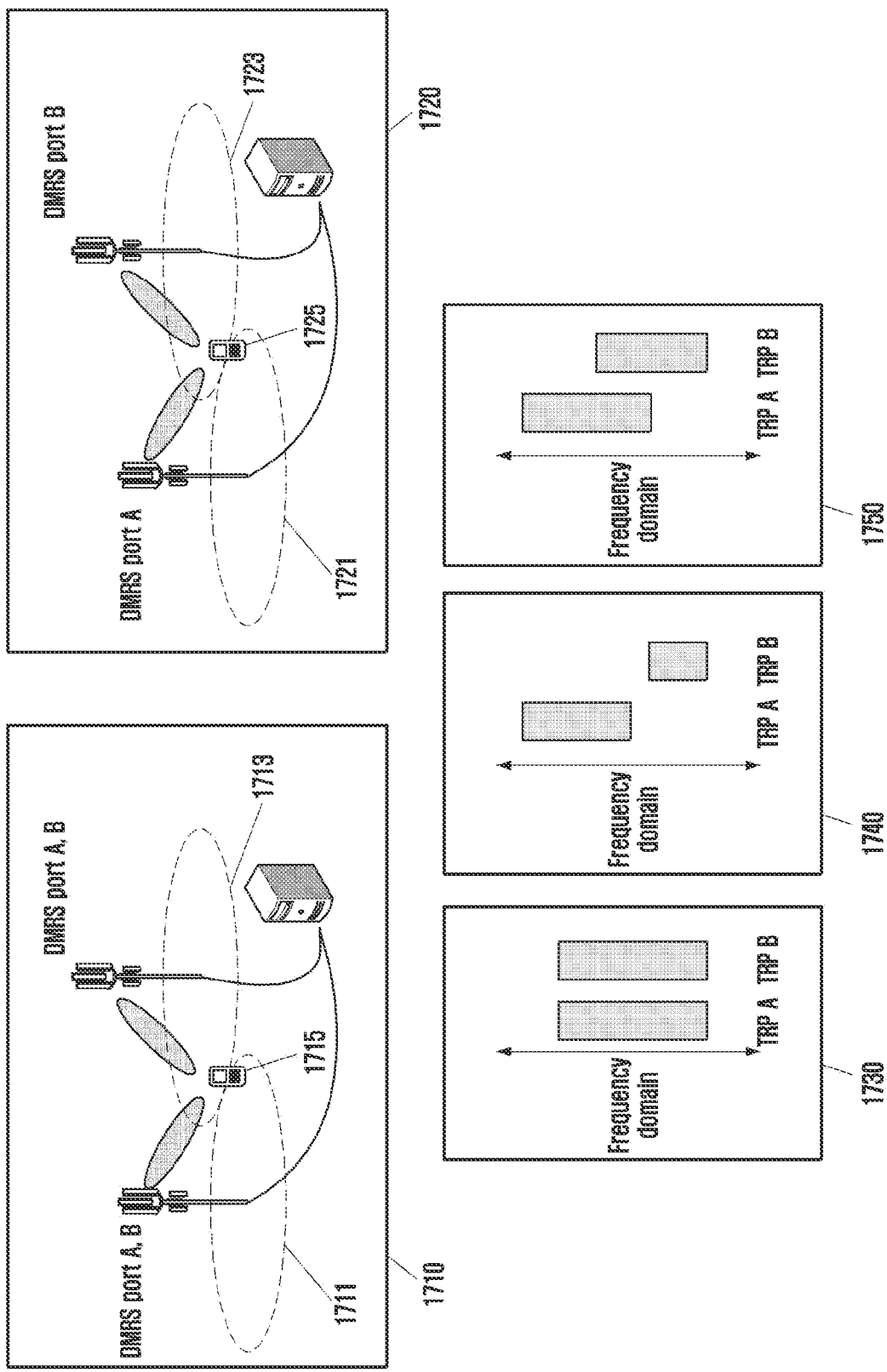
FIG. 17 illustrates a configuration of antenna ports and an example of resource allocation for cooperative communication in a wireless communication system, according to an embodiment of the disclosure.

FIG. 17 illustrates a configuration of antenna ports and an example of resource allocation for transmitting a PDSCH using cooperative communication in a wireless communication system, according to an embodiment of the disclosure.

Referring to FIG. 17, the example for PDSCH transmission is described for each scheme of JT, and examples for allocating radio resources for each TRP are described.

Referring to FIG. 17, an example 1710 of coherent JT (C-JT) supporting coherent precoding between respective cells, TRPs, and/or beams is illustrated.

In the case of C-JT, a TRP A 1711 and a TRP B 1713 transmit single data (e.g., a PDSCH) to a UE 1715, and the plurality of TRPs may perform joint precoding. This may mean that the TRP A 1711 and a TRP B 1713 transmit DMRSs through the same DMRS ports in order to transmit the same PDSCH. For example, the TRP A 1711 and a TRP B 1713 may transmit DMRSs to the UE 1715 through a DMRS port A and a DMRS port B, respectively. In this case, the UE may receive one piece of DCI information for receiving one PDSCH demodulated on the basis of the DMRSs transmitted through the DMRS port A and the DMRS port B.

Further, FIG. 17 shows an example 1720 of non-coherent joint transmission (NC-JT) that supports non-coherent precoding between each cell, TRP or/and beam for PDSCH transmission. This may mean that the DMRS is transmitted through different DMRS ports in order for the TRP A 1721 and the TRP B 1723 to transmit different PDSCHs. For example, TRP A 1721 may transmit a DRMS to the UE through DMRS port A, and TRP B 1723 may transmit a DRMS to the UE 1725 through DMRS port B. The UE may receive the DCI for receiving each PDSCH demodulated based on the DMRS transmitted through the DMRS port A and the DMRS port B, respectively.

In the case of NC-JT, the PDSCH is transmitted to a UE for each cell, TPR, and/or beam, and individual precoding may be applied to each PDSCH. Respective cells, TRPs, and/or beams may transmit different PDSCHs or different PDSCH layers to the UE, thereby improving throughput compared to single cell, TRP, and/or beam transmission. Further, respective cells, TRPs, and/or beams may repeatedly transmit the same PDSCH to the UE, thereby improving reliability compared to single cell, TRP, and/or beam transmission. For convenience of description, the cell, TRP, and/or beam are commonly called a TRP.

At this time, various wireless resource allocations such as the case 1730 in which frequency and time resources used by a plurality of TRPs for PDSCH transmission are all the same, the case 1740 in which frequency and time resources used by a plurality of TRPs do not overlap at all, and the case 1750 in which some of the frequency and time resources used by a plurality of TRPs overlap each other may be considered.

In order to support NC-JT, DCIs in various forms, structures, and relations may be considered to simultaneously allocate a plurality of PDSCHs to one UE.

Figure 18:
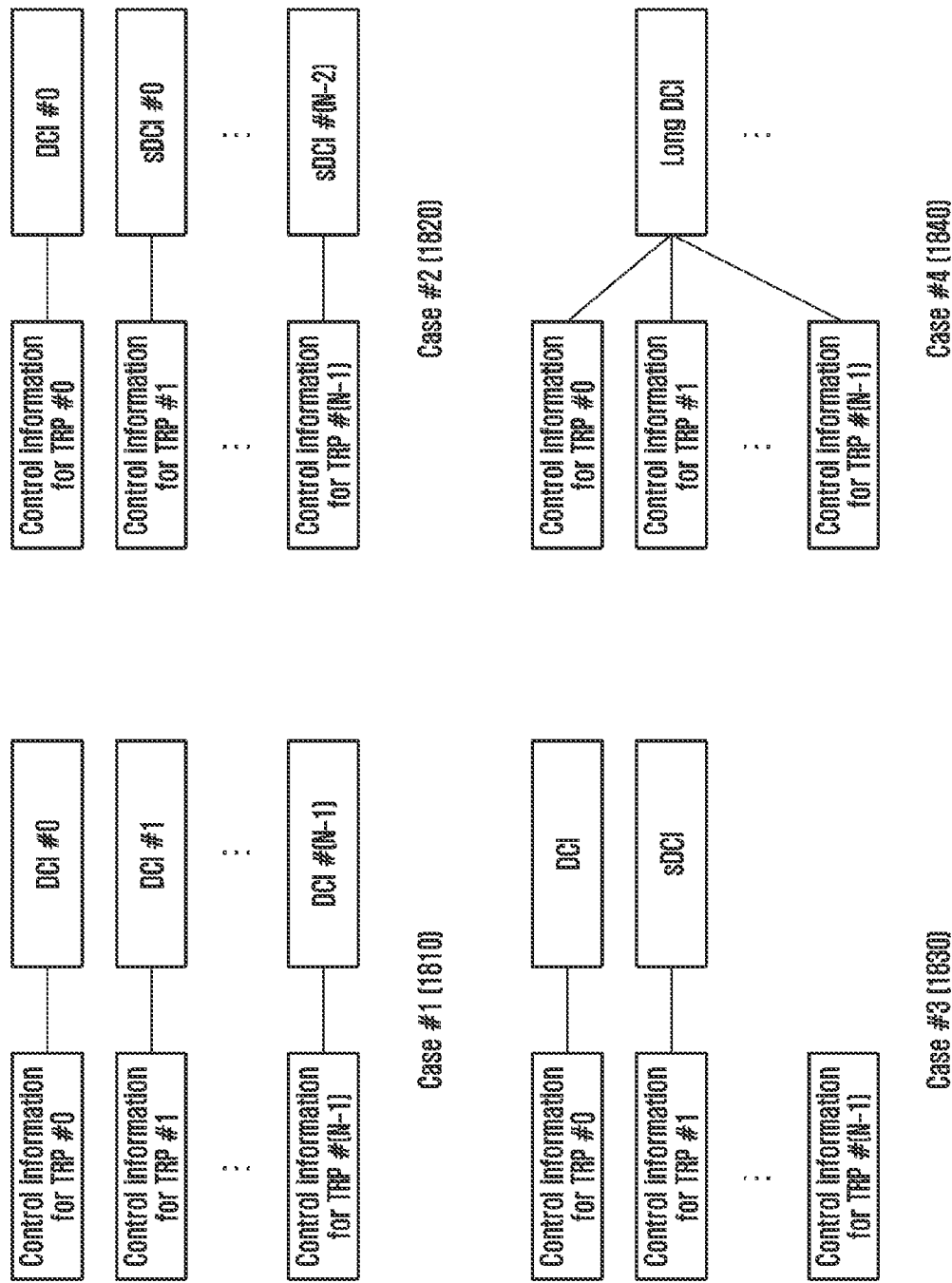
FIG. 18 illustrates an example for a configuration of downlink control information (DCI) for cooperative communication in a wireless communication system, according to an embodiment of the disclosure.

FIG. 18 illustrates an example for a configuration of DCI for NC-JT in which respective TRPs transmit different PDSCHs or different PDSCH layers to the UE in a wireless communication system, according to an embodiment of the disclosure.

Referring to FIG. 18, case #1 1810 is an example in which control information for PDSCHs transmitted from (N-1) additional TRPs is transmitted independently from control information for a PDSCH transmitted by a serving TRP in a situation in which (N-1) different PDSCHs are transmitted from the (N-1) additional TRPs (TRP #1 to TRP #(N-1)) other than the serving TRP (TRP #0) used for single PDSCH transmission. That is, the UE may acquire control information for PDSCHs transmitted from different TRPs (TRP #0 to TRP #(N-1)) through independent DCIs (DCI #0 to DCI #(N-1)). Formats between the independent DCIs may be the same as or different from each other, and payload between the DCIs may also be the same as or different from each other. In case #1, a degree of freedom of PDSCH control or allocation can be completely guaranteed, but when respective pieces of the DCI are transmitted by different TRPs, a difference between DCI coverages may be generated and reception performance may deteriorate.

Case #2 1820 is an example in which pieces of control information for PDSCHs of (N-1) additional TRPs are transmitted and each piece of the DCI is dependent on control information for the PDSCH transmitted from the serving TRP in a situation in which (N-1) different PDSCHs are transmitted from (N-1) additional TRPs (TRP #1 to TRP #(N-1)) other than the serving TRP (TRP #0) used for single PDSCH transmission.

For example, DCI #0 that is control information for a PDSCH transmitted from the serving TRP (TRP #0) may include all information elements of DCI format 1_0, DCI format 1_1, and DCI format 1_2, but shortened DCIs (hereinafter, referred to as sDCIs) (sDCI #0 to sDCI #(N-2)) that are control information for PDSCHs transmitted from the cooperative TRPs (TRP #1 to TRP #(N-1)) may include only some of the information elements of DCI format 1_0, DCI format 1_1, and DCI format 1_2. Accordingly, the sDCI for transmitting control information of PDSCHs transmitted from cooperative TPRs has smaller payload compared to the normal DCI (nDCI) for transmitting control information related to the PDSCH transmitted from the serving TRP, and thus can include reserved bits compared to the nDCI.

In case #2 1820, a degree of freedom of each PDSCH control or allocation may be limited according to content of information elements included in the sDCI, but reception capability of the sDCI is better than the nDCI, and thus a probability of the generation of difference between DCI coverages may become lower.

Case #3 1830 is an example in which one piece of control information for PDSCHs of (N-1) additional TRPs is transmitted and the DCI is dependent on control information for the PDSCH transmitted from the serving TRP in a situation in which (N-1) different PDSCHs are transmitted from (N-1) additional TRPs (TRP #1 to TRP #(N-1)) other than the serving TRP (TRP #0) used for a single PDSCH transmission.

In the case of DCI #0 that is control information for the PDSCH transmitted from the serving TRP (TRP #0), all information elements of DCI format 1_0, DCI format 1_1, and DCI format 1_2 may be included, and in the case of control information for PDSCHs transmitted from cooperative TRPs (TRP #1 to TRP #(N-1)), only some of the information elements of DCI format 1_0, DCI format 1_1, and DCI format 1_2 may be gathered in one "secondary" DCI (sDCI) and transmitted. The sDCI may include at least one piece of HARQ-related information such as frequency domain resource assignment and time domain resource assignment of the cooperative TRPs and the MCS. In addition, information that is not included in the sDCI such as a BWP indicator and a carrier indicator may follow the DCI (DCI #0, normal DCI, or nDCI) of the serving TRP.

In case #3 1830, a degree of freedom of PDSCH control or allocation may be limited according to content of the information elements included in the sDCI but reception performance of the sDCI can be controlled, and case #3 1830 may have smaller complexity of DCI blind decoding of the UE compared to case #1 1810 or case #2 1820.

Case #4 1840 is an example in which control information for PDSCHs transmitted from (N-1) additional TRPs is transmitted in the DCI (long DCI) that is the same as that of control information for the PDSCH transmitted from the serving TRP in a situation in which different (N-1) PDSCHs are transmitted from the (N-1) additional TRPs (TRP #1 to TRP #(N-1)) other than the serving TRP (TRP #0) used for single PDSCH transmission. That is, the UE may acquire control information for PDSCHs transmitted from different TRPs (TRP #0 to TRP #(N-1)) through single DCI. In case #4 1840, complexity of DCI blind decoding of the UE may not be increased, but a degree of freedom of PDSCH control or allocation may be low since the number of cooperative TRPs is limited according to long DCI payload restriction.

The sDCI may refer to various pieces of supplementary DCI such as shortened DCI, secondary DCI, or normal DCI (DCI formats 1_0 and 1_1) including PDSCH control information transmitted in the cooperative TRP, and unless specific restriction is mentioned, the corresponding description may be similarly applied to the various pieces of supplementary DCI.

Case #1 1810, case #2 1820, and case #3 1830 in which one or more pieces of DCI (or PDCCHs) are used to support NC-IT may be classified as multiple PDCCH-based NC-JT, and case #4 1840 in which single DCI (or PDCCH) is used to support NC-IT may be classified as single PDCCH-based NC-JT. In multiple PDCCH-based PDSCH transmission, a CORESET for scheduling the DCI of the serving TRP (TRP #0) is separated from CORESETs for scheduling the DCI of cooperative TRPs (TRP #1 to TRP #(N−1)). A method of distinguishing the CORESETs may include a distinguishing method through a higher-layer indicator for each CORESET and a distinguishing method through a beam configuration for each CORESET. Further, in single PDCCH-based NC-JT, single DCI schedules a single PDSCH having a plurality of layers instead of scheduling a plurality of PDSCHs, and the plurality of layers may be transmitted from a plurality of TRPs. At this time, association between a layer and a TRP transmitting the corresponding layer may be indicated through a TCI indication for the layer.

The "cooperative TRP" may be replaced with various terms such as a "cooperative panel" or a "cooperative beam" when actually applied.

"The case in which NC-JT is applied" may be variously interpreted as "the case in which the UE simultaneously receives one or more PDSCHs in one BWP", "the case in which the UE simultaneously receives PDSCHs on the basis of two or more TCI indications in one BWP", and "the case in which the PDSCHs received by the UE are associated with one or more DMRS port groups" according to circumstances, but is used by one expression for convenience of description.

In the disclosure, a wireless protocol structure for NC-JT may be variously used according to a TRP development scenario. For example, when there is no backhaul delay between cooperative TRPs or there is a small backhaul delay, a method (a CA-like method) using a structure based on MAC layer multiplexing can be used similarly to reference numeral 1620 of FIG. 16. On the other hand, when the backhaul delay between cooperative TRPs is too large to be ignored (for example, when a time of 2 ms or longer is needed to exchange information such as CSI, scheduling, and HARQ-ACK between cooperative TRPs), a method (a DC-like method) of securing a characteristic robust to a delay can be used through an independent structure for each TRP from an RLC layer similarly to reference numeral 1630 of FIG. 16.

The UE supporting C-JT/NC-JT may receive a C-JT/NC-JT-related parameter or a setting value from a higher-layer configuration and set an RRC parameter of the UE on the basis thereof. For the higher-layer configuration, the UE may use a UE capability parameter, for example, tci-StatePDSCH. The UE capability parameter, for example, tci-StatePDSCH may define TCI states for PDSCH transmission, the number of TCI states may be configured as 4, 8, 16, 32, 64, and 128 in FR1 and as 64 and 128 in FR2, and a maximum of 8 states which can be indicated by 3 bits of a TCI field of the DCI may be configured through a MAC CE message among the configured numbers. A maximum value 128 means a value indicated by maxNumberConfiguredTCIstatesPerCC within the parameter tci-StatePDSCH which is included in capability signaling of the UE. As described above, a series of configuration processes from the higher-layer configuration to the MAC CE configuration may be applied to a beamforming indication or a beamforming change command for at least one PDSCH in one TRP.

[Multi-DCI Based Multi-TRP]

As an embodiment of the disclosure, a multi-DCI-based multi-TRP transmission method will be described. According to multi-DCI based multi-TRP transmission method, a downlink control channel for NC-JT may be configured based on multi-PDCCHs.

In NC-JT based on multiple PDCCHs, there may be a CORESET or a search space separated for each TRP when the DCI for scheduling the PDSCH of each TRP is transmitted. The CORESET or the search space for each TRP can be configured according to at least one of the following configuration cases.

A configuration of a higher-layer index for each CORESET: CORESET configuration information configured by a higher layer may include an index value, and a TRP for transmitting a PDCCH in the corresponding CORESET may be identified by the configured index value for each CORESET. That is, in a set of CORESETs having the same higher-layer index value, the same TRP may transmit the PDCCH or the PDCCH for scheduling the PDSCH of the same TRP may be transmitted. The index for each CORESET may be named CORESETPoolIndex, and it may be considered that the PDCCH is transmitted from the same TRP in CORESETs in which the same CORESETPoolIndex value is configured. In the CORESET in which the same CORESETPoolIndex value is not configured, a default value of CORESETPoolIndex may be configured, and the default value may be 0.

In the disclosure, when the number of types of CORESETPoolIndex of each of a plurality of CORESETs included in higher-layer signaling PDCCH-Config is larger than 1, that is, when respective CORESETs have different CORESETPoolIndex, the UE may consider that the BS can use a multi-DCI-based multi-TRP transmission method.

Unlike this, in the disclosure, when the number of types of CORESETPoolIndex of each of a plurality of CORESETs included in higher-layer signaling PDCCH-Config is 1, that is, when all CORESETs have the same CORESETPoolIndex of 0 or 1, the UE may consider that the BS performs transmission using a single-TRP without using the multi-DCI-based multi-TRP transmission method.

A configuration of multiple PDCCH-Config: a plurality of PDCCH-Config are configured in one BWP, and each PDCCH-Config may include a PDCCH configuration for each TRP. That is, a list of CORESETs for each TRP and/or a list of search spaces for each TRP may be included in one PDCCH-Config, and one or more CORESETs and one or more search spaces included in one PDCCH-Config may correspond to a specific TRP.

A configuration of a CORESET beam/beam group: a TRP that corresponds to the corresponding CORESET may be identified through a beam or a beam group configured for each CORESET. For example, when the same TCI state is configured in a plurality of CORESETs, the corresponding CORESETs may be transmitted through the same TRP or a PDCCH for scheduling a PDSCH of the same TRP may be transmitted in the corresponding CORESET.

A configuration of a search space beam/beam group: a beam or a beam group is configured for each search space, and a TRP for each search space may be identified therethrough. For example, when the same beam/beam group or TCI state is configured in a plurality of search spaces, the same TRP may transmit the PDCCH in the corresponding search space or a PDCCH for scheduling a PDSCH of the same TRP may be transmitted in the corresponding search space.

As described above, by separating the CORESETs or search spaces for each TRP, it is possible to divide PDSCHs and HARQ-ACK for each TRP and accordingly to generate an independent HARQ-ACK codebook for each TRP and use an independent PUCCH resource.

The configuration may be independent for each cell or BWP. For example, while two different CORESETPoolIndex values may be configured in the primary cell (PCell), no CORESETPoolIndex value may be configured in a specific SCell. In this case, NC-JT may be configured in the PCell, but NC-JT may not be configured in the SCell in which no CORESETPoolIndex value is configured.

A PDSCH TCI state activation/deactivation MAC-CE which can be applied to the multi-DCI-based multi-TRP transmission method may follow FIG. 19. Here, the meaning of each field in the MAC CE and possible values for each field are shown in Table 32.

1955 within the corresponding MAC-CE 1950 is 0, a TCI state within the DCI included in PDCCHs transmitted by the CORESETs having CORESETPoolIndex of 0 may follow activation information of the corresponding MAC-CE.

When the UE receives a configuration indicating that the multi-DCI-based multi-TRP transmission method can be used from the BS, that is, the number of types of CORESETPoolIndex of a plurality of CORESETs included in higher-layer signaling PDCCH-Config is larger than 1 or respective CORESETs have different CORESETPoolIndex, the UE may know that there are the following restrictions on PDSCHs scheduled by PDCCHs within respective CORESETs having different two CORESETPoolIndex.

When PDSCH indicated by PDCCHs within respective CORESETs having different two CORESETPoolIndex completely or partially overlap, the UE may apply TCI states indicated by the respective PDCCHs to different CDM groups. That is, two or more TCI states may not be applied to one CDM group.

When PDSCH indicated by PDCCHs within respective CORESETs having different two CORESETPoolIndex completely or partially overlap, the UE may expect that the numbers of actual front loaded DMRS symbols of respective PDSCHs, the numbers of actual additional DMRS symbols, locations of actual DMRS symbols, and DMRS types are not different.

TABLE 32

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;

BWP ID: This field indicates a DL BWP for which the MAC CE applies as the codepoint of the DCI bandwidth part indicator field as specified in TS 38.212 [9]. The length of the BWP ID field is 2 bits. This field is ignored if this MAC CE applies to a set of Serving Cells;

Ti (TCI state ID): If there is a TCI state with TCI-StateId i as specified in TS 38.331 [5], this field indicates the activation/deactivation status of the TCI state with TCI-StateId i, otherwise MAC entity may ignore the Ti field. The Ti field is set to 1 to indicate that the TCI state with TCI-StateId i may be activated and mapped to the codepoint of the DCI Transmission Configuration Indication field, as specified in TS 38.214 [7]. The Ti field is set to 0 to indicate that the TCI state with TCI-StateId i may be deactivated and is not mapped to the codepoint of the DCI Transmission Configuration Indication field. The codepoint to which the TCI State is mapped is determined by its ordinal position among all the TCI States with Ti field set to 1, i.e. the first TCI State with Ti field set to 1 may be mapped to the codepoint value 0, second TCI State with Ti field set to 1 may be mapped to the codepoint value 1 and so on. The maximum number of activated TCI states is 8;

CORESET Pool ID: This field indicates that mapping between the activated TCI states and the codepoint of the DCI Transmission Configuration Indication set by field Ti is specific to the ControlResourceSetId configured with CORESET Pool ID as specified in TS 38.331 [5]. This field set to 1 indicates that this MAC CE may be applied for the DL transmission scheduled by CORESET with the CORESET pool ID equal to 1, otherwise, this MAC CE may be applied for the DL transmission scheduled by CORESET pool ID equal to 0. If the coresetPoolIndex is not configured for any CORESET, MAC entity may ignore the CORESET Pool ID field in this MAC CE when receiving the MAC CE. If the Serving Cell in the MAC CE is configured in a cell list that contains more than one Serving Cell, the CORESET Pool ID field may be ignored when receiving the MAC CE.

When the UE does not receive a configuration of CORESETPoolIndex for each of all CORESETs within higher-layer signaling PDCCH-Config, the UE may ignore a CORESET Poll ID field 1955 within the corresponding MAC-CE 1950. When the UE can support the multi-DCI-based multi-TRP transmission method, that is, when respective CORESETs within higher-layer signaling PDCCH-Config have different CORESETPoolIndex, the UE may activate a TCI state within the DCI included in PDCCHs transmitted in CORESETs having CORESETPoolIndex which is the same as a value of the CORESET Poll ID field 1955 within the corresponding MAC-CE 1950. For example, when the value of the CORESET Poll ID field The UE may expect that bandwidth parts indicated by PDCCHs within respective CORESETs having different two CORESETPoolIndex are the same and subcarrier spacings are also the same.

The UE may expect that information on PDSCH scheduled by PDCCHs within respective CORESETs having different two CORESETPoolIndex are completely included in respective PDCCHs.

[Single-DCI Based Multi-TRP]

As an embodiment of the disclosure, a single-DCI-based multi-TRP transmission method is described. The single- DCI-based multi-TRP transmission method may configure a downlink control channel for NC-JT on the basis of a single PDCCH.

In single DCI based multi-TRP transmission method, PDSCH transmitted by a plurality of TRPs may be scheduled by one piece of the DCI. At this time, as a method of indicating the number of TRPs transmitting the corresponding PDSCHs, the number of TCI states may be used. That is, when the number of TCI states indicated by the DCI for scheduling the PDSCHs is 2 (i.e., when the number of TCI states corresponding to a codepoint of a TCI state field in the DCI is 2), it may be assumed to single PDCCH-based NC-JT transmission, and single-TRP transmission may be considered when the number of TCI states is 1. The TCI states indicated by the DCI may correspond to one or two TCI states among TCI states activated by the MAC CE. When the TCI states of the DCI correspond to two TCI states activated by the MAC CE, a TCI codepoint indicated by the DCI is associated with the TCI states activated by the MAC CE, in which case the number of TCI states activated by the MAC CE, corresponding to the TCI codepoint, may be 2.

In another example, when at least one of all codepoints of the TCI state field within the DCI indicate two TCI states, the UE may consider that the BS can perform transmission on the basis of the single-DCI-based multi-TRP method. At this time, at least one codepoint indicating two TCI states within the TCI state field may be activated through an enhanced PDSCH TCI state activation/deactivation MAC-CE.

FIG. 20 illustrates an enhanced PDSCH TCI state activation/deactivation MAC-CE format according to an embodiment of the disclosure. The meaning of each field within the MAC CE and a value configurable in each field are as described in Table 33 below.

The configuration may be independent for each cell or BWP. For example, while a maximum number of activated TCI states corresponding to one TCI codepoint is 2 in the primary cell (PCell), a maximum number of activated TCI states corresponding to one TCI codepoint may be 1 in a specific SCell. In this case, NC-JT may be configured in the PCell but NC-JT may not be configured in the SCell.

[Method of Distinguishing Single-DCI-Based Multi-TRP PDSCH Repetitive Transmission Schemes (TDM/FDM/SDM)]

Subsequently, a method of distinguishing single-DCI-based multi-TRP PDSCH repetitive transmission schemes is described. The UE may receive an indication of different single-DCI-based multi-TRP PDSCH repetitive transmission schemes (for example, TDM, FDM, and SDM) from the BS according to a value indicated by a DCI field and a higher-layer signaling configuration. Table 34 below shows a method of distinguishing single or multi-TRP-based schemes according to a specific DCI field value and a higher-layer signaling configuration.

TABLE 34

| Combination | Number of TCI states | Number of CDM groups | repetition Number configuration and indication condition | Related to repetition Scheme configuration | Transmission scheme indicated to UE |
|---|---|---|---|---|---|
| 1 | 1 | ≥1 | Condition 2 | Not configured | Single-TRP |
| 2 | 1 | ≥1 | Condition 2 | Configured | Single-TRP |
| 3 | 1 | ≥1 | Condition 3 | Configured | Single-TRP |

TABLE 33

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;

BWP ID: This field indicates a DL BWP for which the MAC CE applies as the codepoint of the DCI bandwidth part indicator field as specified in TS 38.212 [9]. The length of the BWP ID field is 2 bits;

Ci: This field indicates whether the octet containing TCI state IDi,2 is present. If this field is set to "1", the octet containing TCI state IDi,2 is present. If this field is set to "0", the octet containing TCI state IDi,2 is not present;

TCI state IDi,j: This field indicates the TCI state identified by TCI-StateId as specified in TS 38.331 [5], where i is the index of the codepoint of the DCI Transmission configuration indication field as specified in TS 38.212 [9] and TCI state IDi,j denotes the j-th TCI state indicated for the i-th codepoint in the DCI Transmission Configuration Indication field. The TCI codepoint to which the TCI States are mapped is determined by its ordinal position among all the TCI codepoints with sets of TCI state IDi,j fields, i.e. the first TCI codepoint with TCI state ID0,1 and TCI state ID0,2 may be mapped to the codepoint value 0, the second TCI codepoint with TCI state ID1,1 and TCI state ID1,2 may be mapped to the codepoint value 1 and so on. The TCI state IDi,2 is optional based on the indication of the Ci field. The maximum number of activated TCI codepoint is 8 and the maximum number of TCI states mapped to a TCI codepoint is 2.

R: Reserved bit, set to "0".

Referring to FIG. 20, when a value of a C0 field 2005 is 1, the corresponding MAC-CE may include a TCI state ID0,2 field 2015 in addition to a TCI state ID0,1 field 2010. This means that a TCI state ID0,1 and a TCI state ID0,2 are activated for a zeroth codepoint of the TCI state field included within the DCI, and when the BS indicates the corresponding codepoint to the UE, the UE may receive an indication of two TCI states. When a value of the C0 field 2005 is 0, the corresponding MAC-CE cannot include the TCI state ID0,2 field 2015, which means that one TCI state corresponding to the TCI state ID0,1 is activated for the zeroth codepoint of the TCI state field included in the DCI. In this case, the BS may indicate one TCI state to the UE.

TABLE 34-continued

| Combination | Number of TCI states | Number of CDM groups | repetition Number configuration and indication condition | Related to repetition Scheme configuration | Transmission scheme indicated to UE |
|---|---|---|---|---|---|
| 4 | 1 | 1 | Condition 1 | Configured or not configured | Single-TRP TDM scheme B |

TABLE 34-continued

| Com-bination | Number of TCI states | Number of CDM groups | repetition Number configuration and indication condition | Related to repetition Scheme configuration | Transmission scheme indicated to UE |
|---|---|---|---|---|---|
| 5 | 2 | 2 | Condition 2 | Not configured | Multi-TRP SDM |
| 6 | 2 | 2 | Condition 3 | Not configured | Multi-TRP SDM |
| 7 | 2 | 2 | Condition 3 | Configured | Multi-TRP SDM |
| 8 | 2 | 1 | Condition 3 | Configured | Multi-TRP FDM scheme A/FDM scheme B/TDM scheme A |
| 9 | 2 | 2 | Condition 1 | Not configured | Multi-TRP TDM scheme B |

Each column in Table 34 above is described below.

Number of TCI states (second column): means the number of TCI states indicated by a TCI state field within the DCI and may be 1 or 2.

Number of CDM groups (third column): means the number of different CDM groups of DRMS ports indicated by an antenna port field within the DCI. The number of CDM groups may be 1, 2, or 3.

RepetitionNumber configuration and indication condition (fourth column): has three conditions according to whether repetitionNumber for all TDRA entries which can be indicated by a time domain resource allocation field within the DCI is configured and whether an actually indicated TDRA entry has a repetitionNumber configuration.

Condition 1: case in which at least one of all TDRA entries which can be indicated by the time domain resource allocation field includes the configuration for repetition Number and the TDRA entry indicated by the time domain resource allocation field within the DCI includes the configuration of repetition Number larger than 1.

Condition 2: case in which at least one of all TDRA entries which can be indicated by the time domain resource allocation field includes the configuration for repetitionNumber and the TDRA entry indicated by the time domain resource allocation field within the DCI does not include the configuration for repetition Number.

Condition 3: case in which all TDRA entries which can be indicated by the time domain resource allocation field do not include the configuration for repetitionNumber.

Related to a repetitionScheme configuration (fifth column): means whether repetitionScheme which is higher-layer signaling is configured. RepetitionScheme which is higher-layer signaling may receive a configuration of one of 'tdmSchemeA', and 'fdmSchemeA', 'fdmSchemeB'.

Transmission scheme indicated to UE (sixth column): means single or multiple-TRP schemes indicated according to each combination (first column) expressed by Table 34 above.

Single-TRP: means single-TRP-based PDSCH transmission. When the UE receives a configuration of pdsch-AggegationFactor within higher-layer signaling PDSCH-config, the UE may receive scheduling of single TRP-based PDSCH repetitive transmission a number of times received through the configuration. Otherwise, the UE may receive scheduling of single TRP-based PDSCH single transmission.

Single-TRP TDM scheme B: means time resource division-based PDSCH repetitive transmission between single TRP-based slots. The UE repeatedly transmits a PDSCH on a time dimension a number of times corresponding to the number of slots of repetitionNumber larger than 1 configured in the TDRA entry indicated by the time domain resource allocation field according to condition 1 related to repetitionNumber. At this time, a start symbol and a symbol length of the PDSCH indicated by the TDRA entry is equally applied to every slot corresponding to repetitionNumber and the same TCI state is applied to each PDSCH repetitive transmission. The corresponding scheme is similar to a slot aggregation scheme in that the PDSCH repetitive transmission between slots is performed in time resources but is different therefrom in that a repetitive transmission indication is dynamically determined on the basis of the time domain resource allocation field within the DCI.

Multi-TRP SDM: means a multi-TRP-based space resource division PDSCH transmission scheme. This is a method of dividing a layer and performing reception from each TRP and may increase reliability of PDSCH transmission in that transmission can be performed at a lowered coding rate through an increase in the number of layers even though it is not the repetitive transmission scheme. The UE may receive a PDSCH by applying each of two TCI states indicated through the TCI state field within the DCI to two CDM groups indicated by the BS.

Multi-TRP FDM scheme A: means a multi-TRP-based frequency resource division PDSCH transmission scheme and is a scheme having one PDSCH transmission occasion and capable of performing transmission with higher reliability by increasing frequency resources and lowering a coding rate even though is not the repetitive transmission such as multi-TRP SDM. Multi-TRP FDM scheme A may apply two TCI states indicated through the TCI state field within the DCI to frequency resources which do not overlap each other. When the PRB bundling size is determined as a wideband and the number of RBs indicated by the frequency domain resource allocation field is N, the UE may receive first ceil (N/2) RBs by applying a first TC state and receive the remaining floor (N/2) RBs by applying a second TCI state. Here, ceil(•) and floor(•) are operators indicating rounding up and rounding down at the first decimal place. When the PRB bundling size is determined as 2 or 4, even-numbered PRGs are received by applying a first TCI state and odd-numbered PRGs are received by applying a second TCI state.

Multi-TRP FDM scheme B: means a multi-TRP-based frequency resource division PDSCH repetitive transmission scheme and has two PDSCH transmission occasions to repeatedly transmit a PDSCH at each occasion. Like A, multi-TRP FDM scheme B may also apply two TCI states indicated through the TCI state field within the DCI to frequency resources which do not overlap each other. When the PRB bundling size is determined as a wideband and the number of RBs indicated by the frequency domain resource allocation field is N, the UE may receive first ceil (N/2) RBs by applying a first TC state and receive the remaining floor (N/2) RBs by applying a second TCI state. Here, ceil(•) and floor(•) are operators indicating rounding up and rounding down at the first decimal place. When the PRB bundling size is determined as 2 or 4, even-numbered PRGs are received by applying a first TCI state and odd-numbered PRGs are received by applying a second TCI state.

Multi-TRP TDM scheme A: means a PDSCH repetitive transmission scheme within a multi-TRP-based time resource division slot. The UE has two PDSCH transmission occasion within one slot, and a first reception occasion may be determined on the basis of a start symbol and a symbol length of the PDSCH indicated through the time domain resource allocation field within the DCI. A start symbol of a second reception occasion of the PDSCH may be an occasion to which a symbol offset by higher-layer signaling StartingSymbolOffsetK from the last symbol of the first transmission occasion, and the transmission occasion corresponding to the symbol length indicated therefrom may be determined. When higher-layer signaling StartingSymbolOffsetK is not configured, the symbol offset may be considered as 0.

Multi-TRP TDM scheme B: means a PDSCH repetitive transmission scheme between multi-TRP-based time resource division slots. The UE has one PDSCH transmission occasion within one slot and may receive repetitive transmission on the basis of a start symbol and a symbol length of the same PDSCH during slots corresponding to repetition Number indicated by the time domain resource allocation field within the DCI. When repetitionNumber is 2, the UE may receive PDSCH repetitive transmission of first and second slots by applying first and second TCI states, respectively. When repetitionNumber is larger than 2, the UE may use different TCI state schemes according to configured higher-layer signaling teiMapping. When tciMapping is configured as cyclicMapping, first and second TCI states may be applied to first and second PDSCH transmission occasions, respectively, and the same TCI state application method is equally applied to the remaining PDSCH transmission occasions. When tciMapping is configured as sequenticalMapping, a first TCI state may be applied to first and second PDSCH transmission occasions, a second TCI state may be applied to third and fourth PDSCH transmission occasions, and the same TCI state application method may be equally applied to the remaining PDSCH transmission occasions.

[SRS: Carrier Switching]

Next, SRS carrier switching will be described.

In the TDD system, SRS carrier switching is used to perform the SRS transmission for supporting downlink channel estimation of a base station with respect to a support cell in which PUSCH/PUCCH transmission is not configured, that is, a cell supporting only downlink transmission. Since channel reciprocity is established between a downlink channel and an uplink channel in the TDD system, the base station may estimate a downlink channel based on an uplink channel estimated through the SRS. In case that the base station performs a support using a very large number of antennas but the UE performs a support using a relatively small number of antennas, the method of estimating the downlink channel through the SRS-based channel reciprocity has the advantage of requiring a smaller overhead compared to the method of estimating the CSI-RS-based downlink channel.

In order to transmit the SRS to a cell supporting only downlink transmission through SRS carrier switching, the UE should use an RF transmitter for uplink transmission of one cell among other cells. A target cell for performing SRS carrier switching (hereinafter referred to as a target cell or target component carrier (CC)) is in a frequency band for supporting only downlink transmission in which PUCCH/PUSCH transmission is not configured, the UE does not use the RF transmitter except for the purpose of SRS carrier switching. Therefore, when considering the cost of the UE, and the like, there is no separate arrangement of an RF transmitter for uplink transmission to a target cell for performing SRS carrier switching, and when SRS carrier switching is scheduled (hereinafter, scheduling for performing SRS carrier switching may include both downlink control information (DCI) format 2_3 based aperiodic (AP) triggering or higher layer configuration based semi-persistent (SP) or periodic (P) triggering based scheduling), the UE may be configured to transmit the SRS by retuning a RF transmitter for uplink transmission of another cell.

A cell in which the RF transmitter is arranged before the UE retuning in order to perform the SRS carrier switching may be defined as a source cell (hereinafter, referred to as a source cell or source CC), which may be configured in the UE through higher layer parameter srs-SwitchFromServCellIndex and srs-SwitchFromCarrier. The higher layer parameter srs-SwitchFromServCellIndex indicates the cell index of the source CC, and the srs-SwitchFromCarrier indicates one of the NUL and SUL of the target CC to determine the RF transmitter that the UE needs to retune.

When performing SRS carrier switching, the UE requires a retuning time, which is a time taken the RF transmitter of the source CC to prepare to transmit the SRS to the target CC, and a time to retune the RF transmitter to the source CC after transmitting all the SRSs to the target CC. This is a time additionally required in addition to the preparation time required to transmit an SRS for a purpose other than SRS carrier switching. As described above, with regard to a retuning time of the RF transmitter required before and after performing SRS carrier switching, the UE may report the UE capability to the base station and notify the base station of the required time. In this case, the UE may report the retuning time of the RF transmitter to the base station through switchingTimeUL and switching TimeDL.

Since the UE retunes the RF transmitter in the source CC to perform SRS carrier switching, the UE may be configured not to transmit an uplink signal (e.g., PUCCH, PUSCH, or SRS) to the source CC while transmitting the SRS to the target CC. Therefore, in order to perform SRS carrier switching, the UE identifies first whether the uplink transmission scheduled for the source CC overlaps with the SRS transmission including the RF retuning time. If the uplink transmission scheduled for the source CC and the SRS transmission scheduled for the target CC (including a retuning time) overlap, and the simultaneous transmission behind the UE's indicated UL CA capability is not possible, the UE may compare the priorities between the two signals and transmit only one uplink signal.

Here, the priority for SRS carrier switching defined in NR release 15/16 is as follows:

If PUSCH or PUCCH including one or multiple pieces of information of HARQ-ACK/positive scheduling request (SR)/rank indicator (RI)/CSI-RS resource indicator (CRI)/SS/PBCH block resource indicator (SSBRI) and/or physical random access channel (PRACH) in the source CC overlap with the SRS transmission in the target CC, the UE may be configured not to perform the SRS transmission of the target CC. That is, the UE may transmit a scheduled uplink signal on the source CC without performing SRS carrier switching.

If the PUSCH including aperiodic CSI in the source CC overlaps the periodic or semi-persistent SRS transmission in the target CC, the UE may be configured not to perform the periodic or semi-persistent SRS transmission of the target CC. That is, the UE may transmit the scheduled uplink signal on the source CC without performing SRS carrier switching.

If PUCCH or PUSCH including periodic or semi-persistent CSI including one or multiple pieces of information of only channel quality indicator (CQI)/precoding matrix indicator (PMI)/layer 1 reference signal received power (L1-

RSRP)/layer 1 signal to interference plus noise ratio (L1-SINR) and/or SRS in the source CC overlap with the SRS transmission in the target CC, the UE may be configured not to perform the PUCCH or PUSCH and/or SRS transmission of the source CC. That is, the UE may be configured to perform SRS carrier switching so as to transmit the SRS to the target CC.

If PUSCH including aperiodic CSI including one or multiple pieces of information of only CQI/PMI/L1-RSRP/L1-SINR in the source CC overlaps with aperiodic SRS transmission in the target CC, the UE may be configured not to perform PUSCH transmission of the source CC. That is, the UE may be configured to perform SRS carrier switching so as to transmit the aperiodic SRS to the target CC.

When comparing a priority between the uplink transmission of the source CC and the SRS transmission of the target CC, the UE should consider a time to receive and decode the DCI for scheduling each transmission, a time to determine uplink transmission according to the higher layer configuration, a preparation time required to perform uplink signal transmission, and an SRS transmission preparation time to which the RF retuning time of the target CC is added. This is because if the UE prepares for one of the uplink transmission of the source CC and the SRS transmission of the target CC, cancellation is not possible.

For example, while the UE is preparing for the SRS transmission to the already scheduled target CC (considering all the preparation times, such as DCI decoding and RF retuning time), even when the DCI for scheduling uplink signal transmission having a higher priority to the source CC is received, the UE may be configured not to cancel the SRS transmission to the target CC. This case is classified as a scheduling error case, and the base station should consider the following conditions when performing SRS carrier switching. In order to cancel one of specific transmissions (uplink signal transmission in a source CC or SRS transmission in a target CC), the UE may start SRS transmission in symbol $N_{C_1}$ of carrier $c_1$ (target CC), and the UE may apply the above-mentioned priority rule (a priority rule between the uplink transmission of the source CC and the SRS transmission of the target CC) with regard to conflicting uplink transmission in symbol $N_{C_2}$ of carrier $c_2$ (source CC), by considering the following conditions:

DCI(s) should be received by the UE so that the interval between the last symbol of the PDCCH and $N_{C_1}$ is at least greater than the value obtained by adding $N_2$ symbol and $T_{SRS_{CS}}$, and the interval between the last symbol of the PDCCH and $N_{C_2}$ is at least greater than $N_2$ symbol. In this case, the DCI may correspond to both DCI for scheduling uplink signal transmission in the source CC and DCI for scheduling SRS transmission in the target CC.

Semi-persistent CSI reporting or SRS transmission is activated before an interval at least greater than the value obtained by adding $N_2$ symbol and $T_{SRS_{CS}}$ based on $N_{C_1}$, and should be activated before an interval at least greater than $N_2$ symbol based on $N_{C_2}$. In this case, the activated transmission may include both uplink transmission in the source CC and SRS transmission in the target CC.

Here, $T_{SRS_{CS}}$ corresponds to $T_{SRS_{CS}}$=max{switchingTimeUL, switchingTimeDL}, and the time interval unit of the OFDM symbol is determined based on the smallest subcarrier spacing (SCS) among $c_1$, $c_2$, and the corresponding scheduling cell (if the overlapping uplink signal is not transmitted to the target CC or source CC). $N_2$ denotes a processing capability according to the UE capability for the PUSCH preparation time to be described later.

When the UE receives the SRS request through the DCI (or grant) for the target CC c and transmits the n-th aperiodic SRS, the UE may start the SRS transmission to the configured symbol and slot satisfying the following conditions:

The configured symbol and slot corresponds to a value later than the total sum of the detailed conditions below.

The maximum time interval among the time intervals as many as the number of N OFDM symbols for a cell including the target CC and DCI (or grant), respectively Uplink or downlink RF retuning time defined by switchingTimeUL and switchingTimeDL of higher layer parameter SRS-SwitchingTimeNR There is no conflict with any previous SRS transmission (SRS transmission before the n-th aperiodic SRS), and there is no interruption due to uplink or downlink RF retuning time.

When the above condition is not satisfied, the UE does not perform transmission of the n-th SRS. Here, N refers to the minimum time interval in symbol units between an aperiodic SRS and the DCI for triggering the aperiodic SRS, and corresponds to a value reported as UE capability.

In a case of inter-band carrier aggregation (CA), the UE may simultaneously transmit SRS and PUCCH/PUSCH with respect to component carriers (CCs) of different bands based on the UE capability.

In a case of inter-band carrier aggregation (CA), the UE may simultaneously transmit PRACH and SRS with respect to component carriers (CCs) of different bands based on the UE capability.

Figure 21:
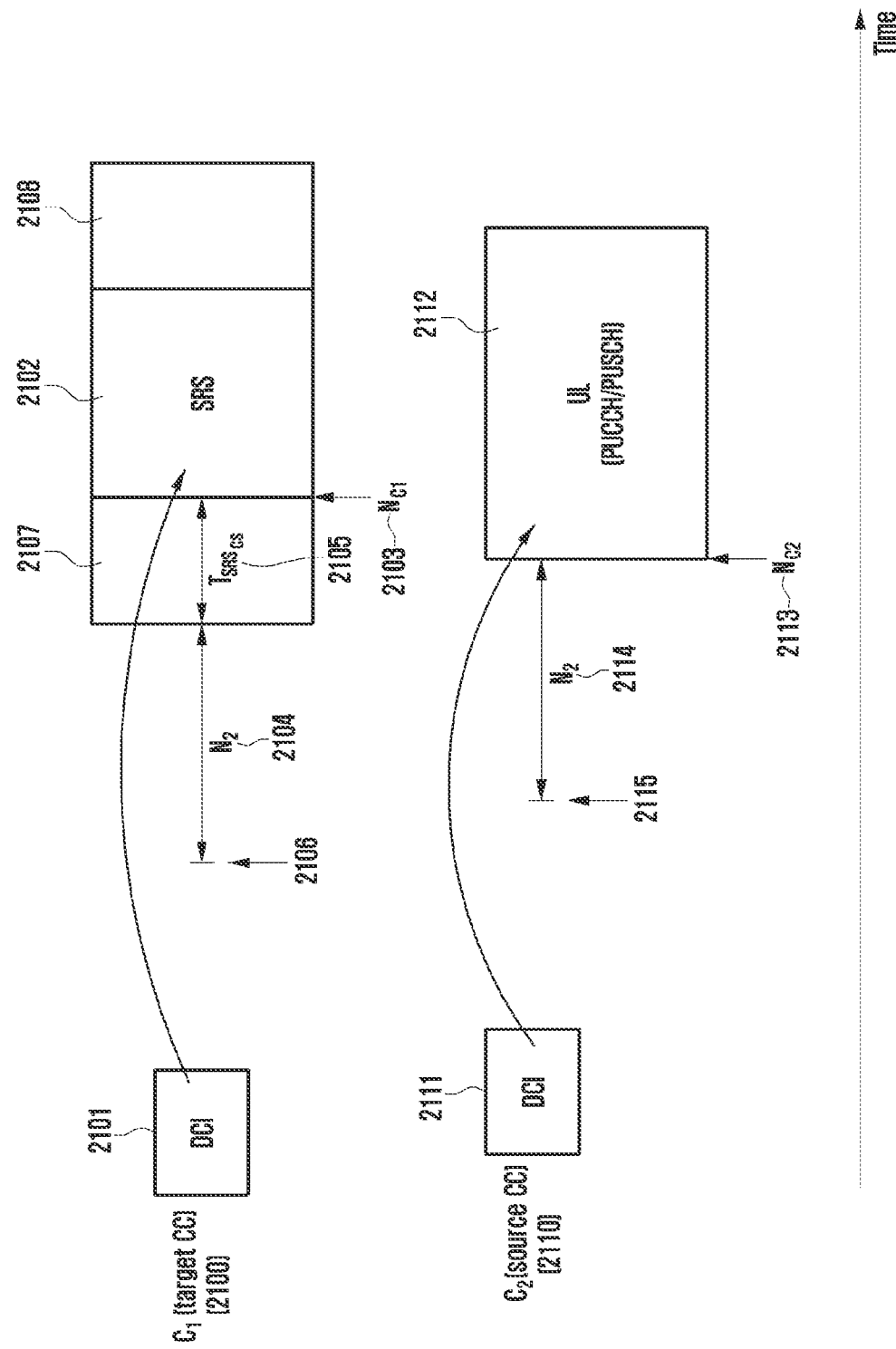
FIG. 21 illustrates an example of SRS carrier switching according to an embodiment of the disclosure.

FIG. 21 illustrates an example of SRS carrier switching according to an embodiment of the disclosure.

In FIG. 21, the DCI 2101 received from a target CC 2100 may schedule the SRS transmission 2102 through SRS carrier switching. The DCI 2111 received from a source CC 2110 may schedule uplink transmission 2112 which may overlap with the SRS transmission 2102. Here, based on the SRS transmission start symbol $N_{C_1}$ 2103, two DCIs should be received at least before the value obtained by adding $N_2$ 2104 symbol and $T_{SRS_{CS}}$ 2105 (indicated by reference numeral 2106). Additionally, two DCIs should be received at least before $N_2$ 2114 symbol (indicated by reference numeral 2115) based on the uplink transmission start symbol $N_{C_1}$ 2113 in the source CC. In FIG. 21, reference numeral 2107 denotes a time required for RF retuning from downlink to uplink in order to perform SRS carrier switching, and reference numeral 2108 denotes a time required for RF retuning from uplink to downlink after SRS carrier switching is performed.

[Half-Duplex TDD CA]

Next, a case in which a UE supports half duplex TDD CA in an environment in which a plurality of support cells are configured will be described in detail.

When the UE satisfies the following conditions, the UE supports half duplex TDD CA and may perform collision handling based thereon:

Multiple cells are configured for the UE, and higher layer parameter directional CollisionHandling-r16 is configured to be 'enabled' for a set of supported cell(s) among the configured multiple cells, The UE indicates to support the capability for half-DuplexTDD-CA-SameSCS-r16, and The UE is configured not to monitor a PDCCH including DCI format 2_0 for any of the multiple support cells.

The UE satisfying the above conditions may determine a reference cell for one symbol to be an active cell having the smallest cell index among the following supporting cells:

if simultaneous transmission and reception of the UE as indicated by simultaneousRxTxInterBandCA among multiple cells are not possible, the corresponding configured multiple serving cells, and if simultaneous transmission and reception of the UE as indicated by simultaneousRxTxInterBandCA with regard to the configured multiple cells are possible, cells of respective bands.

Here, the symbol may be determined via uplink or downlink through the following rules:

The symbol is determined via downlink or uplink indicated by a higher layer parameter tdd-UL-DL-ConfigurationCommon or tdd-UL-DL-ConfigurationDedicated.

If the symbol is flexible and the UE is configured to transmit SRS, PUCCH, PUSCH, or PRACH to the symbol, the symbol is determined via uplink.

If the symbol is flexible and the UE is configured to receive PDCCH, PDSCH, or CSI-RS in the symbol, the symbol is determined via downlink.

If another cell (different from a reference cell) among the cells to which the higher layer parameter directionalCollisionHandling-r16 is configured is supported in the same frequency band as that of the reference cell, the UE may not expect the following cases to occur:

The UE may not expect a symbol to be indicated via downlink or uplink with respect to a reference cell and indicated via uplink or downlink with respect to another cell by the higher layer parameter tdd-UL-DL-ConfigurationCommon or tdd-UL-DL-ConfigurationDedicated. That is, the UE may not expect the symbol to be indicated via downlink with respect to a reference cell and the symbol to be indicated via uplink with respect to another cell by the higher layer parameter tdd-UL-DL-ConfigurationCommon or tdd-UL-DL-ConfigurationDedicated. Similarly, the UE may not expect the symbol to be indicated via uplink with respect to a reference cell and the symbol to be indicated via downlink with respect to another cell by the higher layer parameter tdd-UL-DL-ConfigurationCommon or tdd-UL-DL-ConfigurationDedicated.

The UE may not expect the symbol to be indicated via downlink with respect to a reference cell and the symbol to be indicated via uplink with respect to another cell by the higher layer parameter tdd-UL-DL-ConfigurationCommon or tdd-UL-DL-ConfigurationDedicated.

The UE may not expect a reference cell to be configured via a higher layer to receive PDCCH, PDSCH, or CSI-RS in a flexible symbol, and another cell to detect the DCI format for scheduling uplink transmission in a corresponding symbol.

If a reference cell and another cell (different from the reference cell) among cells to which the higher layer parameter directionalCollisionHandling-r16 is configured are supported in different frequency bands, the UE may consider the following:

If the higher layer parameter tdd-UL-DL-ConfigurationCommon or tdd-UL-DL-ConfigurationDedicated indicates a symbol via downlink or uplink with respect to another cell, and indicates a symbol via uplink or downlink with respect to a reference cell, respectively, the UE assumes that the symbol is a flexible symbol, is not requested to receive PDCCH, PDSCH, or CSI-RS according to the higher layer configuration, and does not expect to transmit the SRS, PUCCH, PUSCH, or PRACH according to the higher layer configuration.

When the symbol is indicated via downlink by the higher layer parameter tdd-UL-DL-ConfigurationCommon or tdd-UL-DL-ConfigurationDedicated, the UE transmits a signal/channel scheduled by the DCI format to the symbol for another cell.

If the UE detects a DCI format for scheduling uplink transmission in one or more symbols for another cell, the UE is not requested to receive the PDCCH, PDSCH, or CSI-RS configured in the higher layer configuration in a flexible symbol for the reference cell.

Regardless of whether the reference cell and another cell operate in the same or different frequency band, the UE may consider the following:

The UE does not expect to indicate a symbol via uplink by the higher layer parameter tdd-UL-DL-ConfigurationCommon or tdd-UL-DL-ConfigurationDedicated for the reference cell, and to detect a DCI format for scheduling to receive a downlink in the symbol with respect to another cell.

The UE does not expect to perform configuration to transmit SRS, PUCCH, PUSCH, or PRACH in a flexible symbol with respect to the reference cell according to a higher layer, and detect a DCI format for scheduling to receive a downlink in the symbol with respect to another cell.

If at least one symbol among the symbol set for the reference cell is configured via downlink by the higher layer parameter tdd-UL-DL-ConfigurationCommon or tdd-UL-DL-ConfigurationDedicated, or to receive PDCCH, PDSCH, CSI-RS according to a higher layer, the UE does not perform transmission of PUCCH, PUSCH, or PRACH according to the higher layer configuration to a symbol set for another cell.

If the symbol set for the reference cell is configured via downlink by the higher layer parameter tdd-UL-DL-ConfigurationCommon or tdd-UL-DL-ConfigurationDedicated, or to receive PDCCH, PDSCH, or CSI-RS according to a higher layer, the UE does not perform transmission of the SRS according to the higher layer configuration to a symbol set for another cell.

If at least one symbol of the symbol set for the reference cell is configured to be an uplink by the higher layer parameter tdd-UL-DL-ConfigurationCommon or tdd-UL-DL-ConfigurationDedicated, or to transmit SRS, PUCCH, PUSCH, or PRACH, the UE does not receive PDCCH, PDSCH, or CSI-RS according to higher layer configuration in a symbol set for another cell.

If the UE transmits SRS, PUCCH, PUSCH, or PRACH or receives PDCCH, PDSCH, or CSI-RS according to the higher layer configuration for the reference cell, the UE assumes that a symbol configured via downlink or uplink by the higher layer parameter tdd-UL-DL-ConfigurationCommon or tdd-UL-DL-ConfigurationDedicated to be a flexible symbol.

The UE does not expect to detect the first DCI format for scheduling transmission or reception in a symbol for the first cell and detecting the second DCI format for scheduling reception or transmission in a symbol for the second cell, respectively.

After the UE performs directional collision handling for the set of cells in which directionalCollisionHandling-r16 is configured according to the rules and procedures described above, the UE does not expect any directional collision between support cells in which the UE may be configured not to perform simultaneous transmission and reception.

On the other hand, a directional collision may occur with respect to specific symbols for a CC existing in the same frequency band as that of the reference cell or in a frequency band different from that of the reference cell, in particular, symbols that are configured to be flexible so that downlink reception or uplink transmission is possible. Specifically, when SRS carrier switching is scheduled, a directional collision may occur between the SRS transmission for which SRS carrier switching is scheduled and downlink signal/ channel reception of a reference cell. In this case, the UE applies the procedures for collision handling according to the half-duplex TDD CA and a priority rule for determining whether to perform SRS carrier switching so as to determine the signal/channel to be finally transmitted/received by the UE. However, in a specific overlap situation, the signal/channel finally transmitted and received by the UE may vary depending on the order of applying the procedure for directional collision handling and the priority rule for SRS carrier switching. In this case, ambiguity may occur in the UE operation, and inconsistency may occur in the operations between the base station and the UE.

In the disclosure, when SRS carrier switching is scheduled in a system for supporting half-duplex TDD CA, the order of application of ① the directional collision handling procedure and ② the priority rule for determining whether to perform the SRS carrier switching, with regard to the same frequency band as that of the reference cell or a frequency band different from that of the reference cell (which one among the procedure of ① and the rule of ② is applied first) and method are explained in detail through specific examples, and the ambiguity of UE operation is specified. Hereinafter, methods for solving ambiguity in UE operation will be described in detail.

In the following description of the disclosure, cells, panels, beams, and/or transmission directions that may be distinguished through higher layer/L1 parameters such as TCI state to spatial relation information, or indicators such as cell ID, TRP ID, panel ID, and the like are unified and described as a transmission reception point (TRP). Therefore, in actual application, it is possible to appropriately replace TRP by one of the above terms.

When determining whether to apply cooperative communication, the UE can use various methods by which PDCCH(s) allocating PDSCHs to which cooperative communication is applied have specific formats, PDCCH(s) allocating PDSCHs to which cooperative communication is applied include a specific indicator informing of whether cooperative communication is applied, PDCCH(s) allocating PDSCHs to which cooperative communication is applied are scrambled by a specific RNTI, or the application of cooperative communication to a specific section indicated by a higher layer is assumed. Thereafter, for convenience of description, reception of, by the UE, a PDSCH to which cooperative communication is applied on the basis of conditions similar to the above conditions is referred to as an NC-JT case.

In describing the disclosure below, higher-layer signaling may be singling corresponding to at least one of or a combination of one or more of the following signaling:
MIB (Master Information Block)
SIB (System Information Block) or SIB X (X=1, 2, . . . )
RRC (Radio Resource Control)
MAC (Medium Access Control) CE (Control Element)
L1 signaling may be signaling corresponding to at least one of or a combination of one or more of signaling methods using the following physical layer channels or signaling.
PDCCH (Physical Downlink Control Channel);
DCI (Downlink Control Information);
UE-specific DCI;
Group common DCI;
Common DCI;
scheduling DCI (for example, DCI used to schedule downlink or uplink data);
non-scheduling DCI (for example, DCI other than DCI used to schedule downlink or uplink data);
PUCCH (Physical Uplink Control Channel);
UCI (Uplink Control Information).

Determining priorities of A and B in the disclosure may be variously expressed as selecting one having a higher priority according to a predetermined priority rule and performing an operation corresponding thereto or omitting (or dropping) an operation for one having a lower priority.

Hereinafter, in the disclosure, the above examples are described through a plurality of embodiments, but these are not independent and one or more embodiments may be applied simultaneously or in combination.

First Embodiment: SRS Carrier Switching Method Considering Half-Duplex TDD CA in the Same Frequency Band A first embodiment of the disclosure describes a method of performing SRS carrier switching when a UE supports half-duplex TDD CA in the same frequency band.

As described above, when SRS carrier switching is scheduled for a UE supporting half-duplex TDD CA, ambiguity may occur in the operation of the UE, and mismatch between the operations of the base station and the UE may occur. The ambiguity of the UE operation will be described through a more specific example.

Figure 22:
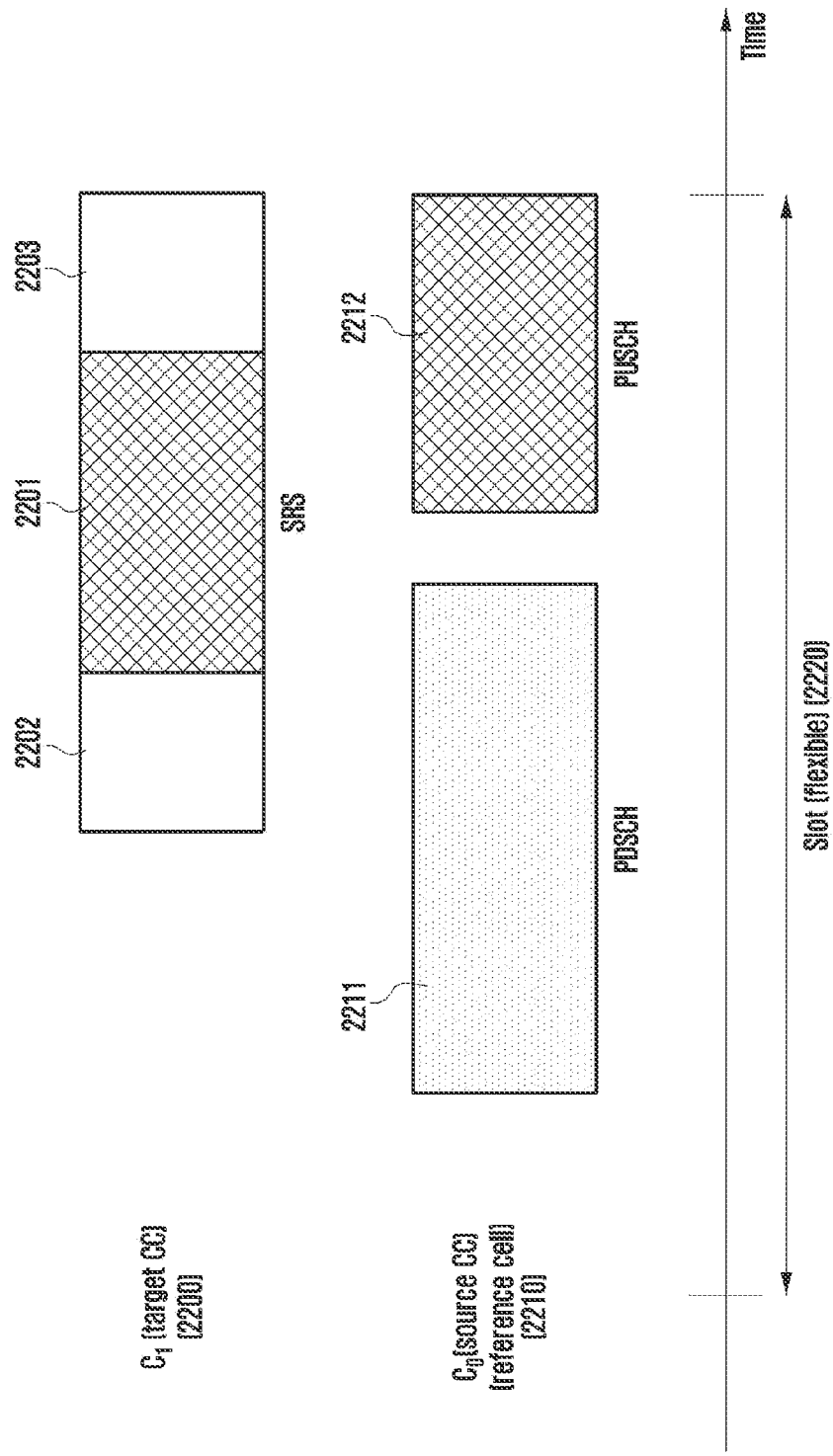
FIG. 22 illustrates an example of scheduling for CA transmission/reception and SRS carrier switching within the same frequency band in which ambiguity may occur in UE operation according to an embodiment of the disclosure.

FIG. 22 illustrates an example of scheduling for CA transmission/reception and SRS carrier switching within the same frequency band, as an example in which ambiguity may occur in UE operation, according to an embodiment of the disclosure.

In FIG. 22, $c_0$ 2210 is a reference cell with respect to symbols of a symbol set, and corresponds to a source CC during SRS carrier switching. $c_1$ is another cell rather than a reference cell with respect to symbols of the symbol set, and corresponds to a target CC during SRS carrier switching. $c_0$ and $c_1$ are CCs within the same frequency band, and when SRS is transmitted by performing SRS carrier switching, SRS is transmitted to the target CC through RF retuning, and the source CC suspends uplink transmission during the SRS transmission. In FIG. 22, a PDSCH 2211 and a PUSCH 2212 that do not overlap in the time domain may be scheduled for a reference cell $c_0$ 2210 in a slot 2220 including flexible symbols. SRS carrier switching, which overlaps the PDSCH 2211 and PUSCH 2212 scheduled for the reference cell 2210 in the time domain, is scheduled for another cell c, in the slot 2220 (in this case, whether overlap occur may be determined by considering the SRS transmission 2201 and the sum of RF tuning times 2202 and 2203. Alternatively, only the SRS transmission 2201 may be considered according to UE implementation or UE capability). In this case, since the UE supports half-duplex TDD CA, the directional collision that occurs between the SRS transmission (which may include the SRS transmission 2201 and the sum of RF tuning times 2202 and 2203) and PDSCH reception should be solved according to the directional collision handling procedure described above. In addition, since the SRS transmission (including the SRS transmission 2201 and the sum of RF tuning times 2202 and 2203) and the PUSCH transmission 2212 overlap in the time domain, it is necessary to determine whether to perform the SRS transmission or the PUSCH transmission by applying a priority rule for determining whether to perform SRS carrier switching.

In NR release 15/16, there is no specification of the application order between the directional collision handling procedure and the priority rule for SRS carrier switching, with regard to the case shown in FIG. 22, and thus one procedure or rule is performed first according to the UE implementation. Thereafter, even when whether to perform SRS carrier switching is not determined or collision handling is not solved, the UE may determine the final transmission/reception signal/channel by performing a rule or procedure that is not applied first. Here, all the signals (the SRS 2201, the PDSCH 2211, and the PUSCH 2212) of FIG. 22 are assumed to satisfy both the DCI reception timing condition or the active timing condition for applying the collision handling procedure or the SRS carrier switching priority rule.

Figure 23:
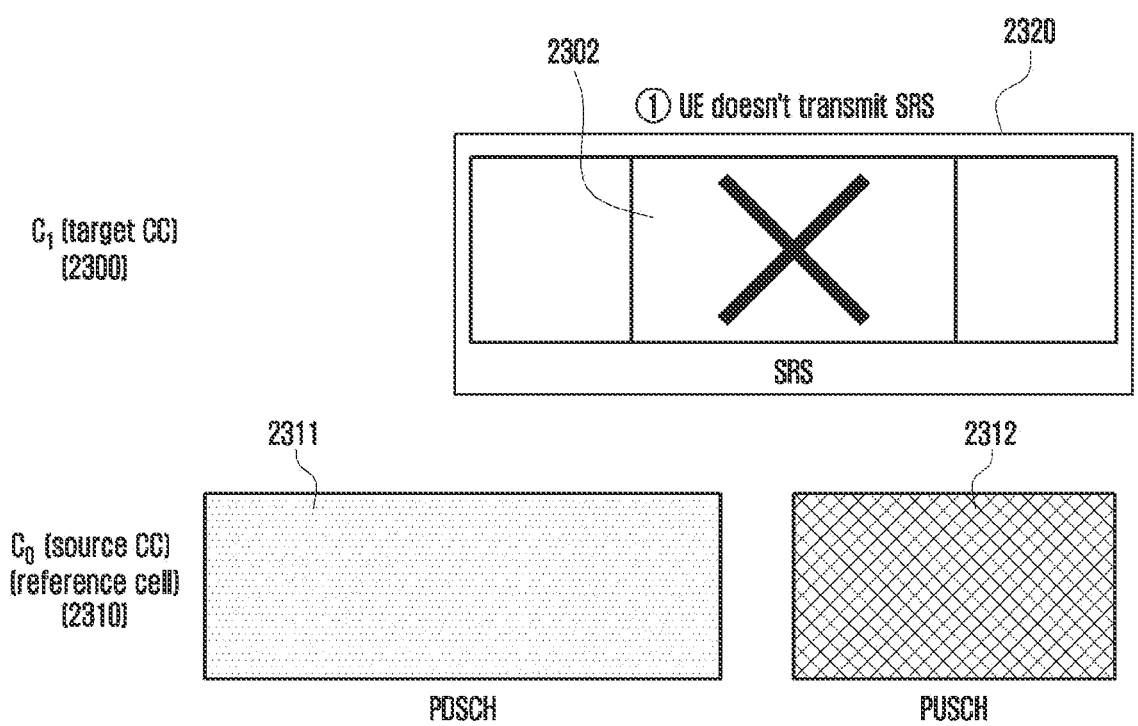
FIG. 23 illustrates an example of a signal/channel transmitted and received by a UE when the UE performs a directional collision handling procedure first to support half-duplex TDD CA according to an embodiment of the disclosure.

FIG. 23 illustrates an example of a signal/channel transmitted and received by a UE when the UE performs a directional collision handling procedure first to support half-duplex TDD CA, according to an embodiment of the disclosure.

Referring to FIG. 23, the UE may perform directional collision handling first between the SRS transmission in another cell 2300 and PDSCH reception in a reference cell 2310. As described above in the half-duplex TDD CA, when two support cells are in the same frequency band, DCI-based scheduling in which the uplink and downlink do not match (that is, the transmission direction does not match) is not allowed, and when higher layer-based downlink reception is scheduled on a flexible symbol in a reference cell, the UE may be configured not to receive DCI for scheduling to transmit an uplink signal to the same symbol with respect to another cell. Therefore, the SRS transmission 2302 in FIG. 23 should be SRS carrier switching scheduled based on the higher layer configuration. Here, according to the directional collision handling procedure, the SRS transmission in a corresponding symbol of another cell is not performed, and RF retuning and the SRS transmission may be configured not to be performed due to PDSCH reception, and thus the UE does not perform SRS carrier switching (indicated by reference numeral 2320). Since SRS carrier switching is not performed regardless of the priority between the SRS transmission 2302 and the PUSCH transmission 2312, the UE finally performs PDSCH reception 2311 and the PUSCH transmission 2312 for the reference cell. That is, even when the priority of the SRS transmission 2302 is higher than that of the PUSCH transmission 2312, the UE may perform the PDSCH reception 2311 and the PUSCH transmission 2312 after applying the directional collision handling procedure, instead of performing the SRS transmission.

Figure 24:
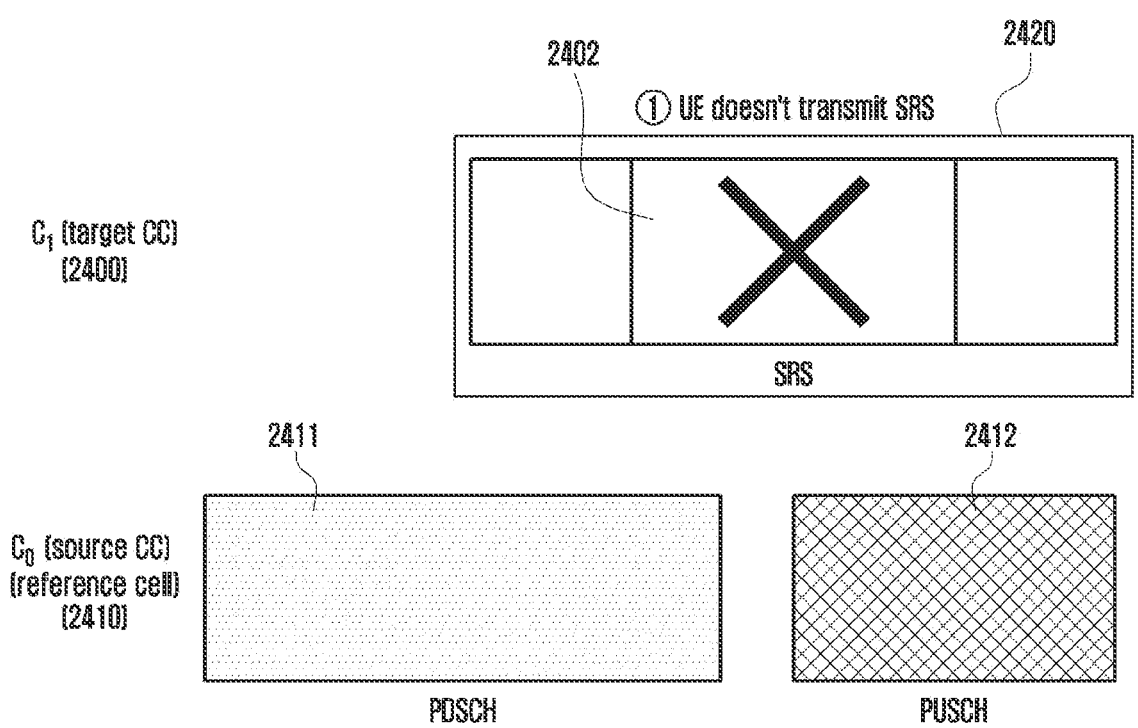
FIG. 24 illustrates an example of a signal/channel transmitted and received by a UE in case that the UE performs a priority rule for SRS carrier switching first and the PUSCH transmission of a source CC has a higher priority than the SRS transmission of a target CC according to an embodiment of the disclosure.
Figure 25:
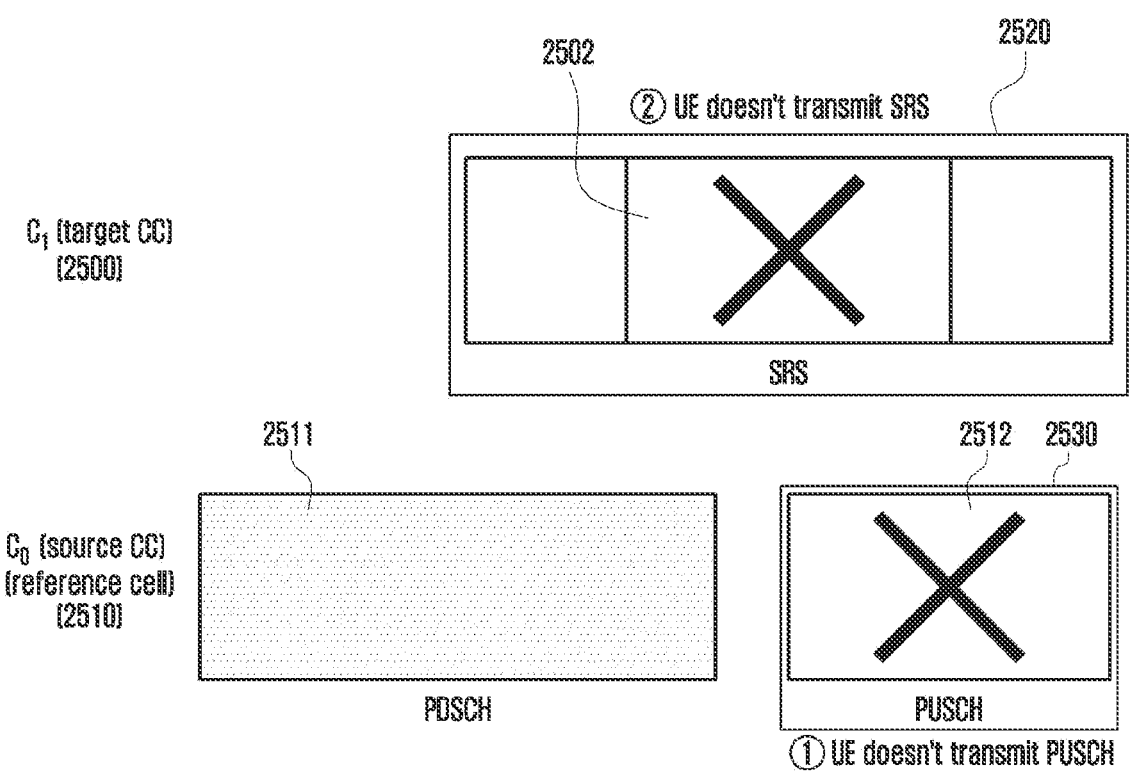
FIG. 25 illustrates an example of a signal/channel transmitted and received by a UE in case that the UE performs a priority rule for SRS carrier switching first and the SRS transmission of a target CC has a higher priority than the PUSCH transmission of a source CC according to an embodiment of the disclosure.

FIGS. 24 and 25 illustrate examples of signals/channels transmitted and received by a UE when the UE performs a priority rule for SRS carrier switching first, according to an embodiment of the disclosure. Specifically, FIG. 24 illustrates the result when the PUSCH transmission of a source CC has a higher priority than that of the SRS transmission of a target CC, and FIG. 25 illustrates the result when the SRS transmission of a target CC has a higher priority than that of the PUSCH transmission of a source CC.

Referring to FIG. 24, the UE may be configured not to perform the SRS transmission 2402 according to a priority rule between the SRS transmission 2402 and the PUSCH transmission 2412 (indicated by reference numeral 2420). Subsequently, the remaining signals/channels do not cause directional collision, and thus the UE may finally perform PDSCH reception 2411 and the PUSCH transmission 2412 for the reference cell 2410 instead of performing a directional collision handling procedure.

On the other hand, referring to FIG. 25, the UE may be configured not to transmit the PUSCH according to the priority rule between the SRS transmission 2502 and the PUSCH transmission 2512 (indicated by reference numeral 2530). Thereafter, since the PDSCH reception in the reference cell and the SRS transmission in another cell cause directional collision, the UE may be configured not to perform the SRS transmission 2502 according to the directional collision handling procedure (indicated by reference numeral 2520). Therefore, the UE may finally receive only the PDSCH 2511 from the reference cell.

When comparing FIGS. 24 and 25, it may be identified that the final operation of the UE varies depending on whether the directional collision handling procedure is performed first or the priority rule for determining whether to perform SRS carrier switching is performed first in the same situation.

Figure 26:
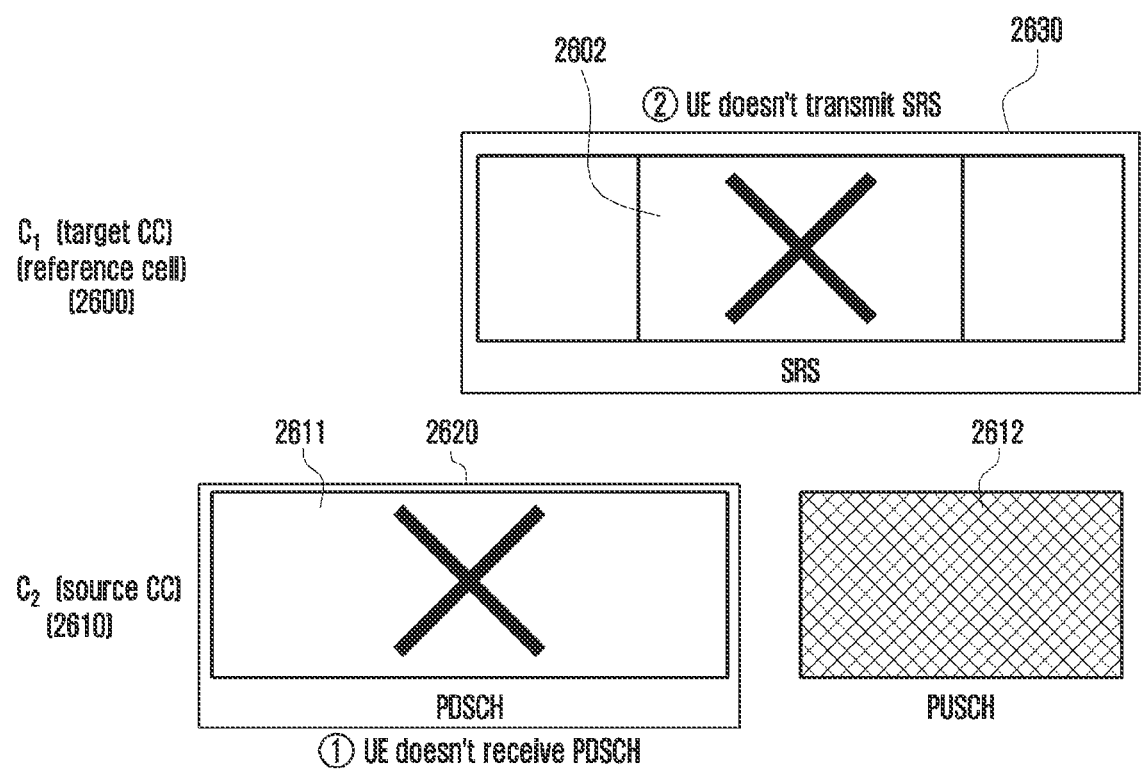
FIG. 26 describes a UE operation when a target CC is a reference cell and the PUSCH transmission of a source CC has a higher priority than the SRS transmission of a target CC according to an embodiment of the disclosure.
Figure 27:
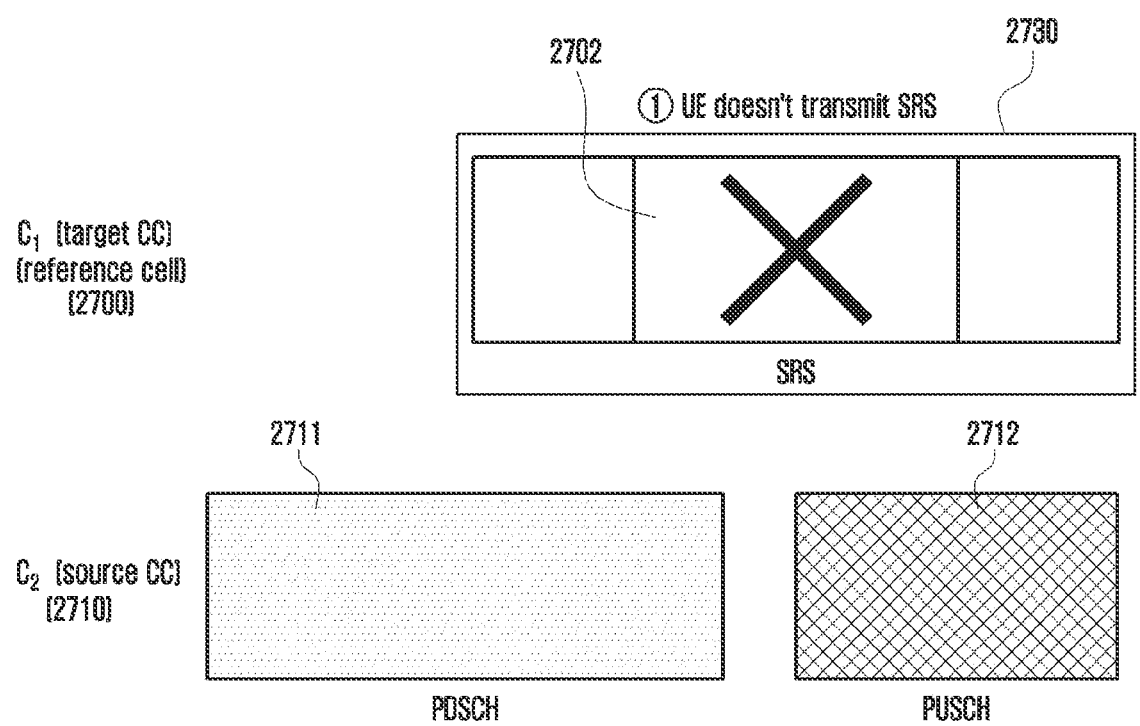
FIG. 27 describes a UE operation when a target CC is a reference cell and the PUSCH transmission of a source CC has a higher priority than the SRS transmission of a target CC according to an embodiment of the disclosure.

Similarly, even when a target CC for SRS transmission is determined as a reference cell according to SRS carrier switching, an ambiguity problem may occur in the final operation of the UE. FIGS. 26 and 27 describe the UE operation when a target CC is a reference cell 2600 and the PUSCH transmission of a source CC has a higher priority than that of the SRS transmission of the target CC, according to an embodiment of the disclosure.

FIG. 26 illustrates an example of a signal/channel finally transmitted/received by the UE when the UE performs a directional collision handling procedure first. In a case of FIG. 26, the target CC is the reference cell, and similarly to that described above, DCI-based scheduling, in which the uplink and downlink in another cell (here, source CC) and the reference cell do not match (that is, the transmission direction does not match), is not allowed. Therefore, if higher layer-based uplink transmission is scheduled on a flexible symbol in the reference cell, the UE may be configured not to receive DCI for scheduling to receive a downlink signal in the same symbol with respect to another cell. Therefore, PDSCHs 2611 and 2711 of FIGS. 26 and 27 are PDSCHs scheduled based on a higher layer configuration. Therefore, if the collision handling procedure is applied first as shown in FIG. 26, the UE may be configured not to receive the PDSCH in the source CC (indicated by reference numeral 2620). Thereafter, since the SRS transmission to the target CC and the PUSCH transmission to the source CC overlap in the time domain, the priority between the SRS transmission and the PUSCH transmission may be compared to determine whether to perform SRS carrier switching. In FIG. 26, since the PUSCH transmission of the source CC has a higher priority than that of the SRS transmission of the target CC, the UE may be configured not to perform the SRS transmission (indicated by reference numeral 2630).

On the other hand, FIG. 27 shows an example of a signal/channel transmitted and received by the UE when the priority rule for determining whether to perform SRS carrier switching is performed first. The UE may be configured not to perform the SRS transmission according to the priority (indicated by reference numeral 2730). Thereafter, since the remaining signals/channels do not cause directional collision, the UE may finally perform PDSCH reception 2711 and the PUSCH transmission 2712 for the source CC (another cell) instead of performing directional collision handling procedure. As noted from FIGS. 26 and 27, even when the reference cell corresponds to a target CC, according to a case in which one of the priority rule for SRS carrier switching and the procedure for directional collision handling under the same condition is applied first, a signal/channel finally transmitted and received by the UE becomes different, which may cause ambiguity in the operations between the base station and the UE.

Such ambiguity may occur in various scheduling cases allowed by the half-duplex TDD CA operating within the same frequency band in addition to the specific examples described above. Therefore, one or a combination of methods for solving ambiguity in UE operation, which will be described later, can be applied to a case of scheduling SRS carrier switching in a half-duplex TDD CA environment operating in various same frequency bands in addition to the specific examples described above.

In order to solve the ambiguity of the UE operation that occurs according to the order of applying the procedure for directional collision handling and the priority rule for SRS carrier switching, one or a combination of the following methods may be predefined and operated by the base station and the UE.

[Method 1]: The UE may apply the procedure for directional collision handling first: with regard to actions that may cause ambiguity, the actions not defined in NR release 15/16, the UE may always perform the directional collision handling procedure first to solve the directional collision, and then may perform the remaining operations (e.g., an operation of determining whether to perform SRS carrier switching).

[Method 2]: The UE may apply the priority rule for SRS carrier switching first: the UE may determine first whether to perform SRS carrier switching for an operation in which ambiguity may occur, and then may perform the remaining operations (e.g., an operation of solving directional collision).

[Method 3]: The UE may determine a rule to be applied first according to the reference cell determined for the corresponding symbol. As in the specific example described above, if the rule to be applied first is determined according to whether the reference cell is a source CC or a target CC, the UE may drop only relatively fewer signals/channels than [Method 1] or [Method 2] and transmit/receive the remaining signals/channels.

As one specific example, if the reference cell is a source CC, a directional collision handling procedure may be performed first. As can be seen by comparing FIG. 23 with {FIGS. 24 and 25}, if the UE performs the directional collision handling procedure first, the UE may drop only the same or fewer signals/channels than a case in which the priority rule for SRS carrier switching is applied first and then may transmit and receive the remaining signals/channels.

If the reference cell is a target CC, the priority rule for SRS carrier switching may be applied first. As can be seen by comparing FIGS. 26 and 27, if the UE applies the priority rule for SRS carrier switching first, the UE may drop only the same or fewer signals/channels than a case in which the directional collision handling procedure is performed first, and then may transmit and receive the remaining signals/channels.

That is, if the reference cell is the source CC, the directional collision handling procedure is performed first, and if the reference cell is the target CC, the priority rule for SRS carrier switching is applied first to solve the ambiguity of the UE operation.

As another example of application of [Method 3], if the reference cell is the source CC, the priority rule for SRS carrier switching is applied first, and if the reference cell is the target CC, the directional collision handling procedure may be performed first to solve the ambiguity of the UE operation. Similarly, by defining a method in advance between the base station and the UE to apply one rule first according to the reference cell configuration, the ambiguity of the UE operation can be solved.

[Method 4] A rule to be applied first may be determined according to the order in which signals/channels are scheduled. The UE may perform or determine whether to perform directional collision handling or SRS carrier switching that occurs between signals/channels according to the order in which the UE schedules transmission/reception of signals/channels through DCI format or higher layer configuration-based activation, and the like.

For example, if directional collision occurs by two signals/channels scheduled first in the time domain, the UE may apply the directional collision handling first and then identify the next scheduled signal. The UE may identify the remaining signals/channels after the rule application and a signal/channel transmitted in a different time domain. If the two signals/channels scheduled first in the time domain correspond to SRS carrier switching to the target CC and uplink transmission to the source CC, the UE may identify the next scheduled signal after applying the priority rule first in order to determine whether to perform SRS carrier switching. As described above, ambiguity in UE operation can be solved by performing collision handling or applying a priority rule in the order in which scheduling information is received/determined.

A case in which the signal/channel is activated and scheduled based on the higher layer configuration may be performed based on a time point before the transmission/reception preparation time with reference to the first symbol of the signal/channel. The transmission/reception preparation time may correspond to a PUSCH preparation time or a PDSCH processing time according to NR release 15/16.

If more than two scheduling events occur at the same time to cause ambiguity in UE operation, the ambiguity can be solved by further combining other methods of the disclosure as well as [Method 4]. Alternatively, if more than two signals/channels are scheduled in the same order and thus ambiguity occurs in the operation of the UE, the rule to be applied first may be determined according to a serving cell index configured via a higher layer. As an example, a rule to be applied first may be determined by sequentially comparing signals/channels starting from a value having a smaller serving cell index configured via a higher layer. As another example, the UE may determine a rule to be applied first by sequentially comparing signals/channels starting from a value having a large serving cell index configured.

[Method 5] The rule to be applied first may be determined according to the temporal order in which signals/channels are transmitted/received. The UE may perform or determine whether to perform directional collision handling or SRS carrier switching that occurs between signals/channels according to the order in which scheduled signals/channels are transmitted/received.

For example, if two signals/channels transmitted first in the time domain correspond to SRS carrier switching to the target CC and uplink transmission to the source CC, the UE may apply the priority rule first to determine whether to perform SRS carrier switching. The UE may identify the remaining signals/channels after the rule application and a signal/channel transmitted in a different time domain. If directional collision occurs by two signals/channels transmitted/received first, the UE may apply the directional collision handling first and then identify the next transmitted/received signal.

If more than two signals/channels are transmitted/received from the same starting point and thus ambiguity occurs in the UE operation, the ambiguity may be solved by additionally combining other methods of the disclosure as well as the method described herein. Alternatively, if more than two signals/channels are transmitted/received from the same starting point and thus ambiguity occurs in the UE operation, the rule to be applied first may be determined according to the serving cell index configured via the higher layer. As an example, a rule to be applied first may be determined by sequentially comparing signals/channels starting from a value having a smaller serving cell index configured via the higher layer. As another example, a rule to be applied first may be determined by sequentially comparing signals/channels starting from a value having a large serving cell index configured.

[Method 6] First apply the rule between signal/channel transmission and reception according to a scheduling method, the UE may determine whether to perform collision handling or SRS carrier switching between the signal/channel transmission and reception scheduled by the schedule method defined in advance by the base station and the UE, and then may apply a rule between the remaining signals/channels and signal/channel transmission and reception scheduled by a different scheduling method.

For example, the base station and the UE may compare the activated signal/channel transmission/reception based on the higher layer configuration first. If directional collision occurs between transmission and reception of two signals/channels scheduled based on the higher layer configuration, the UE may perform a directional collision handling procedure first. Thereafter, by comparing the remaining signals/channels with the signals/channels scheduled by the DCI, a priority rule may be applied or collision handling may be performed as needed. Similarly, if the two received signals/channels scheduled based on the higher layer configuration correspond to uplink signal transmission in the source CC and SRS transmission in the target CC, the UE may apply first the priority rule to determine whether to perform SRS carrier switching. Thereafter, by comparing the remaining signals/channels with the signals/channels scheduled by the DCI, a priority rule may be applied or collision handling may be performed as needed. As another example, the UE may use a method of comparing first DCI-based scheduled signal/channel transmission/reception rather than comparing first the activated signal/channel transmission/reception based on higher layer configuration.

Second Embodiment: SRS Carrier Switching Method Considering Half-Duplex TDD CA in Different Frequency Band The second embodiment of the disclosure describes a method for performing SRS carrier switching when a UE supports half-duplex TDD CA in a different frequency band.

In addition to supporting half-duplex TDD CA in the same frequency band, ambiguity may occur in UE operation even when half-duplex TDD CA operating in a different frequency band is supported. In addition, if half-duplex TDD CA is supported in both the same frequency band and a different frequency band with reference to a reference cell, it may be ambiguous whether to perform first directional collision handling for signals in the same frequency band or for signals in other frequency bands.

Figure 28:
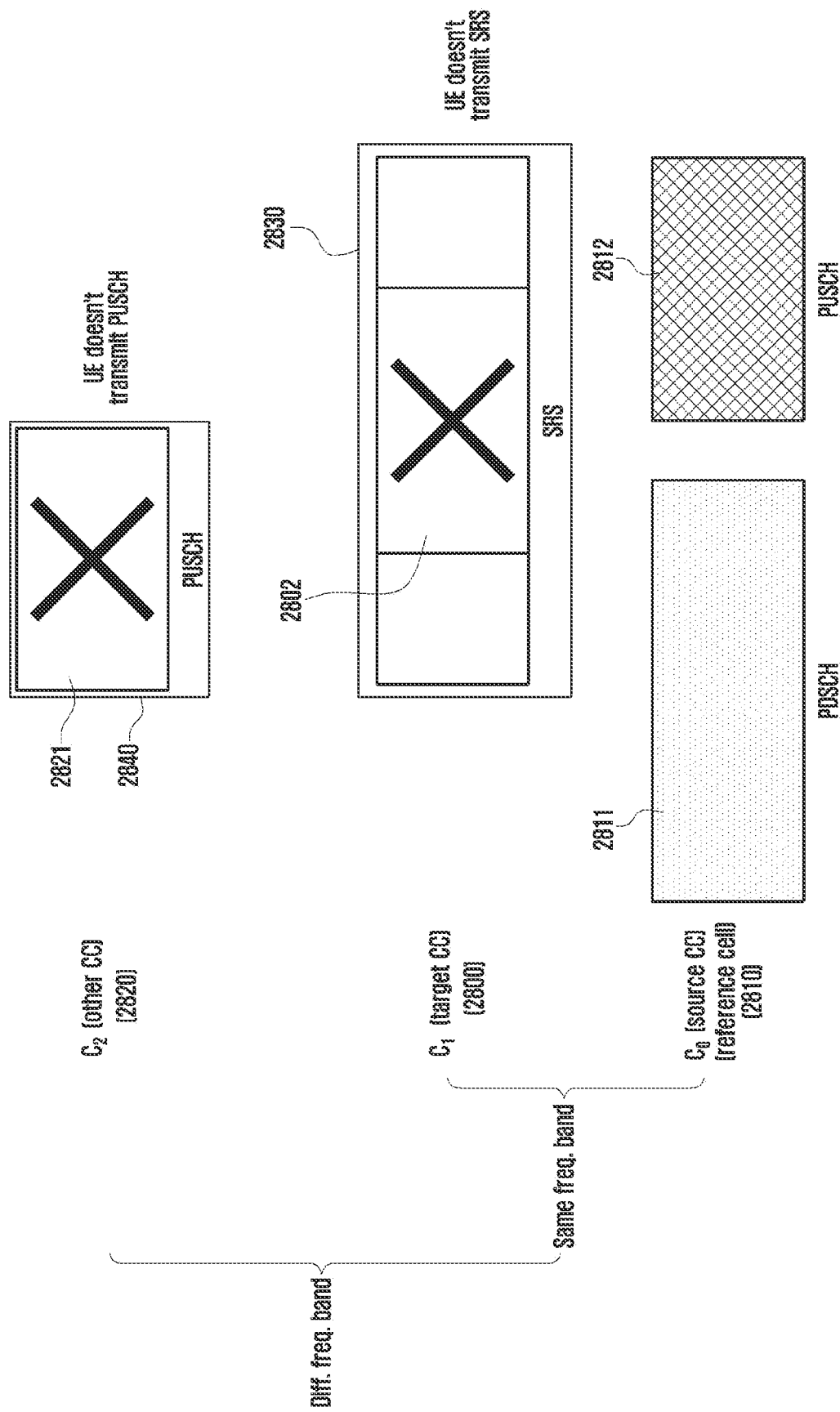
FIG. 28 illustrates an example of scheduling for CA transmission/reception and SRS carrier switching in consideration of different frequency bands in which ambiguity may occur in UE operation according to an embodiment of the disclosure.
Figure 29:
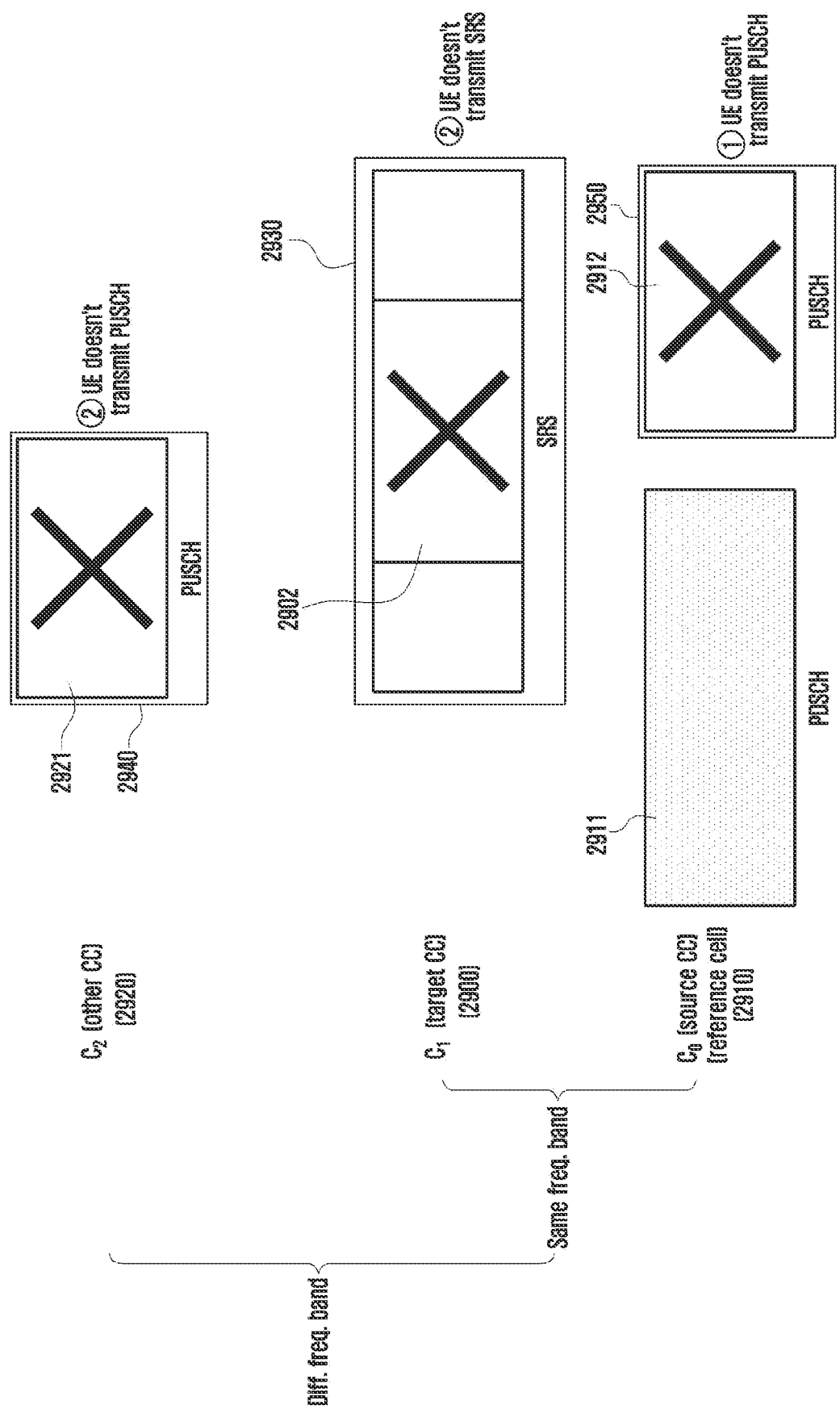
FIG. 29 illustrates an example of scheduling for CA transmission/reception and SRS carrier switching in consideration of different frequency bands in which ambiguity may occur in UE operation according to an embodiment of the disclosure.

FIGS. 28 and 29 illustrate scheduling examples for CA transmission/reception and SRS carrier switching in consideration of different frequency bands in which ambiguity may occur in UE operation, according to an embodiment of the disclosure.

In FIGS. 28 and 29, it is assumed that $c_0$ and $c_1$ are CCs within the same frequency band, and $c_2$ is CC within a frequency band different from those of $c_0$ and $c_1$. The UE may determine the reference cell as $c_0$ with regard to the corresponding symbols.

As described above in the half-duplex TDD CA, when two support cells (specifically, $c_0$ 2810 and 2910 and $c_1$ 2800 and 2900 in FIGS. 28 and 29) is in the same frequency band, DCI-based scheduling in which uplink and downlink do not match is not allowed, and when higher layer-based downlink reception is scheduled on a flexible symbol of the reference cell, the UE may be configured not to receive the DCI for scheduling to transmit an uplink signal in the same symbol with respect to another cell. Therefore, the SRS transmissions 2802 and 2902 in FIGS. 28 and 29 should be SRS carrier switching scheduled based on the higher layer configuration.

PUSCHs 2821 and 2921 scheduled for CC $c_2$ in different frequency bands may be scheduled by the DCI according to the scheduling method of PDSCHs 2811 and 2911 scheduled for the reference cell $c_0$, and (when the PDSCHs 2811 and 2911 are activated based on a higher layer configuration) the PUSCHs may be activated and scheduled based on the higher layer configuration (a case in which the PDSCHs 2811 and 2911 are activated based on a higher layer configuration and a case in which the PDSCHs are scheduled based on the DCI). However, if the PDSCHs 2811 and 2911 scheduled for reference cell $c_0$ are scheduled based on the DCI, the PUSCHs 2821 and 2921 scheduled for $c_2$ may be configured not to be scheduled based on DCI. This is because it is not expected that the UE detects a first DCI format for scheduling transmission or reception in a symbol for a first cell and detecting a second DCI format for scheduling reception or transmission in a symbol for a second cell, respectively.

In FIGS. 28 and 29, it is assumed that PUSCHs 2821 and 2921 scheduled for $c_2$ are PUSCHs scheduled through activation based on higher layer configuration, for convenience of explanation and to clearly explain the ambiguity of UE operation. Further, it is assumed that SRSs 2802 and 2902 have a higher priority among the SRSs 2802 and 2902 according to SRS carrier switching of a target CC and PUSCHs 2812 and 2912 of a source CC within the same frequency band.

FIG. 28 shows an example of a signal/channel transmitted and received by a UE when the UE performs a directional collision handling procedure first to support half-duplex TDD CA using three CCs. If the UE performs the directional collision handling procedure first under the above conditions, since reception of a PDSCH 2811 is prioritized in a reference cell, the UE may be configured not to transmit an SRS 2802 according to the SRS carrier switching of $c_1$ and a PUSCH 2821 activated according to the higher layer configuration of $c_2$. Therefore, since the SRS 2802 is not transmitted by the directional collision handling procedure, the UE may finally receive the non-overlapping scheduled PDSCH 2811 in the time domain in the reference cell and transmit the PUSCH 2812, regardless of the priority rule for determining whether to perform SRS carrier switching.

FIG. 29 illustrates an example of a signal/channel transmitted and received by a UE when the UE performs a priority rule for SRS carrier switching first. In order to determine whether to perform SRS carrier switching under the above conditions, the UE may determine to transmit an SRS 2902 having a higher priority by applying the priority rule of a PUSCH 2912 of a source CC and the SRS 2902 of a target CC. In this case, the UE may be configured not to transmit the PUSCH 2912 of the source CC. Thereafter, the UE may perform a directional collision handling procedure because the remaining signals/channels cause directional collision. Here, since reception of the PDSCH 2911 is prioritized in a reference cell, the UE may be configured not to transmit the SRS 2902 according to the SRS carrier switching of $c_1$ and a PUSCH 2921 activated according to the higher layer configuration of $c_2$. Finally, the UE may receive only the PDSCH 2911 scheduled for the reference cell.

When comparing FIG. 28 and FIG. 29, ambiguity in which a signal/channel finally transmitted/received by the UE is changed according to a procedure or rule applied first occurs similarly to that described above in the first embodiment.

Considering CCs operating in different frequency bands, in addition to the ambiguity of the UE operation that may be identified with reference to FIGS. 28 and 29, ambiguity in the addition UE operation may occur even when the directional collision handling procedure is performed. Specifically, ambiguity in which the signal/channel that the UE finally transmits and receives is changed may occur according to whether a collision within the same frequency band as that of the reference cell is to be first solved or a collision between reference cells of a frequency band different from that of the reference cell is to be first solved.

Figure 30:
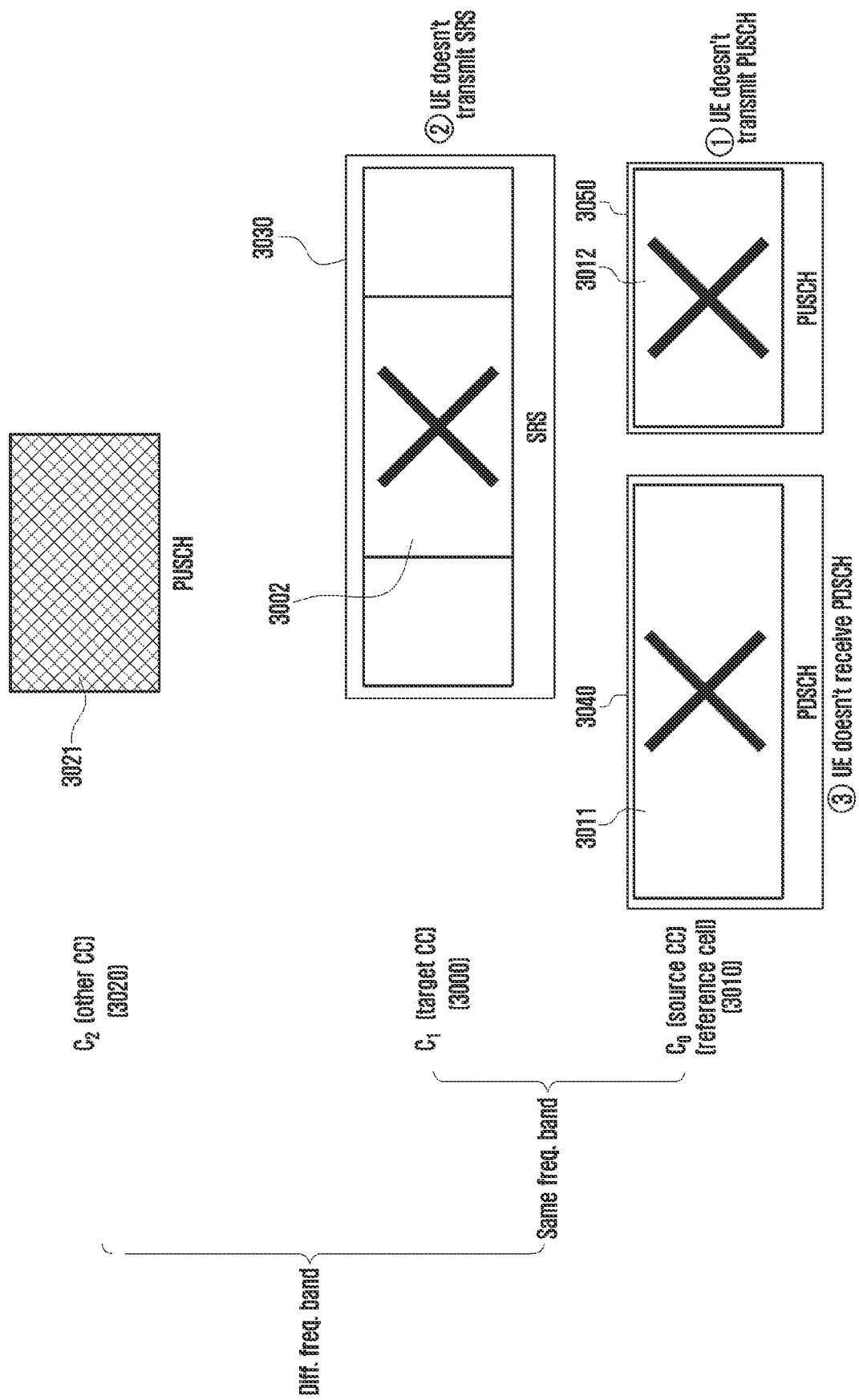
FIG. 30 illustrates an example of scheduling for CA transmission/reception and SRS carrier switching in consideration of different frequency bands in which ambiguity may occur in UE operation according to an embodiment of the disclosure.
Figure 31:
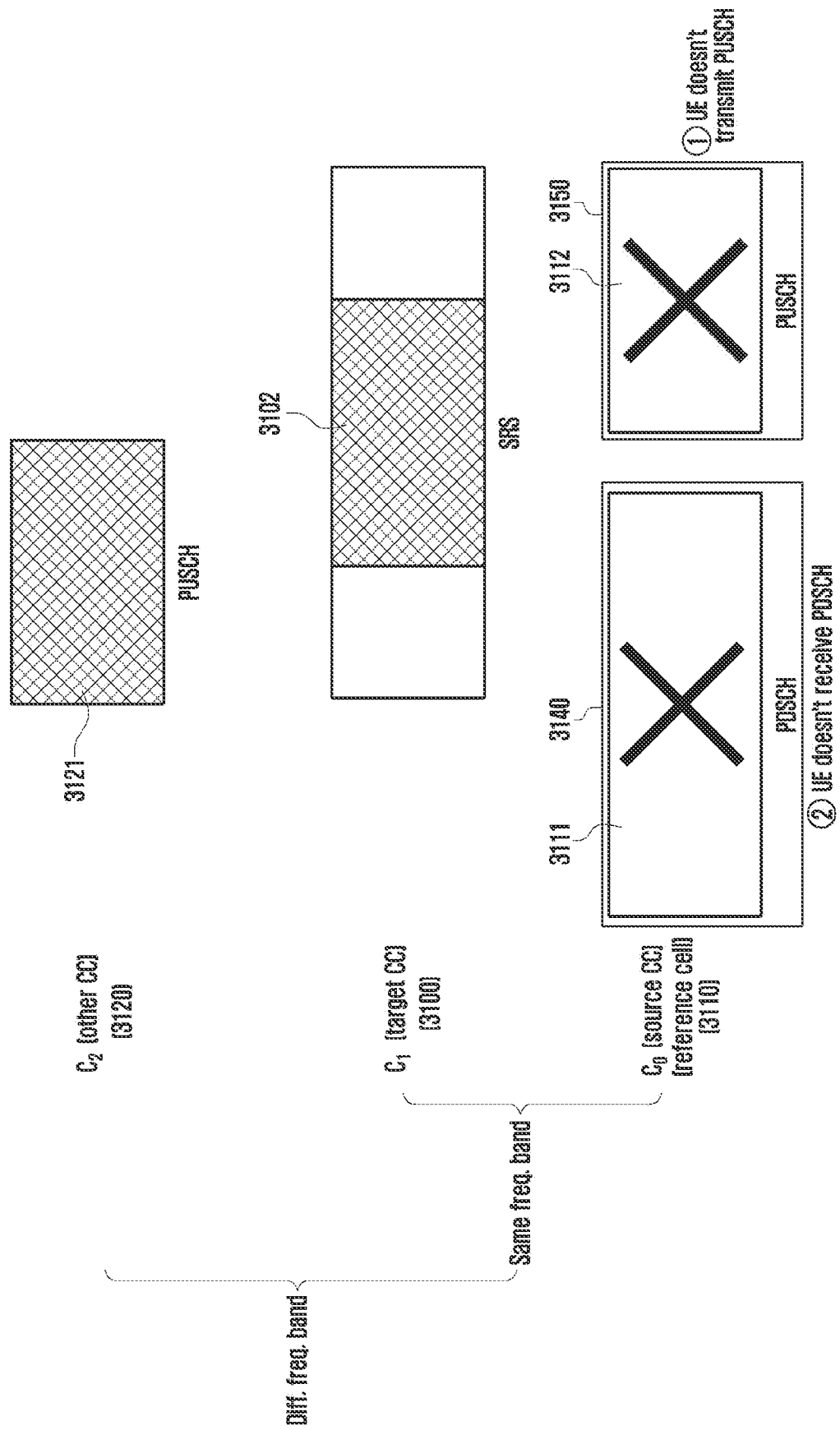
FIG. 31 illustrates an example of scheduling for CA transmission/reception and SRS carrier switching in consideration of different frequency bands in which ambiguity may occur in UE operation according to an embodiment of the disclosure.

FIGS. 30 and 31 illustrate scheduling examples for CA transmission/reception and SRS carrier switching in consideration of different frequency bands in which ambiguity may occur in UE operation, according to an embodiment of the disclosure.

In FIGS. 30 and 31, it is assumed that PDSCHs 3011 and 3111 are scheduled in a reference cell through activation based on higher layer configuration, and PUSCHs 3021 and 3121 of $c_2$ are scheduled based on the DCI. Further, it is assumed that SRS carrier switching is scheduled through activation based on higher layer configuration for the same reason as described above. In addition, it is assumed that transmission of SRSs 3002 and 3102 has a higher priority among the SRSs 3002 and 3102 of a target CC and PUSCHs 3012 and 3112 of a source CC. Both FIGS. 30 and 31 illustrate a case in which directional collision for the remaining signals/channels is solved after a priority rule for determining whether to perform SRS carrier switching is applied first.

FIG. 30 illustrates an example of a case in which a priority rule for determining whether to perform SRS carrier switching is applied first so as to prevent a UE from transmitting a PUSCH 3012 of a source CC, and with regard to the remaining signals/channels, collision handling within the same frequency band as that of the reference cell is applied first, and then collision handling of a frequency band different from that of the reference cell is applied. The UE may be configured to compare the reception of a PDSCH 3011 of the reference cell 3010 with the transmission of SRS 3002 of another cell c, 3000 by applying collision handling first within the same frequency band as that of the reference cell, so as not to transmit the SRS 3002. Thereafter, the UE may be configured to compare the reception of the PDSCH 3011 of the reference cell 3010 with a PUSCH 3021 of another cell $c_2$ 3020 by applying collision handling of a frequency band different from that of the reference cell, so as not to receive the PDSCH 3011. Therefore, the UE may finally transmit only the PUSCH 3021 scheduled for $c_2$ 3020.

On the other hand, FIG. 31 illustrates an example of a case in which a priority rule for determining whether to perform SRS carrier switching is applied first so as to prevent the UE from transmitting a PUSCH 3112 of a source CC, and with regard to the remaining signals/channels, collision handling of a frequency band different from that of the reference cell is applied first, and then collision handling within the same frequency band as that of the reference cell is applied. The UE may be configured to compare the reception of a PDSCH 3111 of a reference cell 3110 with the transmission of a PUSCH 3121 of another cell $c_2$ 3120 by applying collision handling of a frequency band different from that of the reference cell, so as not to receive the PDSCH 3111. Thereafter, if the simultaneous uplink transmission by the UE in different frequency bands is possible (if the UE can simultaneously transmit the uplink signal and the SRS by using different RF transceivers in the inter-band CA environment, both are uplink transmissions and thus the UE may be assumed to support the uplink transmission even in a half-duplex TDD CA environment), an additional collision handling procedure may not need to be applied. Accordingly, the UE may finally transmit the SRS 3102 scheduled for $c_1$ 3100 and the PUSCH 3121 scheduled for $c_2$ 3120.

When comparing FIGS. 30 and 31, in both cases, even in an environment in which SRS carrier switching is applied first and all scheduled signals/channels are the same, it may be identified that ambiguity, in which the signal/channel that the UE finally transmits and receives is changed, may additionally occur according to whether a collision within the same frequency band as that of the reference cell is to be solved first or a collision between reference cells of a frequency band different from that of the reference cell is to be solved first.

As noted from specific examples in which other frequency bands are additionally considered, in addition to the method of determining whether to apply first the priority rule for SRS carrier switching or the directional collision handling procedure described above in the first embodiment, a method for additionally considering whether a directional collision within the same frequency as that of the reference cell is to be solved first or a directional collision between reference cells of a frequency band different from that of the reference cell is to be solved first is needed. Accordingly, in addition to a method combining one or multiple methods among methods described herein of the first embodiment, the UE may consider an additional method to be described later:

In one additional method, method when a directional collision handling procedure is performed in case that a support cell of a frequency band different from that of a reference cell is configured, a UE may solve a directional collision first within the same frequency band as that of the reference cell.

In one additional method, when a directional collision handling procedure is performed in case that a support cell of a frequency band different from that of a reference cell is configured, the UE may solve a directional collision first for a frequency band different from that of the reference cell.

In one additional method, the UE may determine a method of solving a collision first according to a reference cell determined for the corresponding symbol. For example, when the reference cell is a support cell configured as a source CC when performing SRS carrier switching, a directional collision within the same frequency band as that of the reference cell may be solved first. Alternatively, when the reference cell is a support cell configured as a source CC when performing SRS carrier, a directional collision for a frequency band different from that of the reference cell may be solved first. As another example, when the reference cell is a cell not related to SRS carrier switching, a directional collision for a frequency band different from that of the reference cell may be solved first. Alternatively, when the reference cell is a cell not related to SRS carrier switching, a directional collision within the same frequency band as that of the reference cell may be solved first. In addition, a case in which the reference cell corresponds to a target CC when performing the SRS carrier switching may be additionally considered. Depending on the reference cell determined based on the overlapping symbol, a directional collision within the same frequency band as that of the reference cell may be solved first or a directional collision between frequency bands different from that of the reference cell may be solved first.

When performing SRS carrier switching of a UE in a half-duplex TDD CA system considering other frequency bands, one or more of the additional methods described herein in addition to the one or more methods described herein in the first embodiment can be additionally applied to clearly define the operation of the UE.

For example, based on one or more methods described herein, a rule to be applied first among the directional collision handling procedure and the priority rule for determining whether to perform SRS carrier switching is determined according to the temporal order in which signals/channels are transmitted and received. Further, at the time of performing the directional collision handling procedure based on the determined rule, a collision within the same frequency band as that of the reference cell may be solved first or a collision between frequency bands different from that of the reference cell may be solved first, according to the reference cell determined by considering one or more of the additional methods described herein. This is only an example according to an embodiment of the disclosure, and the ambiguity of the UE operation can be solved by considering various combinations such as a combination between one or more methods described herein and one or more additional methods described herein.

Figure 32:
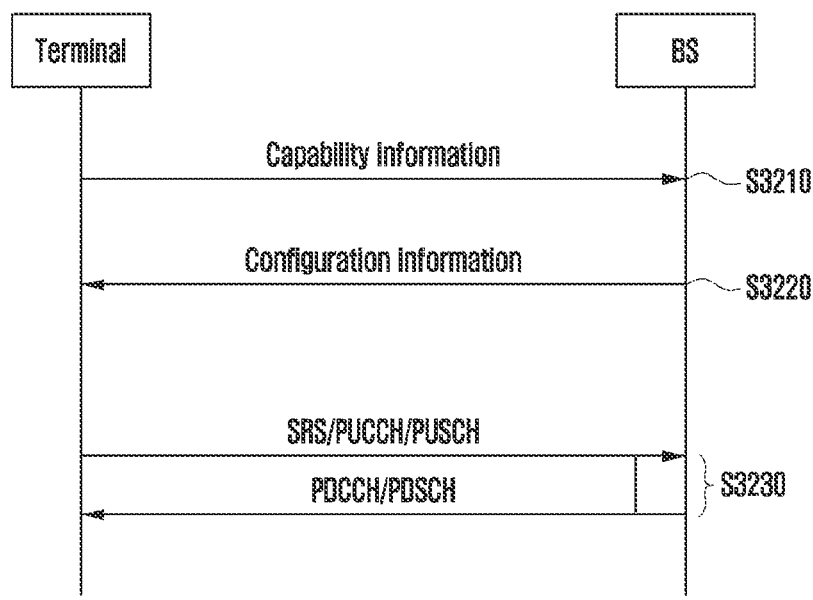
FIG. 32 illustrates a signaling flow between a UE and a BS according to an embodiment of the disclosure.

FIG. 32 illustrates a signaling flow between a UE and a base station according to an embodiment of the disclosure.

The UE/base station operations of FIG. 32 may be performed based on the above-described embodiment (e.g., first embodiment/second embodiment) and/or methods. In addition, above-described descriptions of the SRS carrier switching and/or Half-duplex TDD CA may be referred to.

FIG. 32 is an example, and the operation order of FIG. 32 may be changed. Alternatively, some steps of FIG. 32 may be omitted or two or more steps may be combined and performed as one step.

The UE may transmit capability information to the base station (S3210). The base station may receive capability information from the UE.

For example, the capability information may include information indicating that the UE is capable to support half-DuplexTDD-CA-SameSCS. In other words, the UE may identify whether it has a capability to support half-DuplexTDD-CA-SameSCS and report the capability information to the base station.

The UE may receive configuration information from the base station (S3220). The base station may transmit the configuration information to the UE.

The configuration information may include information for configuring multiple serving cells including a first serving cell and a second serving cell. The serving cell may refer to the support cell described above. The UE may identify the first serving cell and the second serving cell based on the configuration information. In addition, the UE may identify that the directionalCollisionHandling parameter is set to 'enabled' for a set of serving cells among the plurality of serving cells based on the configuration information. In addition, the UE may identify that a first carrier of the first serving cell is not configured for PUCCH or PUSCH transmission.

The UE of FIG. 32 may be a UE that cannot simultaneously perform reception and transmission in the first serving cell and the second serving cell. Also, the UE may not be configured to monitor the PDCCH for DCI format 2_0 on any of the multiple serving cells.

The UE may transmit SRS or PUSCH/PUCCH to the base station or may receive PDCCH/PDSCH from the base station (S3230). The base station may receive the SRS or PUSCH/PUCCH from the UE or may transmit the PDCCH/PDSCH to the UE.

For example, the SRS on the first carrier of the first serving cell switched from another cell and the physical channel (e.g., PDCCH/PDSCH/PUSCH/PUCCH) on the second carrier of the second serving cell may collide/overlap. The first carrier and the second carrier may be included in the same frequency band. Alternatively, the first carrier and the second carrier may be included in different frequency bands. In addition, the directionalCollisionHandling parameter may be set to 'enabled' for the first serving cell and the second serving cell. In this case, a priority rule for the SRS transmission between the first carrier and the second carrier may be applied first, and then a procedure for directional collision handling may be applied.

For example, when the SRS transmission and physical channel transmission including HARQ-ACK collide, the UE may not transmit SRS.

Figure 33:
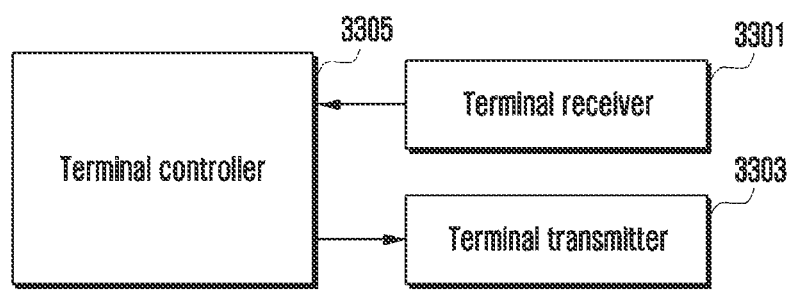
FIG. 33 illustrates a structure of the UE in a wireless communication system, according to an embodiment of the disclosure.

As another example, when a physical channel on a second carrier including a PDSCH and a PUSCH configured only with CQI collides with aperiodic SRS transmission on the first carrier, the UE may drop first the PUSCH configured only with COI based on a priority rule for the SRS transmission, and then may drop the aperiodic SRS transmission based on directional collision handling. Thereafter, the UE may receive the PDSCH on the second carrier. FIG. 33 illustrates a structure of a UE in a wireless communication system, according to an embodiment of the disclosure.

Referring to FIG. 33, the UE may include a transceiver including a UE receiver 3301 and a UE transmitter 3303, a memory, and a UE controller 3305. The UE controller 3305 may be at least one processor, and may be referred to as a controller or a control unit. Hereinafter, the UE controller 3305 will be described as a processor. The processor may control the overall device of the UE so that the UE operates according to the combination of each of the above-described embodiments of the disclosure as well as at least one embodiment. However, the elements of the UE are not limited to the above example. For example, the UE may include more or fewer elements than the above elements. Also, the transmitter, the memory, and the processor may be implemented in the form of a single chip.

The transceiver may transmit and receive a signal to and from the BS. The signal may include control information and data. To this end, the transceiver may include a radio frequency (RF) transmitter for up-converting and amplifying a frequency of the transmitted signal and an RF receiver for low-noise amplifying the received signal and down-converting the frequency. However, this is only an example of the transceiver, and elements of the transceiver are not limited to the RF transmitter and the RF receiver.

The transceiver may receive a signal through a radio channel, output the signal to the processor, and transmit the signal output from the processor through the radio channel.

The memory may store a program and data required for the operation of the UE. Further, the memory may store control information or data included in the signal transmitted and received by the UE. The memory may be configured by storage media such as a read only memory (ROM), a random access memory (RAM), a hard disc, a compact disc (CD)-ROM, and a digital versatile disc (DVD), or a combination of the storage media. The number of memories may be plural.

The processor may control a series of processes to allow the UE to operate according to the above embodiments. For example, the processor may control a series of processes of decoding the transmitted PDCCH and performing operations such as directional collision handling and priority comparison based on the configuration information received from the base station. The number of processors may be plural, and the processor may perform an operation of controlling the elements of the UE by executing the program stored in the memory.

Figure 34:
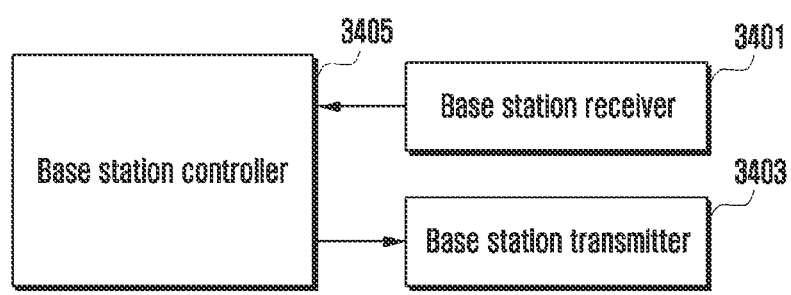
FIG. 34 illustrates a structure of the BS in a wireless communication system, according to an embodiment of the disclosure.

FIG. 34 illustrates a structure of a BS in a wireless communication system, according to an embodiment of the disclosure.

Referring to FIG. 34, the BS may include a transceiver including a BS receiver 3401 and a BS transmitter 3403, a memory, and a BS controller 3405. The BS may include a communication interface (not shown) for wired or wireless communication through a backhaul link with another BS. Hereinafter, the BS controller 3405 will be described as a processor. The processor may be at least one processor, and may be referred to as a controller or a control unit. The processor may control the overall device of the BS so that the BS operates according to the combination of each of the above-described embodiments of the disclosure as well as at least one embodiment. However, the elements of the BS are not limited to the above example. For example, the BS may include more or fewer elements than the above elements. Also, the transmitter, the memory, and the processor may be implemented in the form of a single chip.

The transceiver may transmit and receive a signal to and from the UE. The signal may include control information and data. To this end, the transceiver may include a radio frequency (RF) transmitter for up-converting and amplifying a frequency of the transmitted signal and an RF receiver for low-noise amplifying the received signal and down-converting the frequency. However, this is only an example of the transceiver, and elements of the transceiver are not limited to the RF transmitter and the RF receiver.

The transceiver may receive a signal through a radio channel, output the signal to the processor, and transmit the signal output from the processor through the radio channel.

The memory may store a program and data required for the operation of the BS. Further, the memory may store control information or data included in the signal transmitted and received by the BS. The memory may be configured by storage media such as a read only memory (ROM), a random access memory (RAM), a hard disc, a compact disc (CD)-ROM, and a digital versatile disc (DVD), or a combination of the storage media. The number of memories may be plural.

The processor may control a series of processes to allow the BS to operate according to the above embodiments. For example, the processor may control a series of processes of transmitting control information and data information for configuring the operation of the UE in the half-duplex TDD CA system to the UE, and receiving the SRS or uplink signal/channel, etc., transmitted from the UE according to the SRS carrier switching procedure. The number of processors may be plural, and the processor may perform an operation of controlling the elements of the UE by executing the program stored in the memory.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a RAM and a flash memory, a ROM, an electrically erasable programmable read only memory (EEPROM), a magnetic disc storage device, a CD-ROM, DVDs, other type optical storage devices, or a magnetic cassette. Alternatively, any combination of some or all of the memory devices may form a memory in which the program is stored. Further, a plurality of such memories may be included in the electronic device.

In addition, the programs may be stored in an attachable storage device which may access the electronic device through communication networks such as the Internet, Intranet, a local area network (LAN), a wide LAN (WLAN), and a storage area network (SAN) or a combination thereof. Such a storage device may access the electronic device via an external port. Further, a separate storage device on the communication network may access a portable electronic device.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, one embodiment of the disclosure may be partially combined with other embodiments to operate a BS and a terminal. As an example, a first and second embodiment of the disclosure may be combined with each other to operate a BS and a terminal. Further, although the above embodiments have been described on the basis of the FDD LTE system, other variants based on the technical idea of the embodiments may also be implemented in other communication systems such as TDD LTE, 5G, or NR systems.

In the drawings in which methods of the disclosure are described, the order of the description does not always correspond to the order in which steps of each method are performed, and the order or relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a time division duplex (TDD) communication system, the method comprising:
   identifying that the terminal indicates support of half-DuplexTDD-CA-SameSCS capability;
   identifying that directionalCollisionHandling is configured as 'enabled' for a set of serving cells among multiple serving cells including a first serving cell and a second serving cell, in case that the terminal is not capable of simultaneous reception and transmission on the first serving cell and the second serving cell;
   identifying that the terminal is not configured to monitor a physical downlink control channel (PDCCH) for downlink control information (DCI) format 2_0 on any of the multiple serving cells;
   identifying a first carrier of the first serving cell not configured for a physical uplink control channel (PUCCH) or a physical uplink shared channel (PUSCH) transmission; and
   in case that a sounding reference signal (SRS) transmission on the first carrier of the first serving cell and a physical channel transmission on a second carrier of the second serving cell collide and directionalCollisionHandling is configured as 'enabled' for the set of serving cells, applying a priority rule for the SRS transmission and then applying a procedure for directional collision handling.

2. The method of claim 1,
   wherein the first carrier and the second carrier are in a same frequency band, and
   wherein the SRS transmission on the first carrier is switched from another cell.

3. The method of claim 1,
   wherein in case that the SRS transmission on the first carrier and the physical channel transmission including HARQ-ACK on the second carrier collide, the terminal does not transmit the SRS transmission.

4. The method of claim 1,
   wherein in case that the SRS transmission is an aperiodic SRS transmission and the physical channel transmission includes a physical downlink shared channel (PDSCH) and a PUSCH comprising only a channel quality indicator (CQI), the terminal drops the PUSCH comprising only the CQI based on the priority rule for the SRS transmission and then drops the aperiodic SRS transmission based on the directional collision handling, and
   wherein the method further comprises:
   receiving the PDSCH on the second carrier.

5. A method performed by a base station in a time division duplex (TDD) communication system, the method comprising:
   receiving, from a terminal, capability information indicating that the terminal supports half-DuplexTDD-CA-SameSCS capability;
   transmitting, to the terminal, configuration information for configuring multiple serving cells including a first serving cell and a second serving cell, wherein a first carrier of the first serving cell is not configured for a physical uplink control channel (PUCCH) or a physical uplink shared channel (PUSCH) transmission, and directionalCollisionHandling is configured as 'enabled' for a set of serving cells among the multiple serving cells based on the configuration information; and
   receiving, from the terminal, a sounding reference signal (SRS) on the first carrier or a physical channel on a second carrier of the second serving cell, based on a priority rule for an SRS transmission and a procedure for directional collision handling,
   wherein the terminal is not capable of simultaneous reception and transmission on the first serving cell and the second serving cell and is not configured to monitor a physical downlink control channel (PDCCH) for downlink control information (DCI) format 2_0 on any of the multiple serving cells, and
   wherein in case that the SRS transmission on the first carrier and the physical channel on the second carrier collide and directionalCollisionHandling is configured as 'enabled' for the set of serving cells, the priority rule is first applied and then the procedure for the directional collision handling is applied.

6. The method of claim 5,
   wherein the first carrier and the second carrier are in a same frequency band, and
   wherein the SRS on the first carrier is switched from another cell.

7. The method of claim 5,
   wherein in case that the SRS transmission on the first carrier and a physical channel transmission including HARQ-ACK on the second carrier collide, the SRS is not received on the first carrier.

8. The method of claim 5,
   wherein in case that the SRS transmission is an aperiodic SRS transmission and the physical channel is a PUSCH comprising only a channel quality indicator (CQI), the PUSCH comprising only the CQI is first dropped based on the priority rule for the SRS transmission.

9. A terminal in a time division duplex (TDD) communication system, the terminal comprising:
   a transceiver configured to transmit and receive signals; and
   a controller coupled with the transceiver and configured to:
   identify that the terminal indicates support of half-DuplexTDD-CA-SameSCS capability,
   identify that directionalCollisionHandling is configured as 'enabled' for a set of serving cells among multiple serving cells including a first serving cell and a second serving cell, in case that the terminal is not capable of simultaneous reception and transmission on the first serving cell and the second serving cell,
   identify that the terminal is not configured to monitor a physical downlink control channel (PDCCH) for downlink control information (DCI) format 2_0 on any of the multiple serving cells, identify a first carrier of the first serving cell not configured for a physical uplink control channel (PUCCH) or a physical uplink shared channel (PUSCH) transmission, and in case that a sounding reference signal (SRS) transmission on the first carrier of the first serving cell and a physical channel transmission on a second carrier of the second serving cell collide and directionalCollisionHandling is configured as 'enabled' for the set of serving cells, apply a priority rule for the SRS transmission and then apply a procedure for directional collision handling.

10. The terminal of claim 9,
wherein the first carrier and the second carrier are in a same frequency band.

11. The terminal of claim 9,
wherein in case that the SRS transmission on the first carrier and the physical channel transmission including HARQ-ACK on the second carrier collide, the controller is configured not to transmit the SRS transmission.

12. The terminal of claim 9,
wherein in case that the SRS transmission is an aperiodic SRS transmission and the physical channel transmission includes a physical downlink shared channel (PDSCH) and a PUSCH comprising only a channel quality indicator (CQI), the controller is configured to drop the PUSCH comprising only the CQI based on the priority rule for the SRS transmission and then drop the aperiodic SRS transmission based on the directional collision handling, and
wherein the controller is further configured to receive the PDSCH on the second carrier.

13. A base station in a time division duplex (TDD) communication system, the base station comprising:
a transceiver configured to transmit and receive signals; and
a controller coupled with the transceiver and configured to:
receive, from a terminal, capability information indicating that the terminal supports half-DuplexTDD-CA-SameSCS capability,
transmit, to the terminal, configuration information for configuring multiple serving cells including a first serving cell and a second serving cell, wherein a first carrier of the first serving cell is not configured for a physical uplink control channel (PUCCH) or a physical uplink shared channel (PUSCH) transmission, and directionalCollisionHandling is configured as 'enabled' for a set of serving cells among the multiple serving cells based on the configuration information, and
receive, from the terminal, a sounding reference signal (SRS) on the first carrier of the first serving cell or a physical channel on a second carrier of the second serving cell, based on a priority rule for an SRS transmission and a procedure for directional collision handling,
wherein the terminal is not capable of simultaneous reception and transmission on the first serving cell and the second serving cell and is not configured to monitor a physical downlink control channel (PDCCH) for downlink control information (DCI) format 2_0 on any of the multiple serving cells, and
wherein in case that the SRS transmission on the first carrier and the physical channel on the second carrier collide and directionalCollisionHandling is configured as 'enabled' for the set of serving cells, the priority rule is first applied and then the procedure for the directional collision handling is applied.

14. The base station of claim 13,
wherein the first carrier and the second carrier are in a same frequency band, and
wherein the SRS on the first carrier is switched from another cell.

15. The base station of claim 13,
wherein in case that the SRS transmission on the first carrier and a physical channel transmission including HARQ-ACK on the second carrier collide, the SRS is not received on the first carrier.

16. The base station of claim 13,
wherein in case that the SRS transmission is an aperiodic SRS transmission and the physical channel is a PUSCH comprising only a channel quality indicator (CQI), the PUSCH comprising only the CQI is first dropped based on the priority rule for the SRS transmission.

* * * * *